(12) United States Patent
Chirehdast

(10) Patent No.: US 8,660,943 B1
(45) Date of Patent: Feb. 25, 2014

(54) METHODS AND SYSTEMS FOR FINANCIAL TRANSACTIONS

(75) Inventor: Mehran Chirehdast, San Antonio, TX (US)

(73) Assignee: BTPatent LLC, Potomac, MD (US)

( * ) Notice: Subject to any disclaimer, the term of this patent is extended or adjusted under 35 U.S.C. 154(b) by 23 days.

(21) Appl. No.: 13/411,564

(22) Filed: Mar. 4, 2012

Related U.S. Application Data

(63) Continuation-in-part of application No. 13/222,123, filed on Aug. 31, 2011, now Pat. No. 8,504,470.

(51) Int. Cl.
*G06Q 40/00* (2012.01)

(52) U.S. Cl.
CPC .................................... *G06Q 40/00* (2013.01)
USPC ........................................................... 705/38

(58) Field of Classification Search
None
See application file for complete search history.

(56) References Cited

U.S. PATENT DOCUMENTS

| | | | |
|---|---|---|---|
| 6,938,008 B1 | 8/2005 | Stokes | |
| 7,870,048 B2 * | 1/2011 | Bhagwat | 705/35 |
| 7,899,853 B1 | 3/2011 | Fakharzadeh | |
| 7,949,176 B2 | 5/2011 | Nepomniachtchi | |
| 7,953,268 B2 | 5/2011 | Nepomniachtchi | |
| 2004/0039690 A1 * | 2/2004 | Brown et al. | 705/38 |
| 2008/0015954 A1 * | 1/2008 | Huber et al. | 705/28 |
| 2009/0055310 A1 * | 2/2009 | Chandran et al. | 705/38 |

* cited by examiner

*Primary Examiner* — Bruce I Ebersman
(74) *Attorney, Agent, or Firm* — Bijan Tadayon; Saied Tadayon

(57) ABSTRACT

Relationship banking and mobile banking are discussed and presented here. In Section 1, we present Pre-approval, Fulfillment, and Application Process. In Section 2, we present Financial Products for Protection of Consumers. In Section 3, we present Relationship-Based Score. In Section 4, we present Application of Credit Report for a "Binding" Pre-Approval for Lending Products. In Section 5, we present Deposit Slip Purchase. In Section 6, we present Reducing Frauds on Credit Cards. We also discuss the system and components, with different variations on system and method, or their designs. Sections 7-9 discuss other applications and examples.

14 Claims, 50 Drawing Sheets

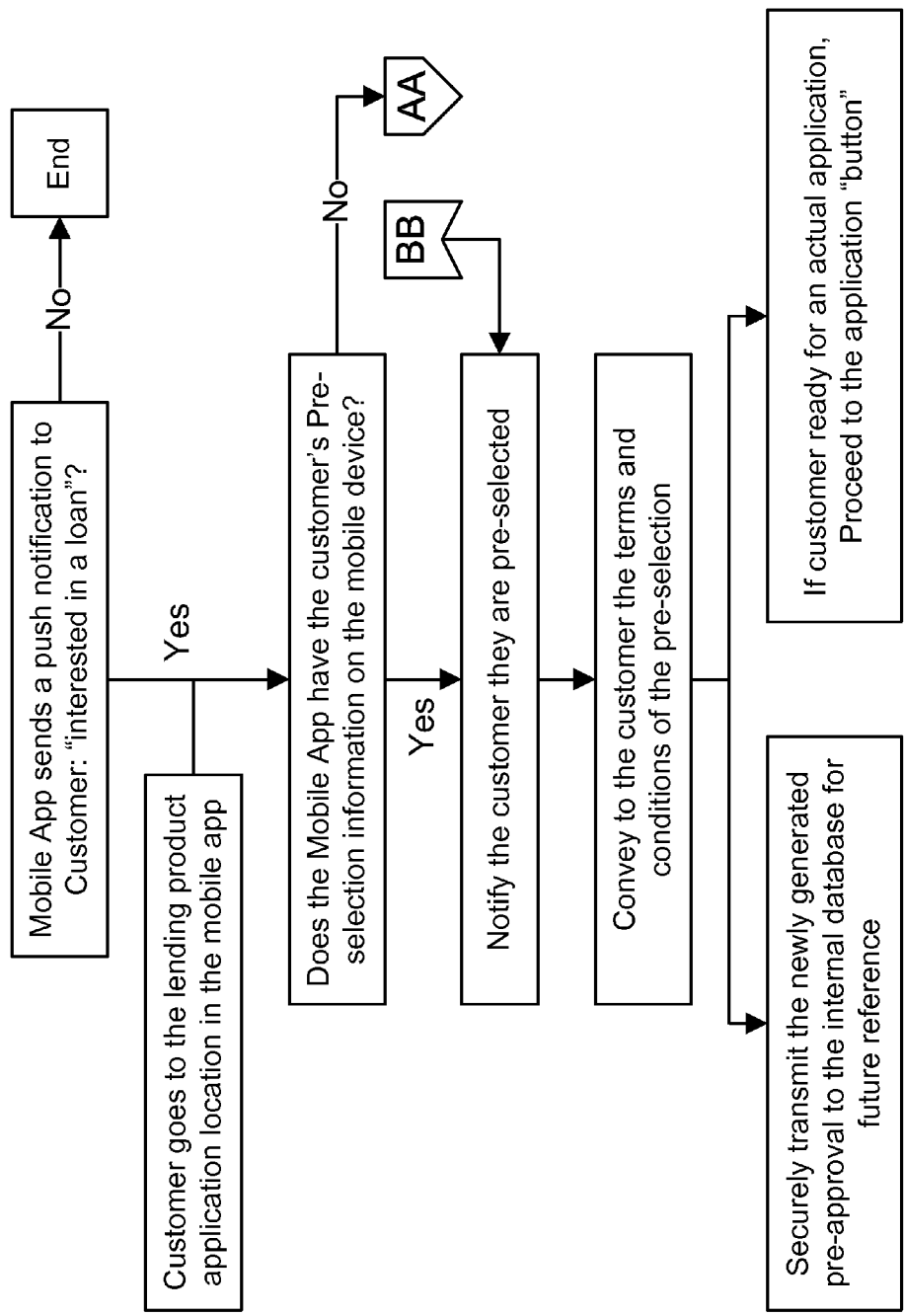

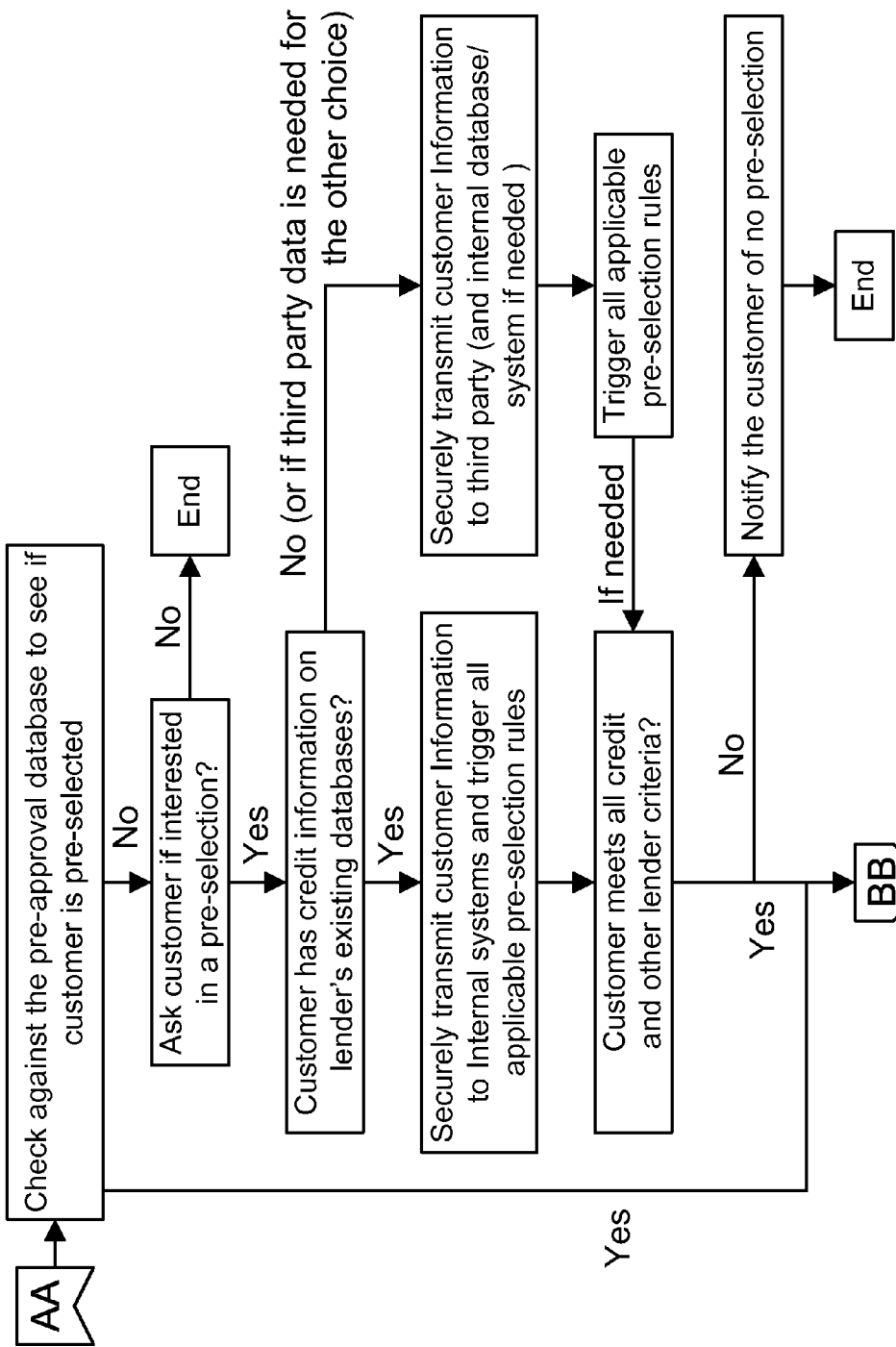

| Variable | Income | Own or Rent (housing expenditure) | Collateral Type | Collateral Value | Requested Amount | Down Payment | Estimated Closing Cost | Contact Info (e.g., e-mail, mobile device No.) | Identification, e.g., Name, Soc. Sec. No., Address |
|---|---|---|---|---|---|---|---|---|---|
| Auto | x | x | x | x | x | x | | x | x |
| Motor Cycle | x | x | x | x | x | x | | x | x |
| RV / Marine | x | x | x | x | x | x | | x | x |
| Unsecured Installment | x | x | | | x | | | x | x |
| Credit Card | x | x | | | | | | x | x |
| Mortgage | x | x | x | x | x | x | x | x | x |
| Home Equity Installment | x | x | x | x | x | x | x | x | x |
| Home Equity LOC | x | x | x | x | | x | x | x | x |

FIG 5

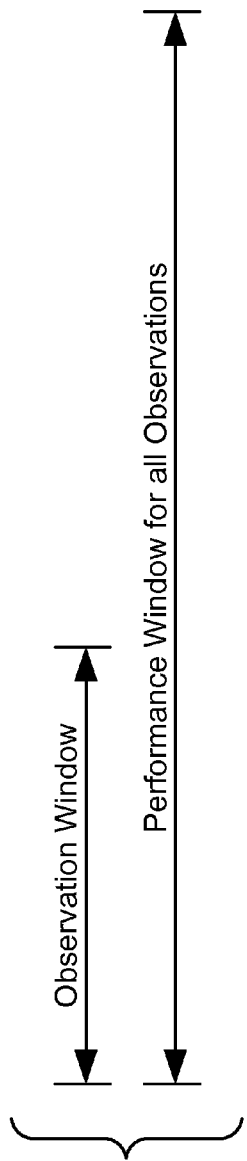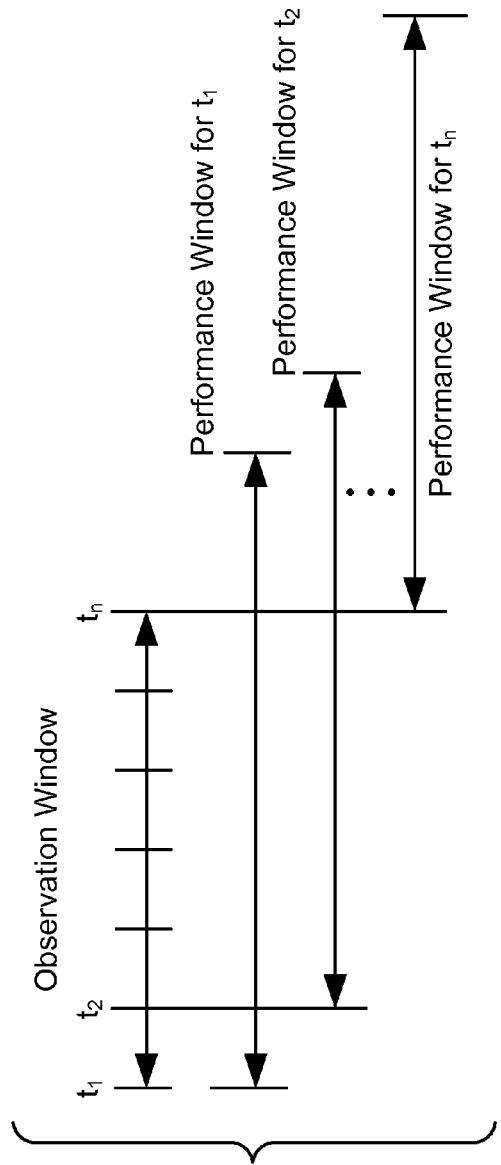

Your Vehicle

VIN: [_____] [Enter]

Make  Model  Year
[__] [__] [__] [Verify or Enter]

} Display in case of Verify and Dropdown Menu in Case of Enter

Mileage: [_____] [Enter]

Vehicle Purchase Price:
[$___] [Enter] [Estimate]

Tax: [$___] [Enter] [Estimate]
Title: [$___] [Enter] [Estimate]
Fees: [$___] [Enter] [Estimate]

Total Cost of the Vehicle:
[$___] [Enter] [Verify]

Down Payment:
[$___] [Enter]

Total Vehicle Amount Financed:
[$___] [Calculate] [Verify]

FIG 32

Your Financing Options

Extended Vehicle Protection/Warranty

Miles: [Enter]    Term (months): [Enter]

Additional ☐   Total ☐ (Check one that applies to Term/Miles)

Dealer Cost: [$]

Your Price: [$]   [Quote]

---

Total Loss Protection

Dealer Cost: [$]   [Enter]   Your Price: [$]   [Quote]

---

Debt Life/Unemployment Protection

Dealer Cost: [$]   [Enter]   Your Price: [$]   [Quote]

---

Other Financing Charges (example: Origination Fee)

Dealer Cost: [$]   [Enter]   Your Price: [$]

Total Amount Financed

[Calculate]

Dealer Financing   Your Financing

METHODS AND SYSTEMS FOR FINANCIAL TRANSACTIONS

RELATED APPLICATION

This application is a CIP of another U.S. application Ser. No. 13/222,123, filed 31 Aug. 2011 now U.S. Pat. No. 8,504,470, with the same inventor and assignee. The current application claims priority to the filing date of the parent case (Ser. No. 13/222,123), and it incorporates by reference all the teachings and specification of the parent case.

BACKGROUND

The e-banking and e-commerce are becoming more and more integrated with our daily lives. We are introducing new concepts and teachings for relationship banking and mobile banking here, to improve on the current state of e-banking and e-commerce, with useful features for both the banks (financial institutions) and/or consumers.

Please note that U.S. Pat. Nos. 7,953,268 and 7,949,176 (assigned to Mitek Systems Inc.) teach the methods and systems for mobile image capture and processing of documents. The U.S. Pat. No. 7,899,853 teaches handheld computational device having securing elements. The U.S. Pat. No. 7,870,048 teaches method and system for flexible scheduling of repayment of a loan. The U.S. Pat. No. 7,392,216 (by Palmgren et al., from GE Capital Mortgage Corporation, filed Sep. 27, 2000, and issued Jun. 24, 2008) teaches methods and apparatus for utilizing a proportional hazards model to evaluate loan risk, with hazard rate and different variables. The U.S. Pat. No. 6,938,008 teaches loan modeler method and apparatus. However, none of the prior art teaches the features taught in this disclosure, as detailed below.

SUMMARY

Relationship banking and mobile banking are discussed and presented here. In Section 1, we present Pre-approval, Fulfillment, and Application Process. In Section 2, we present Financial Products for Protection of Consumers. In Section 3, we present Relationship-Based Score. In Section 4, we present Application of Credit Report for a "Binding" Pre-Approval for Lending Products. In Section 5, we present Deposit Slip Purchase. In Section 6, we present Reducing Frauds on Credit Cards. We also discuss the system and components, with different variations on system and method, or their designs. Sections 7-9 give more examples and applications.

The systems and methods taught here help reduce the cost of processing for financial institutions/banks, and bring more customers for the bank, as well as more convenience and more options for the customers, in addition to faster processing of applications, which generally benefit all involved, including the economy, which benefits from easier circulation of money (e.g. more loans for small businesses, for more projects and new hiring).

BRIEF DESCRIPTION OF FIGURES

Here are some examples/embodiments:

FIGS. 2a-2b show "Pre-Selection or Pre-Approval Process on Mobile Devices for All Lending Products", as an example.

FIG. 5 is an example of a list of selected variables potentially required for specific lending products.

FIGS. 7a and 7b show observation window and performance window, for all observations and various t's, or unstaggered and staggered performance windows, respectively.

FIG. 18b shows an example of a system for Section 3, similar to FIG. 18a.

FIG. 32 shows an example of a system for Section 9. (Sample Interface for the Customizable Auto Lending Tool—The Vehicle)

FIG. 33 shows an example of a system for Section 9. (Sample Interface for the Customizable Auto Lending Tool—The Financing Options)

DETAILED DESCRIPTION OF THE EMBODIMENTS

Section 1: Pre-Approval, Fulfillment, and Application Process

In this section, we are going to address the following 3 embodiments:

Mobile instantly generated credit/debit/prepaid card fulfillment and usage

Pre-approval Process on Mobile Devices for All Lending Products

Figure 1:
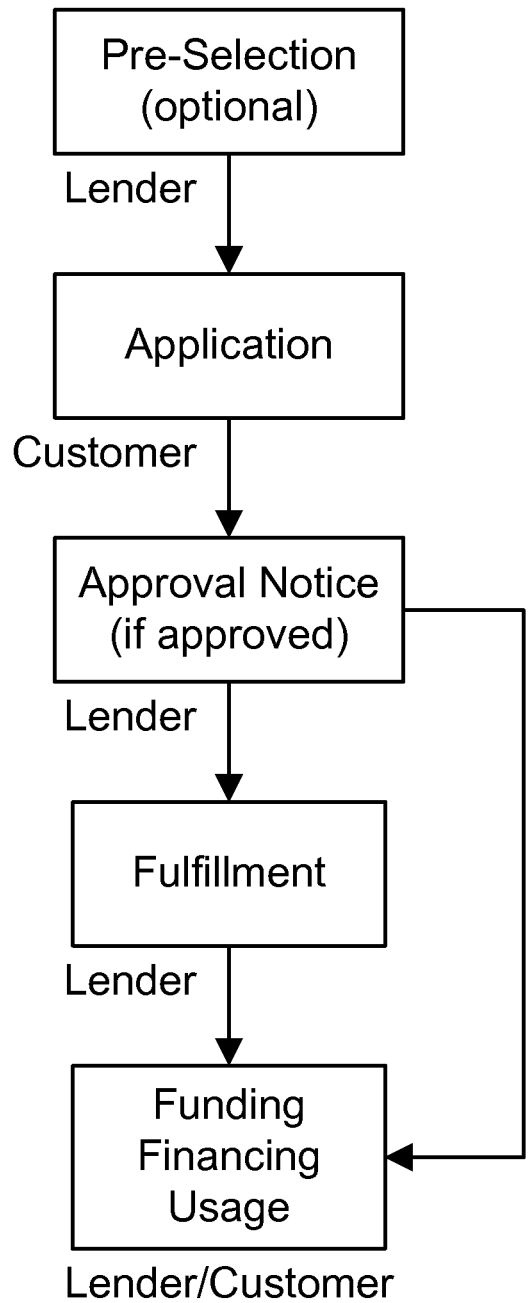
FIG. 1 shows "General Schematic for Lending in Consumer Financial Products", as an example.

Lending Product Application (LPA) Process on Mobile Devices for All Lending Products FIG. 1 shows "General Schematic for Lending in Consumer Financial Products", as an example. In general, most lenders (banks or other financial institution in the business of consumer financial services) offer a variety of consumer lending products to their customers. In all cases, as illustrated in the simplified schematic (General Schematic for Lending in Consumer Financial Products), a 3-step process of application, approval, and fulfillment, generally precedes the actual funding or issuance of the lending product, which is equivalent to the usage of the lending product by the customer.

FIG. 1 shows an optional pre-selection, followed by application, and approval notice, if approved. Then, the next stage is fulfillment and funding/financing/usage. However, it can also go to Funding stage directly from Approval Notice stage.

"Funding-Financing-Usage" can be done using a check mailed or authorization or wire transfer or email to consumer, or a check to the dealer or merchant (e.g. car dealer, selling cars, with respect to a car loan applied by a consumer).

Fulfillment, specifically in some cases, may extend beyond the issuance and financing of the lending product, especially in the case of secured lending, where collateral serves as security for the lender's interest. However, both (A) secured and (B) unsecured lending follow the same process. (See e.g. FIGS. 1-4.) (A) includes (but is not limited to) automobile, motorcycle, RV, marine, home equity line of credit or installment loan, first mortgage, lot loans, debit card, pre-paid card, and secured card, and (B) includes (but is not limited to) credit card, unsecured installment loan, and student loans.

We include pre-paid and debit cards under the same category of lending products, since the lender floats the money on behalf of the user (or customer or consumer), until the funds from the user are accessed (sometimes instantaneously) from user's source of fund. Also, both products are subject to fraud, that is typically associated with credit cards and other lending products, and in contrast to cash financing of purchases, where typically no fraud occurs.

Whereas currently, all three steps are offered through various channels (e.g., internet, branch, phone, and fax), none is offered on mobile channels. In other words, customers (1) are not provided with lenders' pre-selection offers, (2) cannot apply and (3) cannot obtain approval, or receive the lending products on their mobile devices. In general, the fulfillment of secured ending products is more complicated, as compared to that of unsecured products. For example, for auto lending, verification of the value of the vehicle, title inspection, placing a lien by the lender on the title of the financed vehicle, and the whole department of motor vehicle title application (and transfer process) are very much involved, ultimately leading to the disbursement of funds to the dealer or the seller of the vehicle on behalf of the borrower by the lender.

Similarly, for financing a first mortgage or a home equity loan or line of credit, an appraisal of the real-estate property, borrower's income verification, and placing a lender's lien on the title are a few of the numerous steps needed in the fulfillment process. Whereas fulfilling a credit card application simply and only involves mailing the cardholder a plastic card in the mail and having the cardholder activate the card with the lender.

Summary for Pre-Approval Process on Mobile Devices for all Lending Products:

This is shown in FIG. 2, FIGS. 2a-b, as an example. Sometimes, the 3-step process (application-approval-fulfillment process) is preceded by lender's unconditional, or in most cases, conditional pre-approval (pre-selection) of the borrower. Other terms, such as pre-screen, pre-selection, or invitation-to-apply (ITA) are also used, in lieu of pre-approvals, but they are all marketing tools used by lenders to encourage the customer to borrow from the lender instead of other financial services providers. The lender may or may not decide to offer any favorable terms to those who have been pre-selected.

In general, the lists of targeted customers for these pre-selection routines comes from various sources, including but not limited to, existing customers of the lender or its affiliates and lists purchased or otherwise acquired from third-party suppliers. Such pre-selections may or may not involve the lender applying any kind of pre-selection criteria. These pre-selection notices are currently sent primarily through the following 3 channels: Internet (the lenders web site), email, and standard mail. Mobile channel has not been used for offering pre-approvals, pre-selections, ITAs, or pre-screenings.

Summary for Mobile Instantly Generated Credit/Debit/Prepaid Card Fulfillment and usage Please refer to FIGS. 4a-d (FIG. 4), as an example. Lenders provide the following financial products that use a plastic card to disburse funds for typical purchases or cash withdrawals: credit card (secured or unsecured), debit card, and pre-paid cards, collectively here referred to as the "Card". The simple fulfillment process consists of printing the Card and mailing it to the customers, which usually takes at least 1 week. Once the card is activated with the issuing entity, the usage of the Card requires the customer swiping it against card readers in stores and entering various numbers and dates for online transactions. No instantaneous issuance and usage of the Card is currently practiced by any lender, which includes the use of the mobile device in lieu and instead of the plastic Card.

Please note that, generally, the credit card information comprises credit card number and expiration date, among others.

Please note that, generally, we have at least 3 situations covered here, as a few examples: first at the store/merchant; second on-line merchant; and third for cash withdrawal.

The inventions above enable mobile pre-selection, lending product application (LPA), decisioning (approval), and fulfillment and usage of various lending products offered by financial institutions. Whereas, our invention regarding fulfillment and usage by default assumes the customer is already an existing customer of the lender with varying extent in depth of relationship with the lender, the customer or applicant for the lending product may or may not be an existing customer with the lender. In such cases, the customer or applicant must be given the opportunity to establish a new account via the mobile device app (MDA). The lender may take additional appropriate and necessary steps that are usual and customary to prevent fraud in such cases.

Please note that the conventional application approval involves getting income, social security number, and name of the applicant, to be sent to credit bureaus, to get credit scores, to be evaluated later, based on the rules, for approval or decline of the application.

Summary for Pre-approval Process on Mobile Devices for All Lending Products

This is shown in FIG. 2, FIGS. 2a-b, as an example. Pre-approvals, ITAs, pre-screens, and other types of pre-selections (collectively referred to as pre-selections) are typically offered to existing, prospective, or potential customers of lenders, and if available (stored in internal databases). Such pre-selections maybe offered to customers on mobile devices as a means of marketing the product to them and/or easing the process of lending product application (LPA), approval, and financing of the lending product.

In some embodiments, the lender's mobile device app (MDA) can send a push notification (mobile notice) about the availability of a pre-selection offer to the customer or inquire the customer about their interest in a specific product. In other embodiments, the same notice or push notification can be made visible to the customer, once the customer invokes the lender's mobile device app (MDA). In yet another embodiment, the notice can be visible once the customer touches a link (touch screen button) on the lender's mobile device app (MDA), specifically related to the lending product where a pre-selection offer is available.

Regardless of the notification method, two distinct cases arise. In the first case, the pre-selection of the customer for the lending product that has already occurred, is valid (has not expired yet), and is known or can be readily known (without information transmission from other sources) to the mobile device app (MDA), based on the information previously submitted to the mobile device app (MDA). In this case, should the customer be interested in acquiring the actual lending product, the customer can proceed to the lending product application (LPA) process (explained elsewhere in this disclosure), based on this pre-selection.

In the second case, where the pre-selection has yet to occur, or not known to, or cannot be readily determined by the mobile device app (MDA), the lender must transmit the information via secure transmission methods to their internal databases. Prior to such transmission, customer's agreement may be required or appropriate.

The lender then can follow their existing processes for pre-selection, which in some embodiments, may consist of applying internal credit or non-credit criteria (such as, recent or current past-due delinquency with the lender or its affiliates). Yet, in other embodiments, such regular pre-selection processes may include sending the information further to third-party vendors who may in turn obtain credit or other information and apply lender-provided or other criteria for pre-selecting the customer.

Finally, the information as to whether or not the customer is pre-selected becomes available to the mobile device app (MDA) and is shared with the customer, usually as a notice of conditional offer for the lending product. The customer at this point of time may use the offer by invoking the lending product application (LPA) process on the mobile device (see the related embodiments, described elsewhere in this disclosure).

Figure 11:
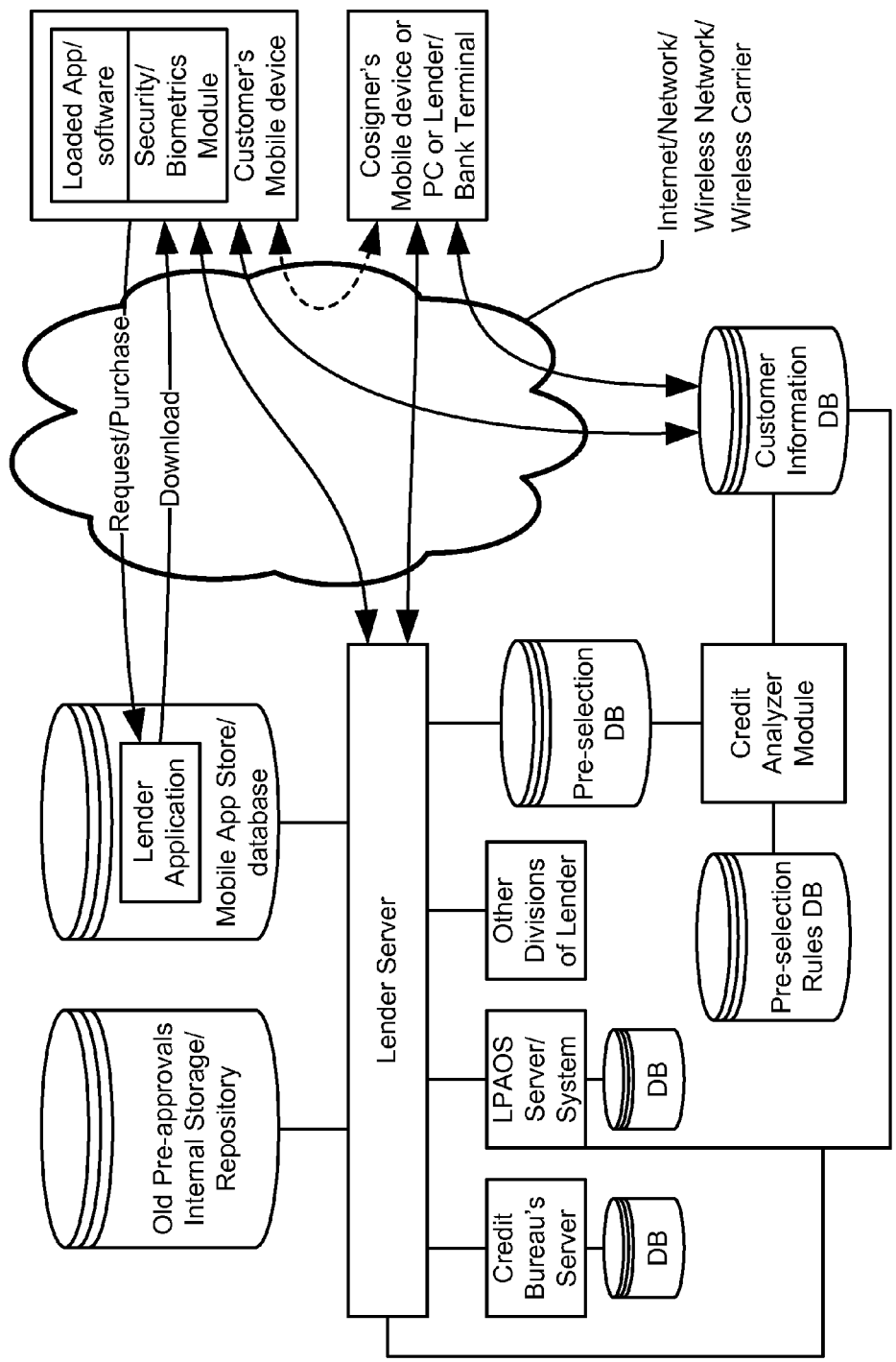
FIG. 11 shows an example of a system for Section 1.

Initially, the customer, client, consumer, user, or borrower request and purchase/download the lender software application from the on-line store, using her PC, computer, tablet, or mobile device/phone, which includes a biometrics/security module, as well, as shown in FIG. 11, as an example.

As shown in FIG. 2a, the Mobile App sends a push notification to a Customer, to see if she is interested in a loan (e.g. see lender server and mobile device in FIG. 11). Then, the Customer goes to the lending product application location in the mobile app (e.g. mobile phone software application, running on the mobile device). If the customer's pre-selection information is on the mobile device, then the mobile device or the overall system notifies the customer, with the terms and conditions. Then, it sends the pre-selection information into internal database for future use, and if the customer is ready, it proceeds to the actual application.

As shown in FIG. 11, the lender server is connected to credit bureau server (which has a database), and is also connected to other divisions and databases of the lender, e.g., to get more information about the customer. Lender server is also connected to LPAOS system/server (and its database). Multiple (2 or more) applicants, customers, or clients may apply and co-sign for the loan, with or using their devices, mobile phones, PCs, wired connections, Internet, network, tel. carrier, or wireless service/company, for which the credit histories of all people are examined, as a whole. The customer information (received from the customer) and the pre-selection rules are used to analyze the credits, and send the final result to the lender, as shown in FIG. 11. Each customer connects, signs up, and supplies to lender any needed/requested information (from the lender). In addition, LPAOS server and lender server communicate with customer information DB (database).

As shown in FIG. 2b, it checks to see if the customer was pre-selected. If not, it asks the customer if she is interested in 2. If so, then it sees if it has information on the customer already. Then, if not, it gets the information, and it triggers all applicable preselection rules, to see if the customer meets the criteria. Then, it notifies the customer about the decision.

Summary for Lending Product Application (LPA) Process on Mobile Devices for All Lending Products As mentioned above, whereas various lending product application (LPA) channels are offered to customers by lenders, those channels do not include the mobile LPA channel. This invention/embodiment relates to the area of providing customers the means of applying for financing products via mobile devices, as a way to increase accessibility and convenience for the customers. The process (in general) starts with the customer (existing or new), being interested in applying for a loan through invoking the appropriate link in the lender's mobile device app (MDA). In some embodiments, the lender may choose to follow the pre-selection process reviewed above, or in others, the lender may decide to circumvent the process.

In general, though, the lender will need to identify the customer with certainty, in order to minimize or eliminate the risk of fraud. The customer identification is simpler, if the customer is an existing customer with the lender (has a business relationship), and if the phone number or other identifying number of the mobile device is registered with the lender. However, for the process to function as designed, the customer needs not be an existing one. In the cases where a new customer applies, the required information must be applied, via the mobile device, and the process may take longer to complete.

In one embodiment of this invention, the customer has an existing relationship with the lender. The mobile device app (MDA) prompts the customer for a few variables specific to the loan, that can vary from product to product. In FIG. 5, a list of possible fields of variables (e.g., collateral value and income) is provided for various lending products, e.g., automobile loans. Those collected fields, in addition to the identity of the customer and the customer's potential co-applicants (if any), are transmitted to the internal databases of the lender. All relevant information for completing the lending product application (LPA) is retrieved from the database. If the lender is missing any fields to proceed with the lending product application (LPA), the mobile device app (MDA) will prompt the customer to provide those. In either cases (complete or incomplete information), the mobile device app (MDA) may review a few fields that are essential to the lending product application (LPA), such as, but not limited to, name, social security number, and address, to confirm that the lender information is complete.

Once all the information is available, and possibly verified by the customer via interaction with the mobile device app (MDA), the lender may prompt the customer if the customer would like to proceed with the lending product application (LPA). This notice of intent to proceed with the lending product application (LPA) and other relevant information are then sent to the lender's internal IT systems.

The lender may decide at this point to transmit the information to the lending product application/origination system (LPAOS) specific to the lending product for which the customer is applying. The lender's LPAOS then follows the regular lending product application (LPA) processing steps to arrive at a decision. Some of such steps may be retrieving a credit bureau report for the applicants (customer and the customer's potential co-applicants) and triggering all applicable lending rules and potential incremental ones related to mobile lending product applications (LPA). (See FIG. 12.)

In case a lending product is offered, as outlined under (2), (3), or (5) below, at this point, a product may be constructed that fits the customer's needs and meets lender's applicable lending guidelines and requirements.

Ultimately, the process may or (1) may not result in a decision. A decision may be (2) a conditional or (3) an unconditional approval, (4) a denial or decline, or (5) a counter-offer (not exactly what the customer wants, but what the lender can offer based on the customer's credit and capacity profile). In either of those cases (1) through (5), the outcome is transferred to the mobile device, and the customer is notified of the outcome and the next steps for potential fulfillment and relevant terms and conditions of the lending product, should the outcome be (2), (3), or (5). In all cases, disclosures may be required to the applicants that are conveyed to the customer via the mobile device app (MDA). Some cases, such as case (1) may require the customer to contact the lender via other means (such as phone).

Sometimes, the lender requires more information from the customer, which can be either sent in person, by mail, fax, or electronically, using email, text messages, SMS, or smart phone/communication devices, computers, tablets, PDA, or laptops.

The notification may take different forms, depending on the legal requirements and lender's preferred business practices, and may involve notices on the MDA, via email or first class mail.

Another scenario that may arise is that the offered lending product does not exactly meet the customer's needs and requirements. As an example, the customer may need a 6 year auto loan, as compared to a 5 year loan that has been offered. In an embodiment, the lender may offer those various choices to the customer on the mobile device app (MDA), and have the customer decide which one to choose. In this embodiment, the functionality must be provided to the customer on the MDA. In yet another embodiment, iterations between the MDA and the internal systems of the lender (LPAOS, for example) may be required, and the MDA has to accommodate such iterations in order to finalize the lending product offering to the customer.

In such an embodiment, the MDA will prompt the customer if the offered lending product meets its needs. If not, the MDA must offer the customer a host of parameters (terms of the loan) that may be varied in order to accommodate for the customer's needs. The decision whether or not those changes are within the lender's criteria may be made locally on the MDA, or may have to be made on the lender's internal systems (such as the LPAOS), in which case transmissions between the MDA and those systems are required. In yet another embodiment of this invention, the lender may ask the customer to contact the lender via other contact channels, such as phone or internet, for any requests to change the product.

Mobile Instantly Generated Credit/Debit/Prepaid Card Fulfillment and Usage

Please refer to FIGS. 4*a-d* (FIG. 4), as an example. This embodiment assumes that the result of the Card application process (lending product application or LPA specific to credit card, debit card, or pre-paid card, collectively referred to here as "Card") through the mobile device process (explained under "Pre-selection Process on Mobile Devices for All Lending Products" section here in this disclosure), or otherwise, through other channels has resulted in (A) an approval or (B) a counter-offer accepted by the customer. The scope of this embodiment relates to the case where the customer decides to use or the lender decides exclusively to offer the mobile device as the means of fulfillment and usage of the Card. Note that the mobile fulfillment and usage may or may not be the exclusive method of fulfillment and usage. For example, the customer may decide to have the plastic card, in addition to the mobile device as a mode of using the Card. Furthermore, if a funding of a pre-paid card needs to take place, the assumption is that it has already occurred, by the time the customer decides to use it for the first time. (See e.g. FIG. 4*b*.)

The lender's host receivables system (HRS) contains the information related to the fulfillment and usage of the Card, specifically if and which mobile device or devices are used as the usage devices, if other means of usage are used in conjunction with the mobile device, and also security and verification data fields (such as, but not limited to PINs or security questions and answers). (See e.g., FIG. 4*b*.) The lender's mobile device app (MDA) may be enabled with the functionality of displaying a symbolic Card for usage. Furthermore, the mobile device app (MDA) is provided with the relevant Card information, including but not limited to all necessary information currently on plastic Cards (including the information on the magnetic stripes), in addition to other required card account information, such as, credit limit or available funds, APR (if applicable), current balance, and other payment and transaction data, if applicable. (See e.g. FIG. 4*b*.)

Please note that for security verifications, one can use the tel. number and some hardware or software ID or numbers or codes, e.g. preset by the manufacturer at the factory, to make sure that the user is the right person. Other conventional/available security/authentication/verification methods can be combined, as well, such as PKI (Public Key Infrastructure)/encryption/digital signatures, or scanning or recording or taking picture/image of face, eye, fingerprint, voice, or other biometrics, using a scanning line or camera(s) or digital recorder/microphone, on the mobile device or tel. set or cell phone.

Should the customer decide to use the Card on the mobile device, for example, to make a purchase at a merchant's store, the customer invokes the relevant mobile device app (MDA) and provides the necessary security information, as established by the lender and the customer. At this point, an embodiment may require mobile device app (MDA) to display a symbolic image depicting a Card. This image is not necessary for the completion of the transaction (may be optional), and may serve the purpose of reassuring the user and the merchant that the transaction is in progress and authentic. Other images or signs of usage may be displayed in alternative embodiments. (See e.g. FIG. 4c.)

The merchant's reader receives the Card information transmitted from the mobile device, via secured wireless communication channels—near-field communications (NFC) or otherwise. Merchant's reader transmits the transaction information (i.e., transaction amount) to the mobile device for the customer's (purchaser or Card holder) approval. (See e.g. FIG. 4c.) The customer reviews the details and approves the transaction. One or more iterations may be required between the mobile device and the merchant's reader, should the details not be accurate. The reader then transmits the information through the standard transaction clearing processes for Cards. If the transaction is approved, the transaction may be complete at this point, or in other scenarios, may require incremental steps, such as adding a tip in restaurants or other service providers to the transaction amount. The lender's mobile device app (MDA) may accommodate this step electronically within the MDA. Furthermore, upon completion of the transaction, an electronic receipt may be saved on the mobile device app (MDA) for future reference and verification. If the transaction is denied, the merchant informs the customer, as is customary in ordinary Card transactions, or alternatively, and in addition, the MDA informs the Cardholder of the decline and discloses potential reasons for declining the transaction. (See e.g. FIG. 4d.)

Figure 14:
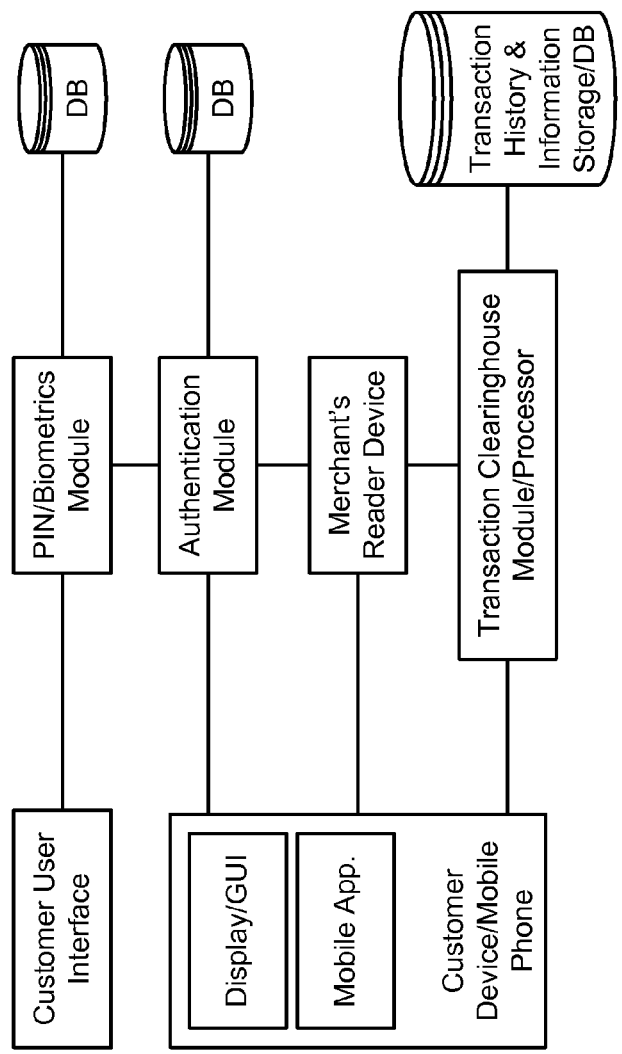
FIG. 14 shows an example of a system for Section 1.

As can be seen from FIG. 14, customer gets authenticated, using PIN, password, PKI (public/private key/digital signature), biometrics (eye, iris, voice, face, hand, knuckles, fingerprint, palm print, DNA, or the like), handwriting, signature, smartcard, RFID, badge, chip embedded in/on body or on a card, tel or hardware ID, manufacturer's ID, tel number, cell phone ID, or the like. The authentication apparatus is linked to the customer device, e.g. mobile phone, wirelessly, which has a display, and contains the mobile app. The customer device is connected to the merchant's reader device/scanner (e.g. via wireless communication), which is connected further to the transaction clearinghouse/processor/module, which stores the transaction history and other related information.

In other embodiments, no merchant reader may be involved, and an online merchant requires the Card information which is provided by the mobile device app (MDA) to be manually entered by the customer in the online vendor's appropriate fields.

In yet another embodiment, an integrated shopping environment is facilitated by the mobile device, whereby the mobile shopping environment of a mobile vendor invokes (with approval and possible interaction from the customer) the Card mobile device app (MDA) and ultimately completes the transaction, as outlined above, for the in-store reader. Except that in this case, the vendor's mobile store (shopping environment) serves as the merchant and the merchant's reader, and all data transmission is (A) within the mobile device between the mobile vendor's mobile device app (MDA) and the lender's mobile device app (MDA) and (B) possible transaction clearing transmissions required by the vendor's mobile device app (MDA).

Another type of transaction typically associated with credit cards is cash withdrawal, which is typically conducted with a plastic card and a PIN on ATMs or in bank branches. This invention and its various embodiments accommodate for this type of transaction by linking the credit card on the mobile device app with the customer's checking or savings account, where the funds can be withdrawn from the credit card account and transferred to the customer's checking or savings account. An interactive menu in the MDA lets the customer set up such links by providing the selected or linked account's number and the bank's routing number. Another set of interactive steps let the customer perform the actual cash transaction once the appropriate security requirements are met.

Figure 4A:
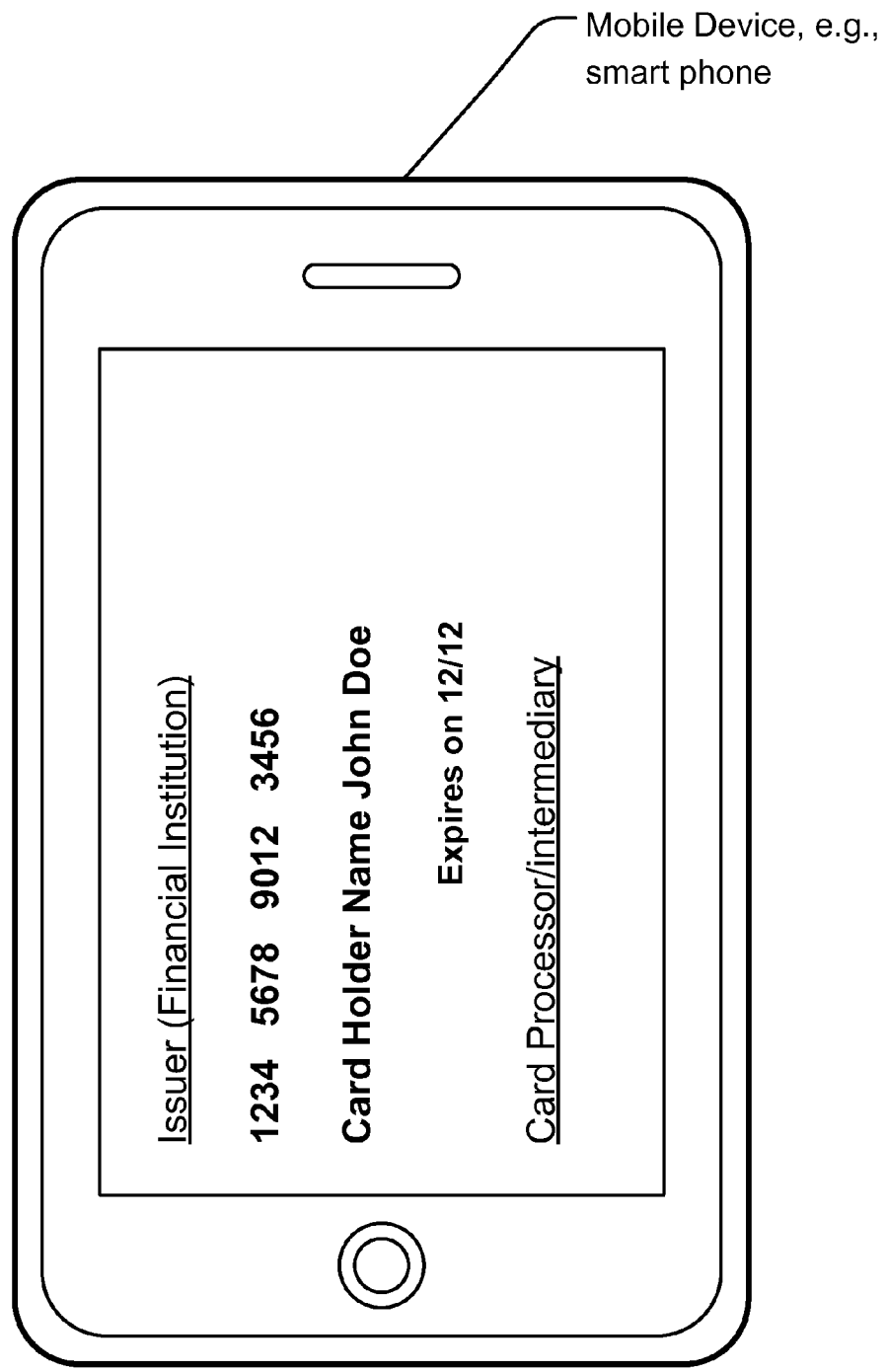
FIGS. 4a-4d refer to "Fulfillment and Usage Process on Mobile Devices for Credit/Debit/Pre-Paid Cards (collectively referred to as Cards)" process, as an example.
Figure 4B:
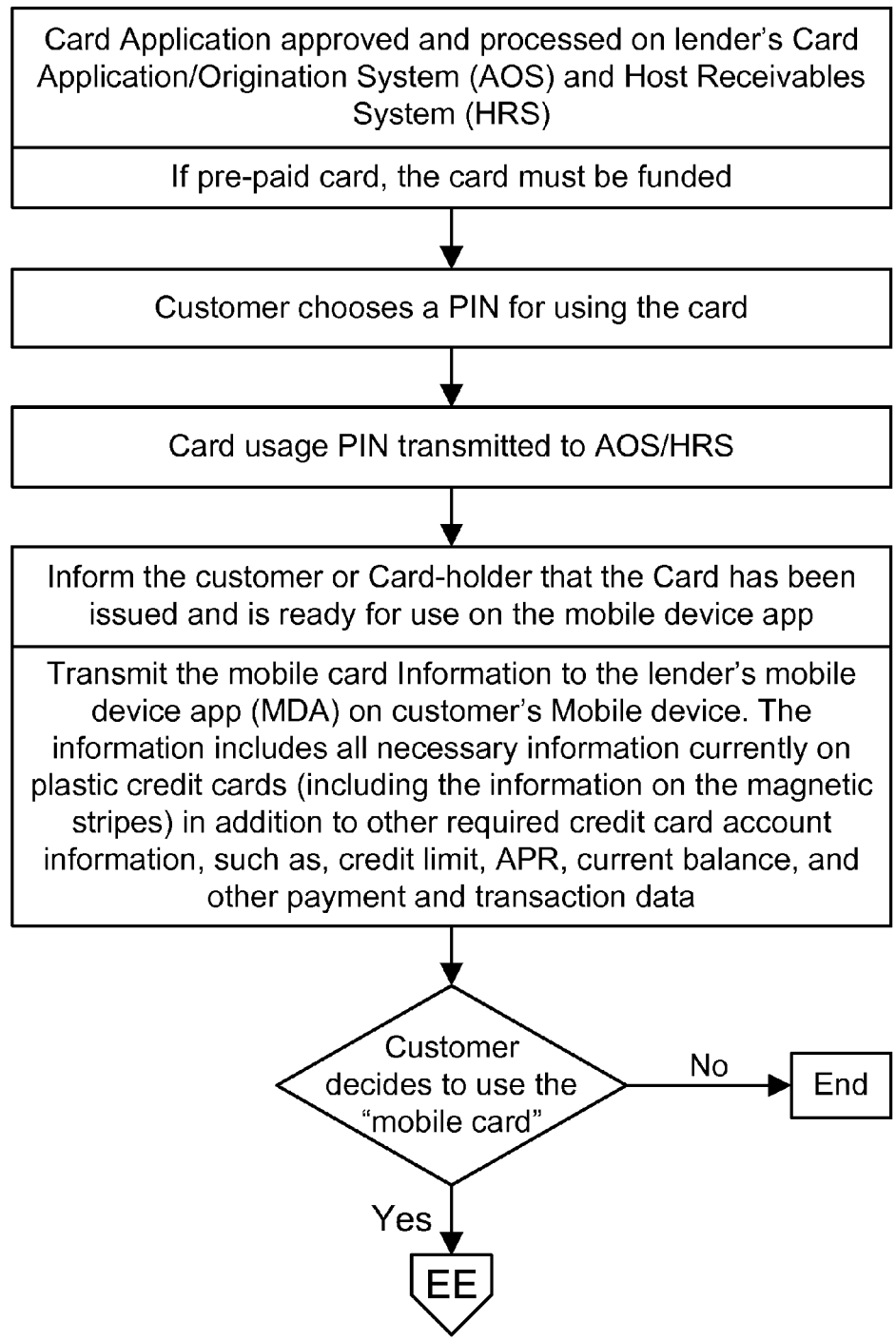
Figure 4C:
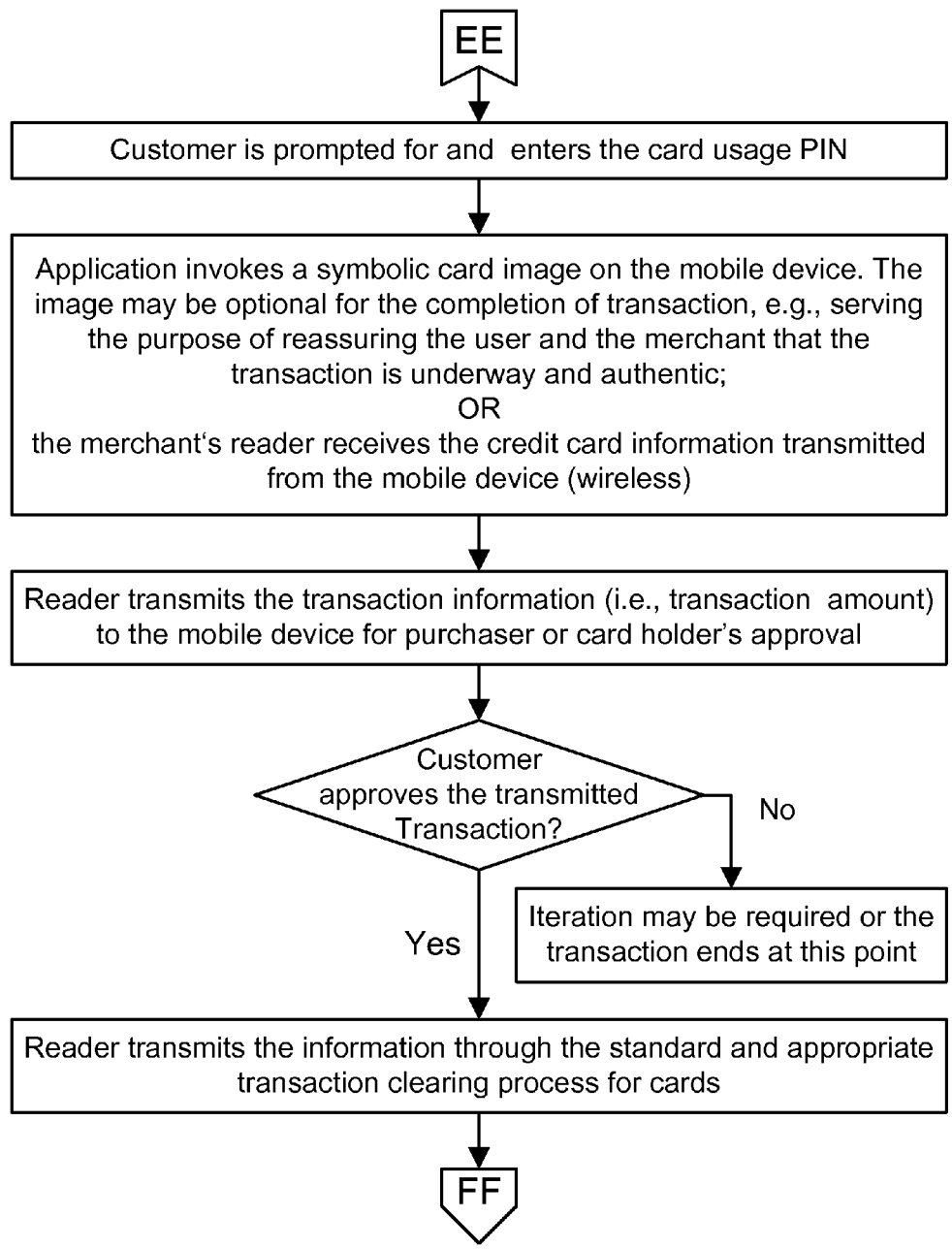
Figure 4D:
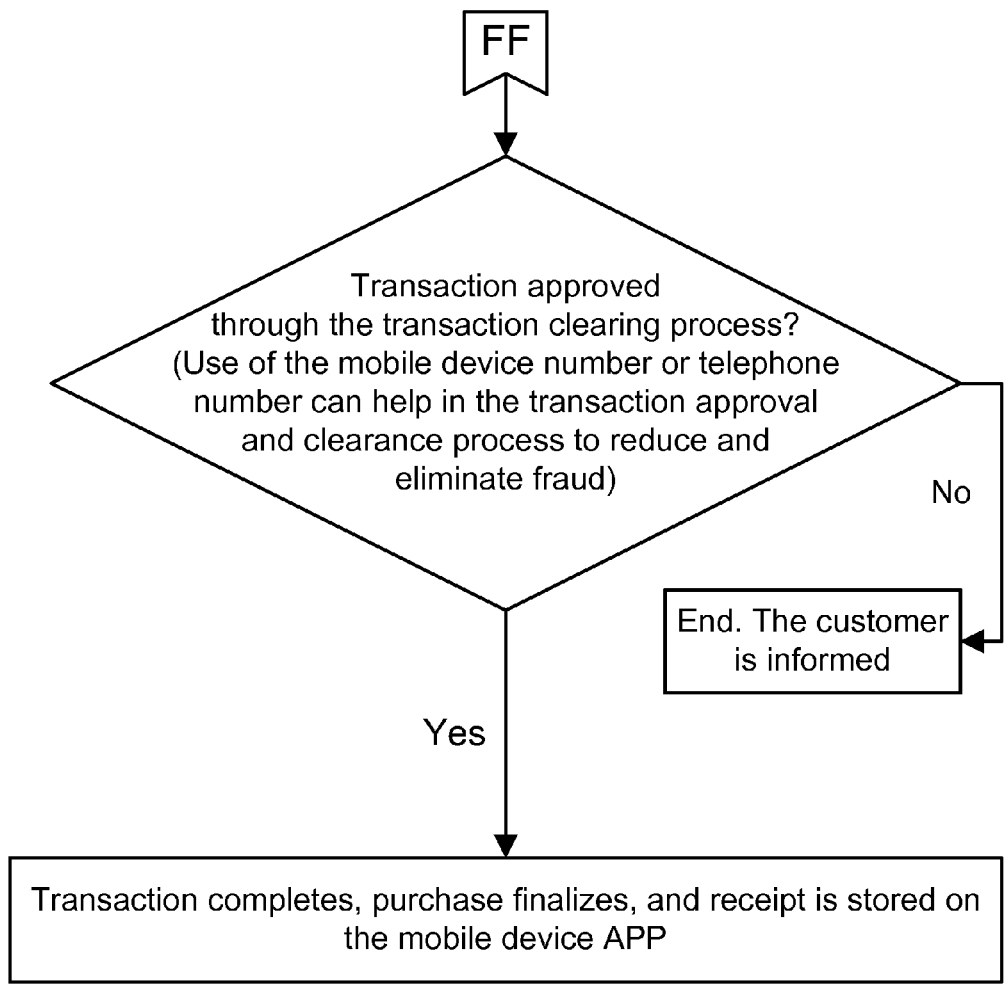

As shown in FIG. 4a, the mobile device, phone, PDA, computer, laptop, game device, GPS device, smart phone, computing or communication device, e-book reader, or electronic calendar shows the issuer information, card/account number, name, expiration date, card processor/intermediary, and other relevant card, user, and bank information, on its screen/display, which may include a 1 or 2 dimensional barcode or marker or patterns or images or symbols, for both humans and bar code reader/image scanner/camera/device/OCR (optical character recognition/reader)/pattern recognition module, to read, scan, analyze, and understand.

Figure 13:
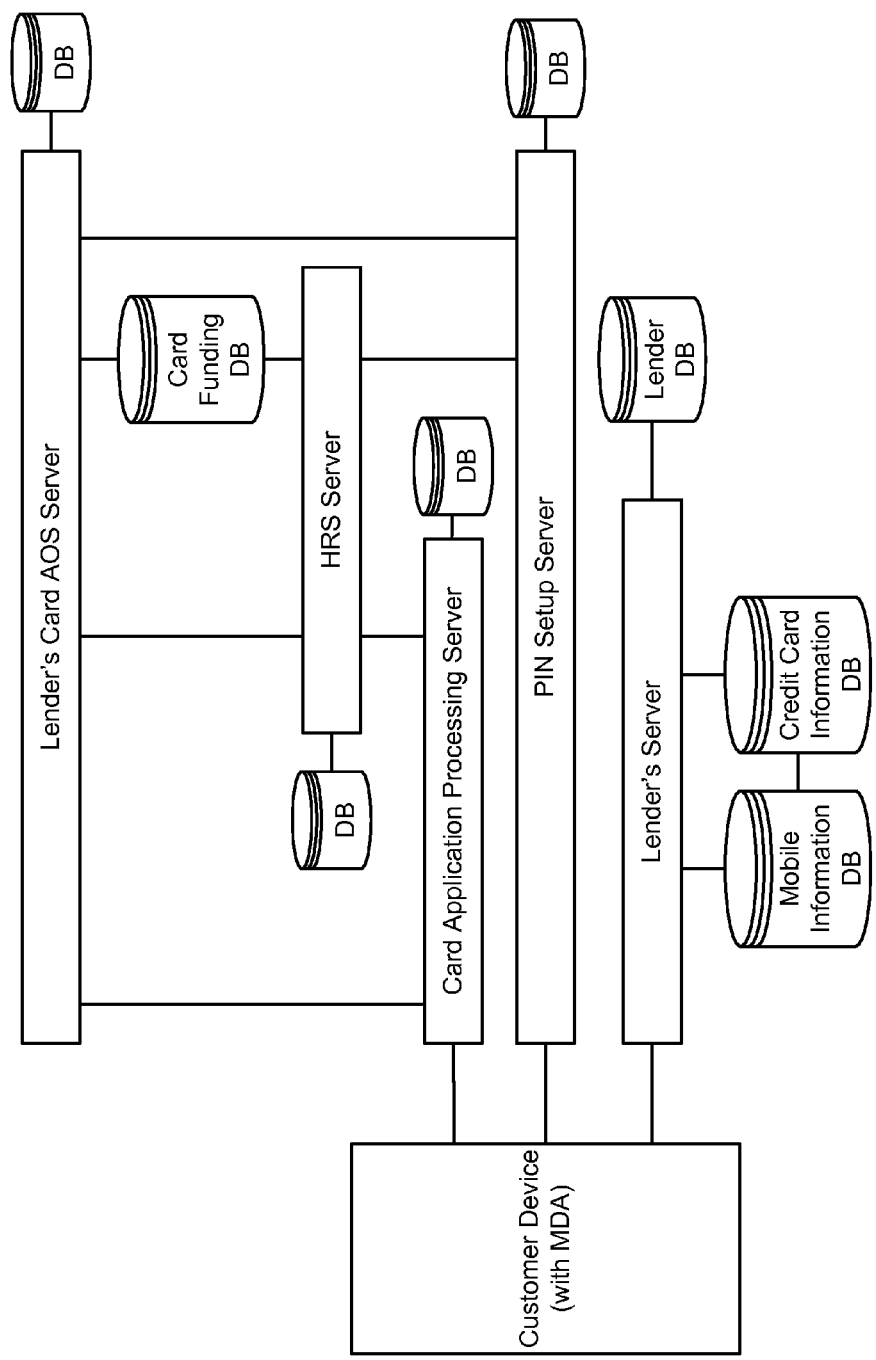
FIG. 13 shows an example of a system for Section 1.

As can be seen in FIG. 13, customer device (with MDA) is connected to PIN setup module/server/unit/device (with a DB), which is connected to lender's card AOS and HRS (with DBs). The customer applies for a card (card application), which when approved, it gets funded (if applicable). Card application processing unit/module/server is also connected to AOS and HRS servers/modules. MDA is connected to lender's server (e.g. lender's main office, with a DB), which is connected to mobile information database and credit card information database.

Pre-Selection Process on Mobile Devices for all Lending Products

This is shown in FIG. 2, FIGS. 2a-b, as an example. The lender's customer in this preferred embodiment either demonstrates interest in a specific lending product, by pushing the touch screen button (link), specific to the lending product, or is prompted by the lender on the mobile device app (MDA), if such interest exists and answers "yes" to the prompt. If a pre-selection fee exists, the customer must be notified, agree to pay the fee, and choose the preferred and available method of payment, such as credit card, or from checking account. Regardless of the means of the interest becoming known to the MDA, two possible cases exist: 1) MDA already has information on pre-selection of the customer or 2) it does not have such information. If the answer is "no", the MDA checks with the lender's internal databases and probes if a pre-selection exists for the customer, and if the answer is "yes", then the MDA retrieves the necessary information related to the pre-selection from the lender's databases.

If no pre-selection exists, either on the MDA or on the lenders' internal databases, the lender may decide to follow instant pre-selection procedures, typically used in conjunction with lender's other marketing and origination channels. Furthermore, the lender may decide to ask the customer if the customer is interested in being pre-selected and provide a list of advantages of such pre-selection. If the customer is interested in such pre-selection, then the lender will have to go through a process of obtaining such pre-selection for the customer. Lenders, in order to save development costs, typically, decide to utilize the existing infrastructure for pre-selection and leverage the current process that exists for other marketing channels. However, the lenders may decide to set up a new infrastructure specifically dedicated to the mobile channel and dedicated to pre-selections.

Depending on the extent of the relationship the lender has with the customer, lenders typically decide to use customer's existing credit and other relevant information, or decide to use and leverage third-party suppliers of credit information, or a combination of these 2 sources. Both paths and also the combined path are used here, for different embodiments. Regardless of which path or the combination of the 2 paths that the lender decides to take, customer must meet all pre-selection criteria, which can vary in their depth and scope. If the customer does not meet the selection criteria, the customer may or may not need to be notified, depending on the prevailing regulations and the lender's business practices. If the customer does meet all the criteria and a pre-selection, offer can be made, or as explained previously, a pre-selection offer already exists (that mobile device app (MDA) has access to), then the customer is notified of the availability of the offer.

If the customer decides to peruse of the pre-selection offer, the lender may want to notify the customer of the next step to take, which would be to actually apply for the lending product, described under "Lending Product Application (LPA) Process on Mobile Devices for All Lending Products" section. If the offer is generated new for the customer, and did not exist previously in lender's databases, the lender may decide to store the newly generated offer until its expiration for future reference or use.

Figure 3A:
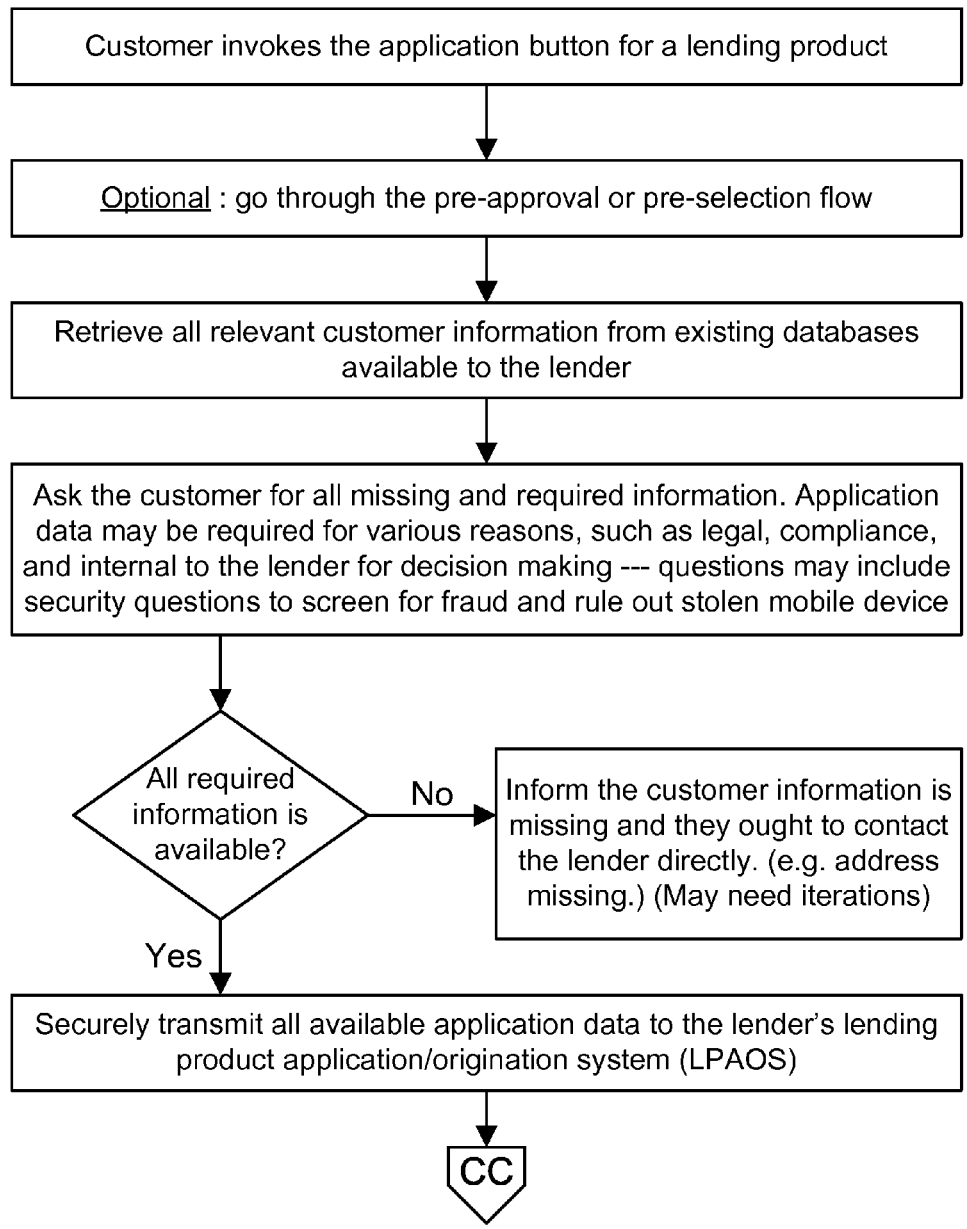
FIGS. 3a-3c show the "Application Process on Mobile Devices for All Lending Products", as an example.
Figure 3B:
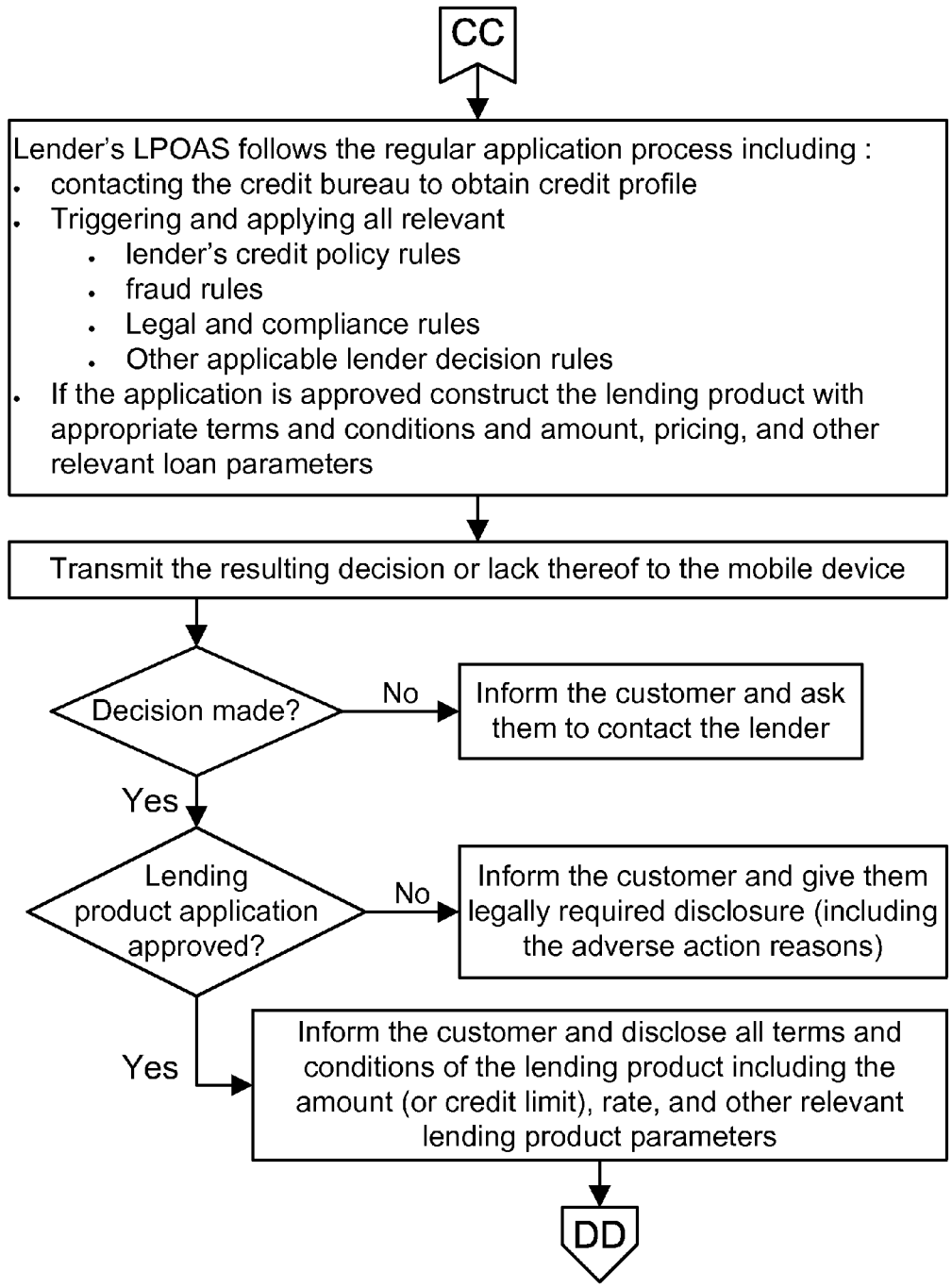
Figure 3C:
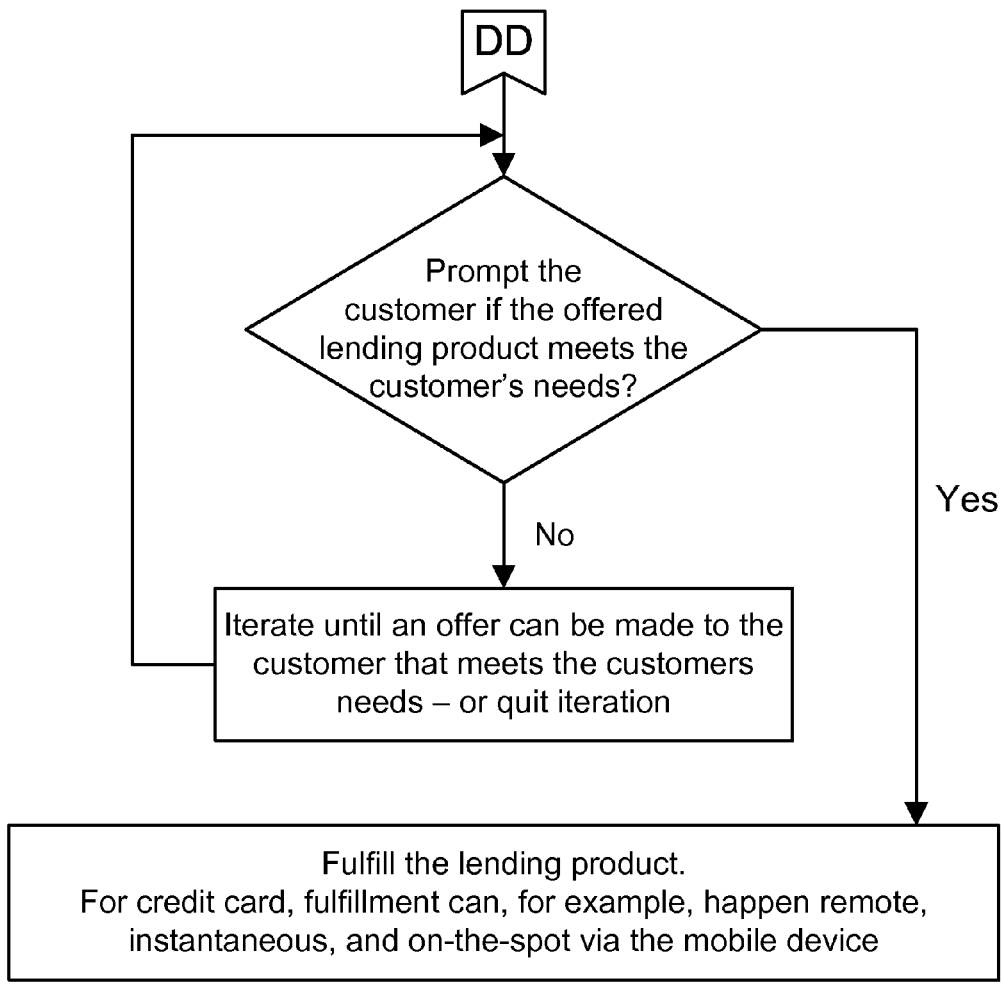

Lending Product Application (LPA) Process on Mobile Devices for All Lending Products This refers to FIGS. 3a-3c, as an example. This process typically begins by the customer invoking the touch screen button for lending product application (LPA) for the specific lending product that the customer is interested in, on the lender's mobile device app (MDA). If a lending product application (LPA) fee exists, the customer must be notified, agree to pay the fee, and choose the preferred and available method of payment, such as credit card, from checking account, or possibly added to the financed amount, if the loan is originated. Depending on the availability and a link of this process to the pre-selection process, the lender may decide to invoke the pre-selection process described under "Pre-approval Process on Mobile Devices for All Lending Products" section. (See FIG. 3a.)

Regardless of availability of pre-selection to the customer, at this point, for existing customers, MDA needs to access lender's internal databases, to retrieve all relevant information, or alternatively, have the internal systems of the lender determine which data fields are missing that the customer needs to provide. (See FIG. 3a.) Regardless of where those missing fields are determined (the MDA or lender's internal systems), the MDA needs to have access to those required and missing fields. If the customer has co-borrower(s), the same information for those individuals must be either retrieved from the internal databases or provided by the customer. To minimize fraud, the lender may decide to allow co-applicants on for the lending product application (LPA) process to only customers that have a deep relationship (e.g. with many accounts and many years, and at good standing in all of them) with the lender, or where a relationship between the customer and the co-applicant(s) already exists and recorded in the lender's internal databases. A list of possible fields needed for an application is provided in FIG. 5. This list, however, is not complete and varies depending on the lender's requirements (just serves as an example). Based on all the information the MDA has access to, if there are missing fields, the MDA needs to prompt the customer to provide those missing fields. (See FIG. 3a.)

Once all the pieces of information needed for the lending product application (LPA) are obtained, the lender's lending product application/origination system (LPAOS) must receive the information and process the lending product application (LPA), as it does other lending product applications (LPA) coming through other channels. (See FIG. 3a.) LPAOS are typically very complicated systems with a number of integration and link ports to other systems and databases.

In this embodiment, we assume the lender leverages the lender's existing LPAOS, to process the lending product applications (LPA). However, the lender may decide to implement a simplified or duplicate LPAOS specific to the lending product applications (LPA) for mobile channel either on lender's internal systems or on the MDA itself. However, given the expenses involved in setting up such systems, this embodiment may not be most lenders' first choice, in some situations. The LPAOS processes all the information and data fields provided for the lending product application (LPA) and retrieves incremental required information from third party sources (such as, but not limited to, credit bureau reports from credit bureaus). The LPAOS then triggers and applies all the encoded lending rules to the information that may relate to lender's own credit policy, fraud prevention, legal, compliance, or other applicable rules. (See FIG. 3b and FIG. 12.) The lender also may decide to treat the pre-selected offers more favorably. As part of processing the lending product application (LPA), if applicable, the LPAOS will construct a suitable product based on customer's requirements and needs and the lender's own credit and other criteria. Such product construction includes at the minimum relevant terms and conditions, loan amount or credit limit, other applicable fees, and also pricing (rate of the lending product). (See FIG. 3b and FIG. 12.)

Figure 12:
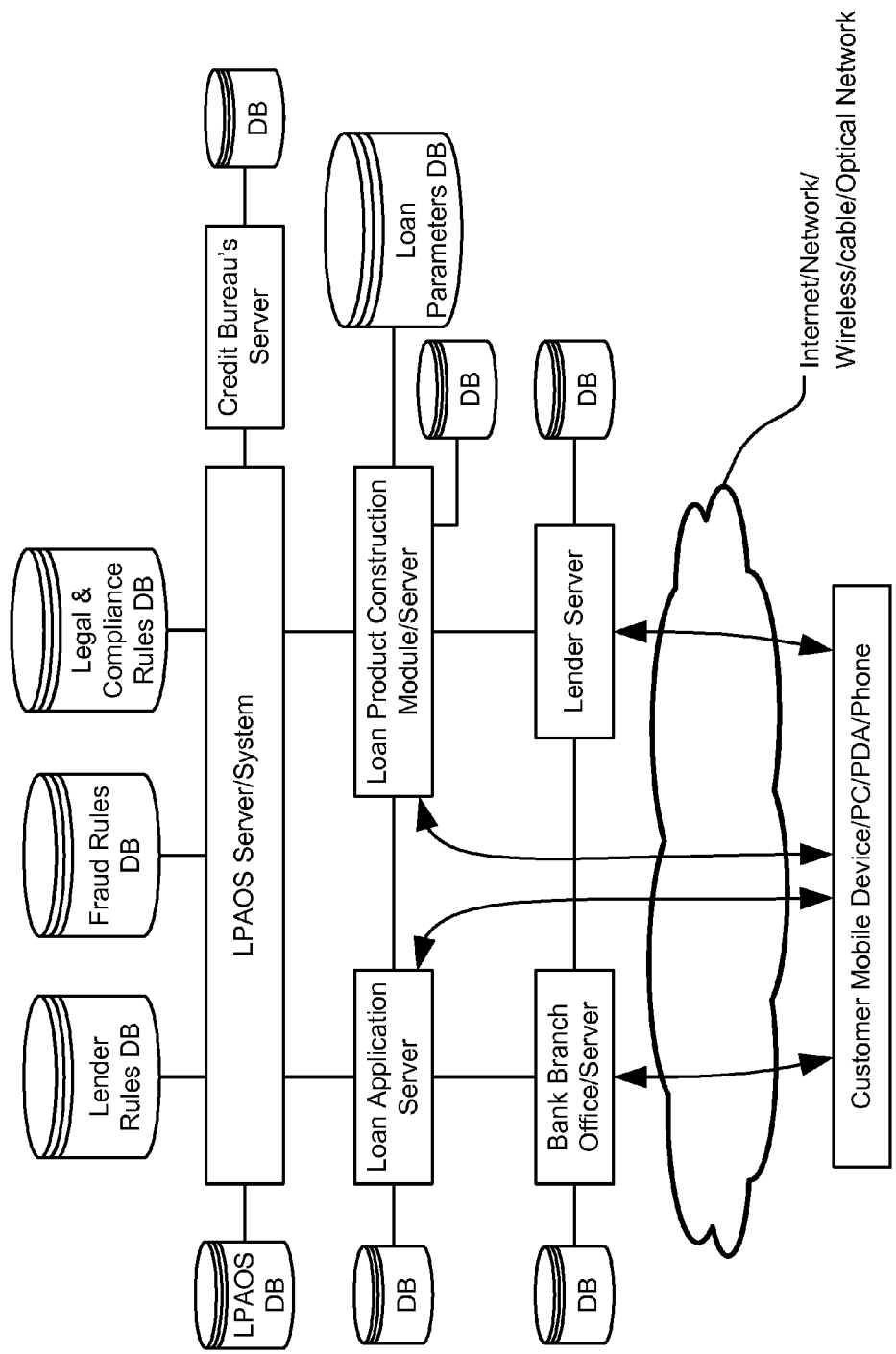
FIG. 12 shows an example of a system for Section 1.

As can be seen in FIG. 12, different rule databases and credit bureaus supply information to LPAOS (which has a DB or database), which constructs the loan products based on loan parameters (in the database, table, list, or formulas), to notify and inform the customer and lender's main office, for a loan application applied for, through/at the local bank branch, customer's mobile device or PC, bank remote terminal/ATM machine or kiosk in the mall, bank server, Internet, web site, secure network, private network, or wireless network/carrier/tel. company/service provider/network company/cable company, directly or indirectly.

Once the lending product application (LPA) process on the LPAOS is complete, the LPAOS then transmits the results to the MDA. (See FIG. 3b.) If a decision cannot be made, given the information that the customer has provided and the lender has access to, the customer is notified and informed of potential next steps to take, such as, but not limited to, contacting the lender via phone or other channels. If, however, a decision has been made and it is a decline or rejection of the lending product application (LPA), the customer must be notified and given adverse action reasons. (See FIG. 3b.) Depending on legal requirements, such notices may have to be sent in writing to the customer and all co-applicants. Such notifications may be also required in case of counter-offers (loop or iteration process, repeating those steps again). (See FIG. 3c.) If the decision is an unconditional approval, the customer is informed of the decision and the terms of the offered lending product and furthermore is advised of the next steps in the fulfillment process. (See FIG. 3c.) Same is true about conditional approvals, with the exception being that the lender needs to inform the customer of all applicable conditions of the lending product. (See FIG. 3b and FIG. 3c.) Similarly, for lending product counter-offers, notice is sent to the customer, including all the applicable terms and conditions.

Once the offer is presented to the customer, the MDA will prompt the customer if the lending product meets the customer's needs. If "yes", then the information is transmitted back to the lender's internal systems (for example, LPAOS). If "no", the MDA may have to offer to the customer choices of parameters that can be changed in the loan. As an example, the term of the loan may be changed from 5 years to 6 or 4. As another example, the customer may want to increase the amount the customer had requested earlier for the loan from, say, from $25,000 to $30,000, since e.g. the customer wants to buy and finance a more expensive vehicle. The MDA may, for example, in the case of different loan durations, determine the monthly installment payments for those scenarios and ask the customer to choose one. In some circumstances, the decision whether or not to offer the lending product with the newly selected parameter(s) must be made on lender's internal systems (such as, LPAOS). In other embodiments, enough coding has been done on the MDA, where the decision can be made locally by the MDA. Iterations may be needed until the customer is satisfied with the product, in a logical loop, for repeating the same process, until the loop is exited.

In all embodiments, the lender may decide to offer the customer to save an application, to return to it later. Also, if the customer needs to change certain parameters later on, the MDA will have to accommodate for such changes, by letting the customer retrieve the application or the approval/counteroffer, and let the customer work with it and change those parameters, if necessary.

Finally, the customer is ready to fulfill the lending product. See "Mobile instantly generated credit/debit/prepaid card fulfillment and usage" section for instant fulfillment of the application of specific lending products. For all other lending products, the customer may have to be advised to follow steps that require other (e.g. non-mobile) channels.

More on "Mobile Instantly Generated Credit/Debit/Prepaid Card Fulfillment and Usage" Section:

Please refer to FIGS. 4a-d (FIG. 4), as an example. This embodiment relates to the first-time use (corresponding to a wireless mobile issuance) and future uses of credit card, debit card, and pre-paid card (collectively referred to as "Card") on a mobile wireless device via a lender's app (referred to as mobile device app—MDA). An embodiment of this invention can function under various scenarios where (1) the mobile device app is the sole (and by default the first) method of usage of the Card, (2) the first and one of various methods of usage, (3) one of the various but not the first method of usage, and (4) where multiple mobile devices are means of usage.

Regardless of whether or not other devices and means are used for fulfillment and usage of the Card, in order for the lender to grant permission for a customer to use a mobile device for the first time as the method of usage for the Card, the lender and the customer must establish security measures to prevent fraud. This step may involve establishing one or more of the following measures: personal identification numbers (PINs), passwords, and security questions and answers. One or more of the same verification methods may be used in the future verification of future uses of the credit on the mobile device, along with the identifying numbers of the mobile device (such as phone number, identification serial number, or the SIM card number). The security information must be transmitted from MDA to the lender's host receivables system and/or servicing systems (and any other system that such information is housed in).

If the Card requires prefunding (for example, for pre-paid cards), the funding must have taken place prior to the first time issuance or fulfillment and usage on the MDA. Such funding can be typically done with a check, or link to a checking or savings account.

At this point in time, the Card information required for conducting business, purchasing, and transferring cash is transmitted to the mobile device app (MDA), and the customer is informed that the Card is ready for use.

The remainder of this section discusses the case where a user wishes to use the MDA to actually make a purchase with the Card inside a store. MDA prompts the customer to provide the required security information that was entered in the previous steps of setting up the Card within the MDA. Once the security information has been verified, an image illustrating the ongoing credit card transaction pops open on the mobile device screen. The image can display a Card with all the relevant information that typically is displayed on a plastic Card, plus potentially additional fields on the back of the card (such as the extra 3- or 4-digit security code). A dial-button may be required to prompt the customer for the mode of transaction that will take place: 1) in-store, 2) online, or 3) cash withdrawal. Once the customer chooses the in-store mode of transaction, the MDA and the merchant's reader are ready to resume the transaction via conventional wireless communications, such as but not limited to, NFC (near-field communications). One of the optimal ways for the transaction to transpire is for the reader to send the relevant transaction information to the MDA exhibiting the merchant's name, the transaction amount, and potentially the details of the invoice (such as, the name of the purchased item). Once this information is shown on the screen of the MDA, the customer (Card-holder) can decide to accept or reject the transaction. This way, if more than one Card transaction is transpiring with multiple Card-holders, the correct transaction connects with the right MDA. Another embodiment of the system to address this issue would require that we have a queuing of the transactions, so no 2 wireless transactions occur simultaneously, leading to erroneous results. Multiple iterations may be required to finalize the merchandise or service being purchased and the transaction amount.

In yet another embodiment of the system, once the Card information is transmitted to the reader, the remainder of the transaction, such as additional verification (e.g., providing Zip code) or signature on the reader or paper slip, can transpire, as per existing processes set up for plastic Cards. This specific embodiment will reduce the production expenses both for the mobile device app (MDA) and the merchant's card reader.

Once the customer approves the transaction, MDA transmits the information to the merchant's reader and the reader transmits the information further through the regular and standard transaction clearing channels that Card transaction ordinarily are cleared through. Two clear cases emerge here. First, if the transaction is approved, the transaction concludes by the merchant receiving the payment information and the customer receives the merchandise and an electronic or digital copy of the invoice or receipt is stored on the MDA for future reference for the customer. If the transaction is rejected, either the vendor can inform the customer or the MDA can actually provide more descriptive details about the decline reasons. For example, the MDA can inform the customer that there is suspicion of fraud and the customer needs to contact the lender immediately if the customer wishes to conduct the transaction with the MDA Card right away. Or, the MDA can provide specific over-limit information to the Customer, for example: "The current remaining open line on the credit card or the available funding on the pre-paid card is $235, and the transaction amount is $340". This kind of error message is not available to plastic card users. Thus, it is more informative and more advantageous for the user and all other parties involved.

Note that FIG. 5 is an example of a list of selected variables potentially required for specific lending products, as to the teaching given above. The "Application Process on Mobile Devices for All Lending Products" refers to FIGS. 3a-3c, or FIG. 3, as an example. FIGS. 4a-d (FIG. 4) refer to "Fulfillment and Usage Process on Mobile Devices for Credit/Debit/Pre-Paid Cards (collectively referred to as Cards)" process, as an example. FIG. 1 shows "General Schematic for Lending in Consumer Financial Products", as an example. "Pre-Selection or Pre-Approval Process on Mobile Devices for All Lending Products" is shown in FIG. 2 (FIGS. 2a-b), as an example.

Please note that FIG. 11 shows an example of a system for implementing method of FIG. 2. Similarly, FIG. 12 refers to FIG. 3, and FIGS. 13-14 refer to FIG. 4.

Figure 15:
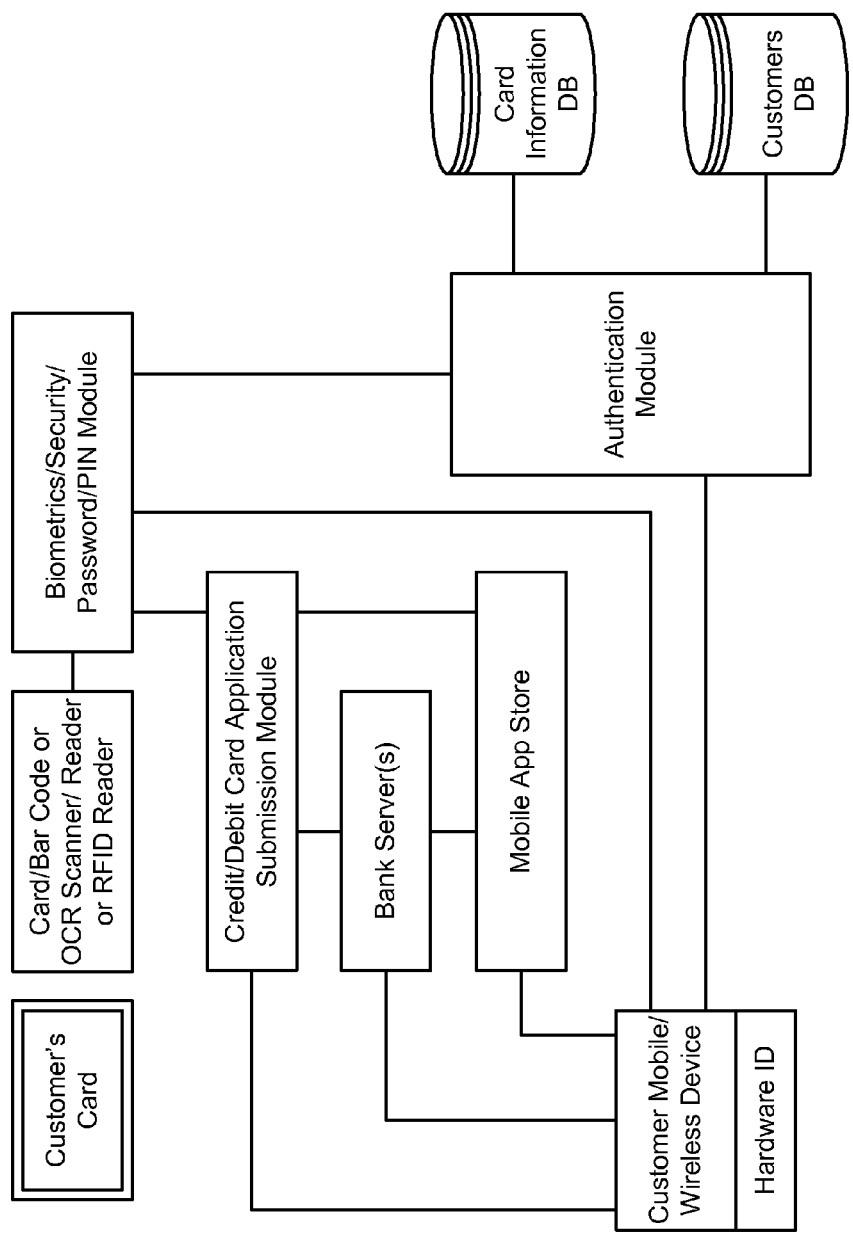
FIG. 15 shows an example of a system for Section 1.

An Embodiment for Mobile Phones:

Let's look at FIG. 4a, as well as FIG. 15, as a guide for this embodiment. Here, we deal with a mobile smart phone instantly generated credit/debit/pre-paid card application (mobile device application or MDA). The financial institution application is loaded on the phone set, with buttons or menu on the screen, to choose between "credit card" or "debit card" options, as an example. Then, a security module or password is invoked to verify the user. Then, the screen of the smart phone, e.g., displays financial institution information, plus bar code or 2D bar code, name of card holder, credit card number, and expiration date, among other useful information.

Thus, the steps are:
The user goes to the application of her bank, on her smart phone.
She invokes the button for "credit card" or "debit card".
If there are more than 1 Card to select from, in cases where the customer has multiple cards with the lender, the customer is given the option to choose one to use.
An application generates the image of the specific card selected, with all the necessary information for the reader to read, e.g. OCR or scanner or bar code reader.
A specific reader reads the information, matches against the database, and charges the credit/debit accounts, accordingly.
To prevent fraud/reduce the fraud, the application matches, for example, the phone number and hardware ID number against the ones on the record for the account.
One can also implement a passcode/PIN, for security.

One can also extend this concept to prepaid cards, with an extra step of purchasing the card. The consumer wants to obtain the card fast, with no preapproval needed, to get some dollar amount from e.g. her bank checking account, which can be refilled later. That is, e.g., the customer initially has to purchase and fund the card with money from her checking account. Later on, for future uses, the card is produced as an image, and available dollar amount is displayed, as well.

The application for the credit card can be integrated into the whole process of invoking the card for display on the phone and immediate usage by the customer. Once the customer applies for the credit card, the bank goes through its normal process of underwriting and origination, and once approved, the card is displayed with the available credit limit to the customer, who can invoke the card, as explained above.

This is a big value for customers and banks, since the application, issuance, and usage become simultaneous, and the customer does not have to wait for the card to arrive in the mail, once they apply for it. They can also use that for on-line purchases.

As shown in FIG. 15, the customer's device (with a hardware ID, e.g. SIM card ID number, for cell phones), first, contacts mobile App Store, for proper software. Then, it applies for a credit/debit card application, which goes through authentication, using biometrics and other security information (e.g. password, picture, PIN, or signature), to be added to the customers' list/database. The customer's card or badge or chip, through barcode reader, RFID reader, card reader, magnetic reader, scanner, reader, OCR, laser scanner, pattern recognition scanner/analyzer, or optical reader, is connected to the biometrics/security module/device/apparatus/subsystem.

Section 2: Financial Products for Protection of Consumers

In this section, we are going to address the following embodiments (as referenced in FIG. 16, as an example): "Financial Products for Protection of Consumers, against Increasing Interest Rates in Variable and Adjustable Interest Rate Products".

Presently, a number of products provided by lenders to consumers have variable or adjustable interest rates that reset periodically based on a variable rate interest rate index, such as:

11th District Cost of Funds Index (COFI)
London Interbank Offered Rate (LIBOR)
12-month Treasury Average Index (MTA)
Constant Maturity Treasury (CMT)
National Average Contract Mortgage Rate
Bank Bill Swap Rate (BBSW)
PRIME or Prime rate Should these rates increase over time, the consumer may be exposed to an undue hike in their payments. As an example, let's say a consumer has $6,000 on their credit card account that charges PRIME+6%. Presently, PRIME is at 3.25%, making the minimum required monthly interest payment equals to approximately $6,000×(9.25%/12)=$46.25. Should PRIME double to 6.5% (in other words, increase by 3.25%), over time or perhaps in a short period of time, the payment will go up to $6,000×(12.5%/12)=$62.5, corresponding to a 35% increase in interest payment. The annual increase in the interest payment is $195, which is a relatively large increase for a consumer.

Another example would be an adjustable rate home equity line of credit (HELOC) that will reset with a LIBOR benchmark. HELOC accounts are interest-only for a fixed period of time. If the balance is $50,000 with 1-Year LIBOR currently at 1%, for example, and a spread of 4%, then it requires the borrower to pay $208 per month in interest-only payments. Should LIBOR increase to 4%, for example, the monthly payment will increase by 60% to $333. Clearly a shock to the borrowers is present. Due to elevated levels of interest rate and the consumer's potentially worse credit situation, refinancing at the end of the fixed term can also be challenging for the consumer, should the rates increase at the time of refinancing.

Current Offerings

Presently, a number of products, such as credit cards, provide no protection at all, where the cap of the interest rate is set by state usury laws, if any. Other products, such as most home equity lines of credit, provide a one-time option to the borrower to lock the fixed rate at that point in time where the fixed rate is so much higher that precludes the borrower from protecting themselves from upward movements in interest rates.

Our Invention, to Solve the Problem Above

Lenders offer the financial product proposed in this invention to borrowers of floating, variable, or adjustable interest rate loans, lines of credit, or other forms of borrowings that are benchmarked against an index as outlined above. The product provides an option to secure fixed rate financing (at a predetermined rate, which is fixed, known, and agreed upon, from the beginning) for a given balance of the debt financing (be it all or part of the actual borrowing), for a fee or as part of originating and servicing the loan offering. The following table outlines the features of this product and the types of loan it can apply to, as one embodiment:

For example, Table 1 shows the Underlying Lending Product:

Underlying Lending Product

| | |
|---|---|
| Collateral | Any or none, including real-estate (in other words for both secured and unsecured lending) |
| Lien Position | First, second, or any other and in case of unsecured lending (none) |
| Term | Term of the loan or the line of credit |
| Credit type | Installment or revolving credit |
| Payment type | Straight amortizing, interest only, or negative AM (amortization) |
| Interest rate | Floating, variable, or adjustable (not fixed) (e.g. prime + delta) |

For example, Table 2 shows the Interest Rate Option Product:

Interest Rate Option Product (IROP)

| | |
|---|---|
| Term | As agreed upon between the lender and borrower but up to the term of the loan (see above) |
| Fixed rate | As offered by the lender and accepted by the borrower - depends on the product pricing |
| Balance | 1. As per customer demand or<br>2. The outstanding balance on the account<br>3. Not to exceed the credit limit on the revolving products (provisions in the product offering may have to be made, if the credit limit is increased during the term of the IROP). |
| Remuneration (Pricing Options) (4 ways to pay, by consumer) | 1. One-time upfront payment<br>2. Increase in the Interest Rate of Underlying Lending Product<br>3. Offered part and parcel to the Underlying Lending Product offering by the lender<br>4. Financed as part of the financed amount, e.g., charged to the credit card |
| Main Feature | The customer has the option to refinance the Balance of the Underlying Lending Product at the Fixed Rate any time before the Term of IROP expires in exchange for the Remuneration |
| Termination | Can be at<br>1. The end of the Term of the Interest Rate Option Product or<br>2. The end of the Term of the Underlying Lending Product or<br>3. The unscheduled or early full pre-payment of the Underlying Lending Product or<br>4. The default or delinquency of the borrower<br>5. The option of the borrower to end the Interest Rate Option Product |

For example, Table 3 shows the table shown above for Credit Card example:

Underlying Lending Product - Credit Card

| | |
|---|---|
| Collateral | None |
| Lien Position | None |
| Term | None - except for the expiration of card (2 years from now) |
| Credit type | revolving credit with a credit limit of $10,000 |
| Payment type | Interest only + a minimum principal payment of 1% |
| Interest rate | PRIME + 6.5% |

For example, Table 4 shows the table shown above for Credit Card example:

Interest Rate Option Product - Credit Card

| | |
|---|---|
| Term | 1 Year |
| Fixed rate | 12% |
| Balance | For example, the lower of $6,000 as per customer demand (but not to exceed $10,000) or the outstanding balance of the card as per statement |
| Remuneration (Pricing Options) | 0.5% increase in the rate = $6,000 × 0.5%/12 per month = $2.5 (option 2 in Table 2 above) |
| Main Feature | The customer has the option to refinance the $6,000 at 12% any time before the 1-year period expires |
| Termination | Earlier of<br>1. 1 year from the date of the purchase of the option<br>2. Date when customer wishes to cancel the option<br>3. The default or delinquency of the borrower |

For example, Table 5 shows the table shown above for Home Equity Line of Credit (HELOC) example:

Underlying Lending Product - HELOC

| | |
|---|---|
| Collateral | Real-estate property (single unit family house) |
| Lien Position | Second |
| Term | 10 year revolving |
| Credit type | revolving credit with a fixed limit of $75,000 |
| Payment type | Interest only with no required principal payment until the end of the term |
| Interest rate | PRIME + 1.0% |

For example, Table 6 shows the table shown above for Home Equity Line of Credit (HELOC) example:

Interest Rate Option Product

| | |
|---|---|
| Term | 1 Year |
| Fixed rate | 7% |
| Balance | Customer or borrower chooses to acquire the option for $50,000 of the credit limit |
| Remuneration (Pricing Options) | $1,000 upfront fee that can be financed by tapping into the credit line (Options 1 or 4 in Table 2 above) |
| Main Feature | The customer has the option to refinance up to $50,000 of borrowings on the line at 7% any time before the 1-year period expires |
| Termination | Earlier of<br>1. 1 year from the point of purchasing the option<br>2. Date when customer wishes to cancel the option (the lender may refund a pro-rated or non-pro-rated portion of the remuneration mentioned above)<br>3. The default or delinquency of the borrower |

Therefore, a consumer has a safety net and sense of security against the large increases in the monthly payments, which is very attractive to the consumers. Therefore, for a bank or financial institution offering such a financial product and offering, the bank or financial institution can distinguish itself from the rest of its competitors, thus, increasing its customer base drastically, causing growth and more profitability in its business.

This helps consumers hedge against unexpected increases in interest rates and monthly payments that they may not be able to afford, so that they can lock at some threshold or maximum, as a worst case scenario, for a peace of mind for consumers, as a pre-determined situation (s) that is predictable and more comfortable/manageable/affordable for a consumer. This also helps reduce bankruptcy and foreclosures or forced auction of the house, for example, which is very costly for banks and consumers, with no delays at courts and less uncertainty for all parties involved.

Figure 16:
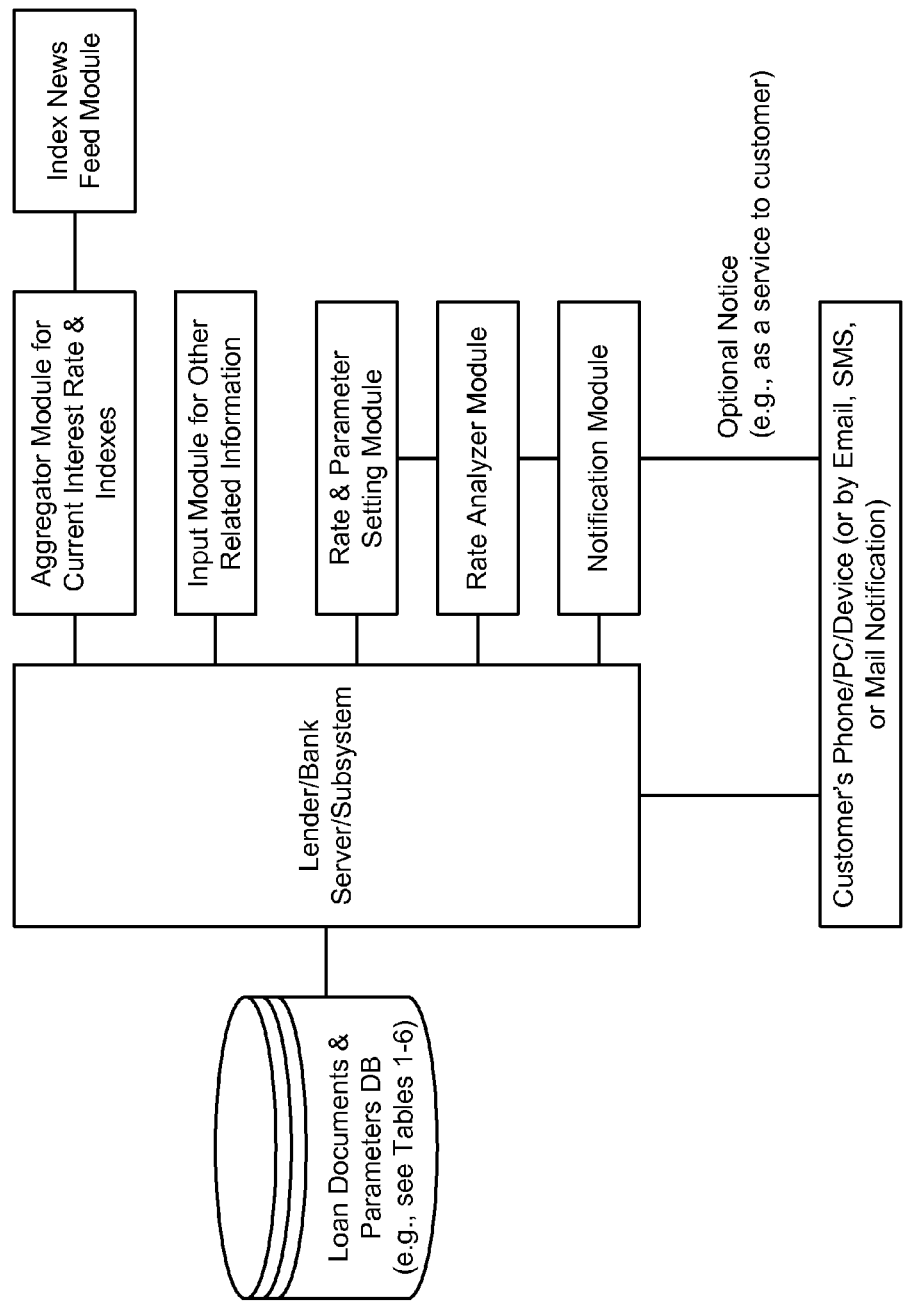
FIG. 16 shows an example of a system for Section 2.

Currently, such a product does not exist for individuals, e.g. credit cards or home equity line of credit. This will protect consumers greatly, and also will reduce the risks and expenses for the banks Please note that each of Tables 1-6 show only examples of this embodiment. The data structure shown on those Tables are typical parameters needed for implementing this invention. Also, please refer to FIG. 16, for a system implementing and using such a data structure and parameters. Please note that FIG. 17 refers to the system when consumer or customer initially decides to get/apply for the original loan from the lender, bank, card company, or financial institution, as an example. However, FIG. 16 refers to an example of a system when some time in the future, an "interest rate event" (or other events) happens that triggers one or more provisions of the original contract or loan agreement (as mentioned above), so that the interest rate (e.g.) gets adjusted accordingly, based on the original contract or loan agreement provisions. The initial trigger can come from the customer herself, to initiate or request or demand such an interest rate event, as shown in FIG. 16. The interest rate event can also start based on an outside parameter, monitored directly by the lender, without consumer intervention or input or knowledge.

As shown in FIG. 16, the lender gets the parameters from the original loan document, with market index feed from an aggregator, plus other relevant information about economy/forecasts/analysis, to analyze and set or calculate the interest rate, for the next phase of the loan, which can optionally notify the bank customer, about her loan.

Figure 17:
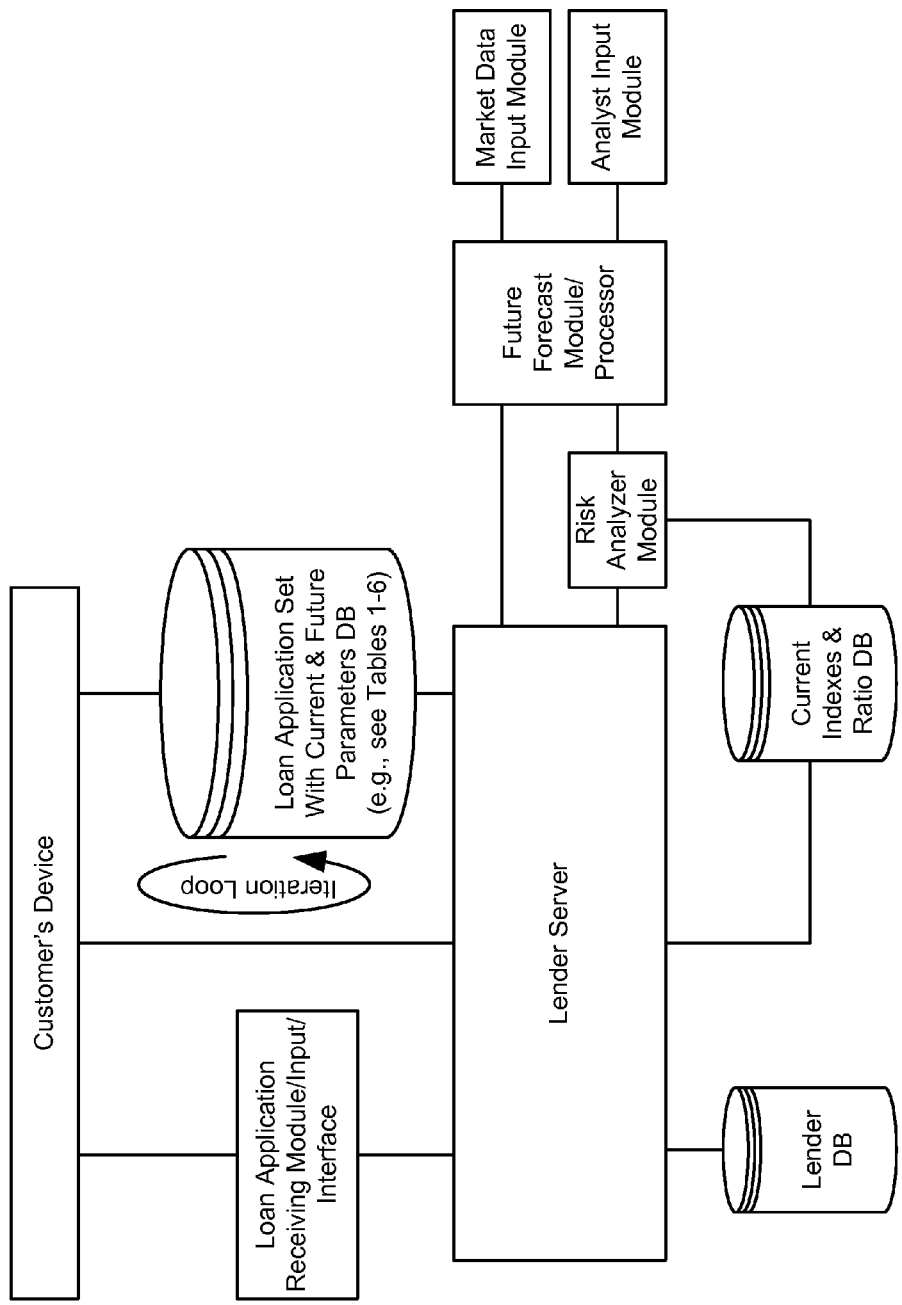
FIG. 17 shows an example of a system for Section 2.

As shown in FIG. 17, the consumer applies for a loan from a lender, which uses the current indexes and rates database. The lender evaluates the risk, using the interest rates futures and forecasts (e.g. from analysts and market data). Then, the lender constructs the lending product set with current and future parameters database, regarding current and future rates, in case of "interest rate triggering events", if applicable and/or exercised by the consumer. The interest rate triggering events refer to conditions and events/time periods in which they satisfy the provisions of the original loan agreement/contract/apparatus/product, so that the rate is adjusted automatically, or based on the consumer's option/request/demand, and upon such request by consumer or original borrower, without refinancing or renegotiating the loan terms in the future. (e.g., see Tables 1-6 for various loans/instruments/products.) The result goes back to the consumer device, and can be iterated/looped back, for offer/counteroffer/re-offer/adjustment on terms/requests, between lender and consumer/customer.

A Note on the Interest Rates:

The stepwise rate reduction for fixed term installment loans, as an example, can be discussed as follows (e.g. please refer to FIG. 17). Let's assume:

We assume monthly payment, but it can be extended to biweekly or semi-monthly loans, too. This is a conventional calculation, available from many sources, e.g. Internet or Wikipedia or Mathforum.org:

T=term in months
r1=initial annual APR
r2=secondary annual APR
K=period after which the interest rate is reduced from r1 to r2
M=payment, e.g. M1 and M2
P=principal, e.g. P0
Then, we have, based on the initial principal, P0:

$$M_1 = \frac{P_0 \times r_1}{12 \times \left(1 - \left(1 + \frac{r_1}{12}\right)^{-T}\right)}$$

After K payments, we have:

$$P_1 = \left(P_0 - \frac{M_1 \times 12}{r_1}\right)\left(1 + \frac{r_1}{12}\right)^K + 12 \times \frac{M_1}{r_1}$$

$$M_2 = \frac{P_1 \times r_2}{12 \times \left(1 - \left(1 + \frac{r_2}{12}\right)^{-(T-K)}\right)}$$

(if (r2<r1), then (M2<M1)), meaning that, without changing T, the original term of the loan, if we reduce the interest rate, the resulting installment payment will decrease.

As explained in this Section (above), this product is useful for people with little or no credit history, or poor credit history, so that they can build their credits back, and later reduce their rates, by moving from high risk category to low risk category, when performing as a reliable customer for a specific predetermined period of time, but without any new application for loan or any new approval, as long as the predetermined conditions (mostly related to timely payments) are met. This gives a chance to a person with no or bad credit history to rebuild or build a good credit, and get some benefit immediately, based on a loan approved and originated, e.g., years ago, which is a contract or agreement capturing those provisions at the beginning, e.g. many years ago.

Moving from high risk category to low risk category happens when, e.g., the person has had a good payment pattern, with no delinquencies, or the person has an improved credit profile, or the person now has a longer employment history (that may have to be verified).

The whole concept above may be non-contractual, as well. In other words, it can be an option for the lender to lower the rate, or prescriptive, according to a set of criteria, e.g. FICO score above 660, or no more than 2 delinquencies, or no delinquencies at all with the lender or any other lenders.

Section 3: Relationship-Based Score

Figure 18A:
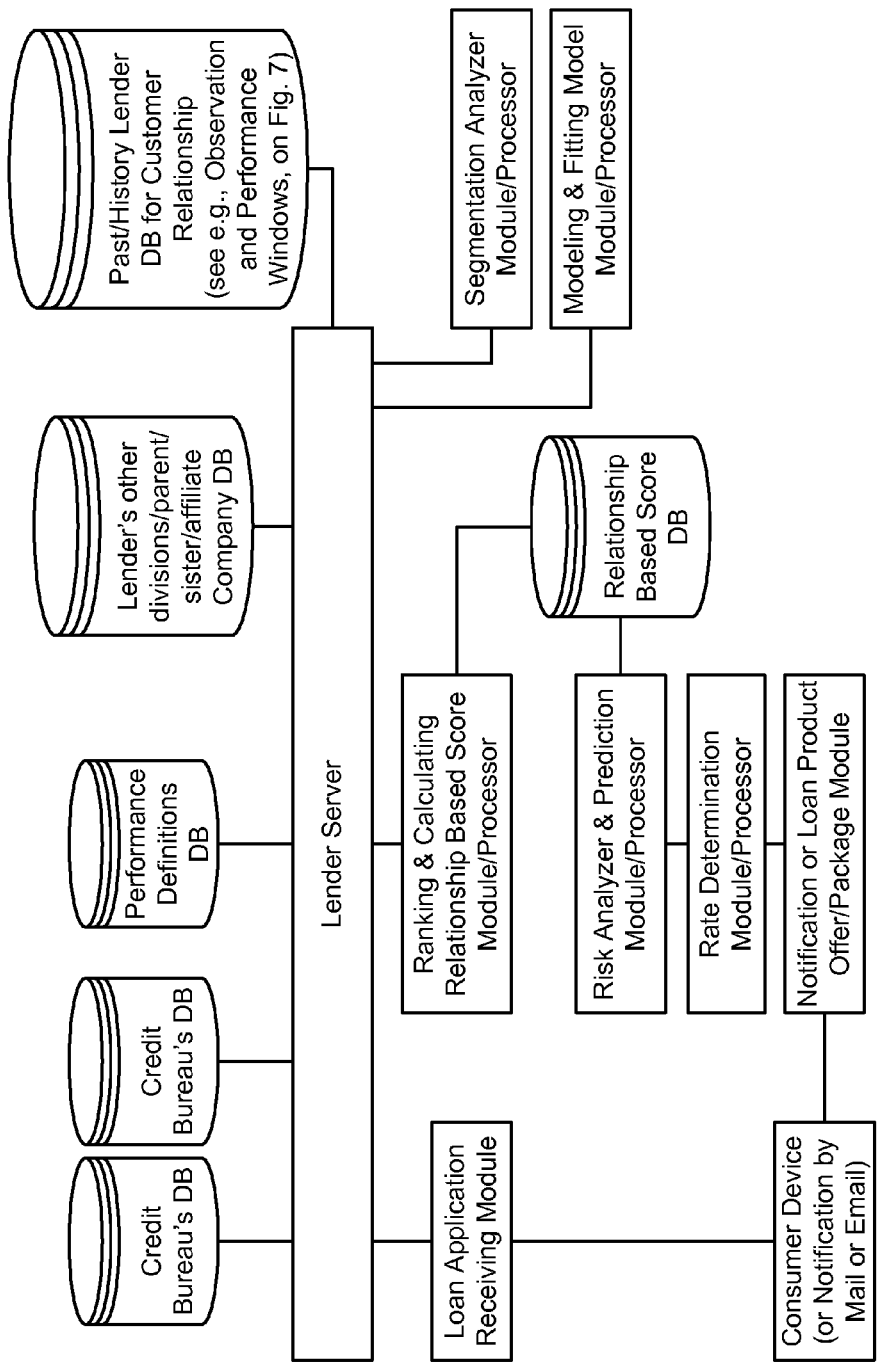
FIG. 18a shows an example of a system for Section 3.
Figure 18B:
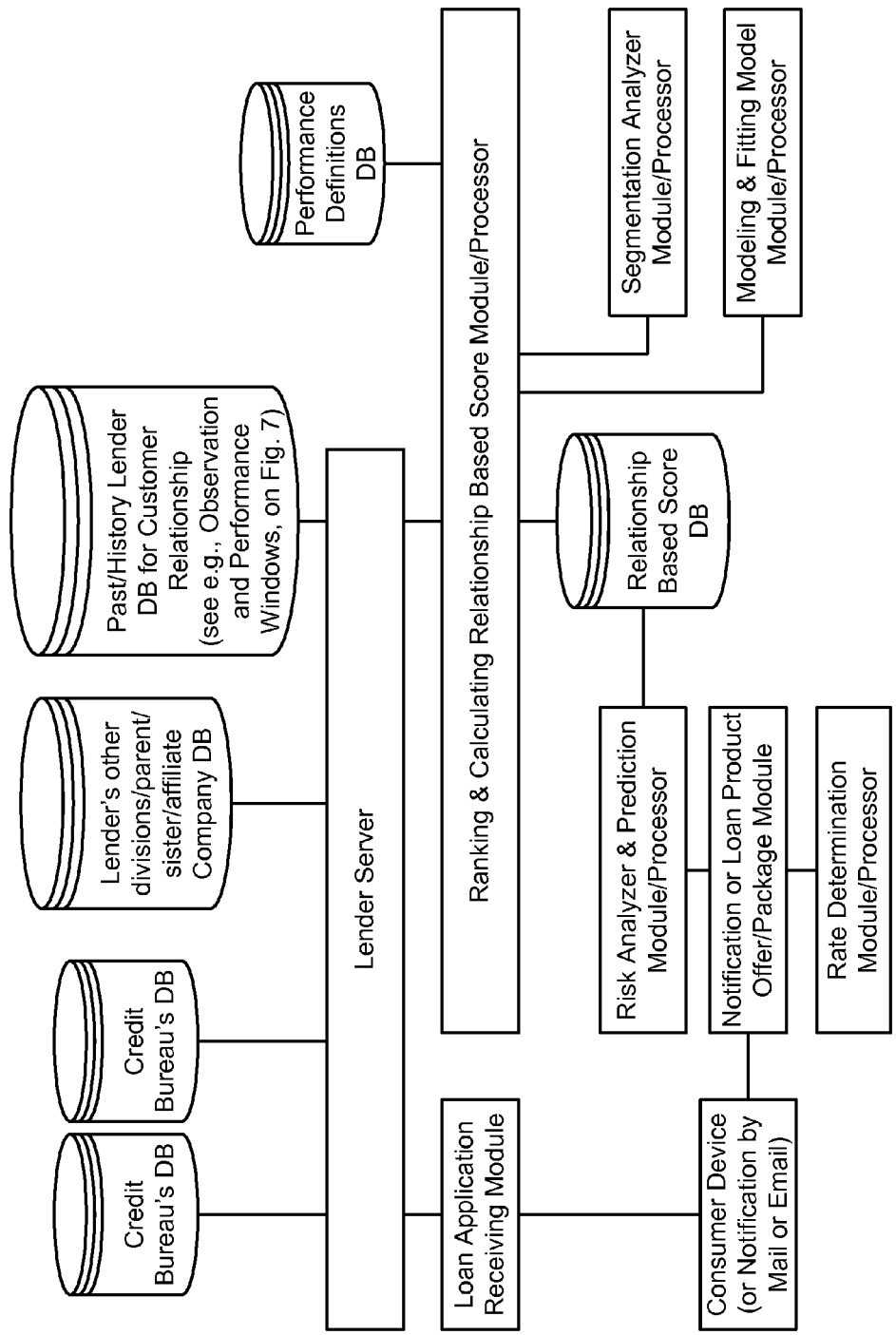

In this section, we teach "A Credit Score Based on Borrower's Relationship with the Lender (Relationship-Based Score)", with an example shown in FIG. 18 (both FIGS. 18*a* and 18*b*). This can be for Consumer Lending, or this can be extended to small-business and commercial lending, as well.

All credit scores rank order borrowers in terms of the borrowers' probability of default in the future. In other words, a higher score usually indicates a lower probability of default over a specific period of time (next 12 months, for example). Typical credit scores (pooled based on all or numerous lenders' data or custom based on a specific lender's data) rely exclusively on credit attributes pertaining to such variables as (1) length of credit history (time on file), (2) recent delinquencies, (3) past derogatory incidents, (4) bankruptcy filings, (5) number and frequency of recent credit inquiries, (6) the number of active, open, or historical trade-lines, (7) utilization of open revolving credit lines, and other such credit attributes.

Such scores have gained popularity in the 90s and until today. Smaller lenders tend to rely on pooled credit scores, and larger lenders (since they have the appropriate expertise, access to data, and the right scale) tend to develop custom scores and rely on both pooled and custom scores for their business. Most scores tend to be specific to a lending product; for example, a custom score developed for a specific large lender can be for the lender's credit card application and origination program. However, there are some scores that focus on the credit worthiness of the borrower across all lending products. The best known credit score which happens to be a pooled score and generic to all lending products is FICO, developed by FICO (www.fico.com).

Credit scores (pooled or custom) have numerous applications in the lending industry, such as, but not limited to, automated (system) and manual (by a human) decisions for credit applications and product originations, pre-selection (pre-approval, invitation-to-apply, and pre-screen), account management for revolving credit product, collections and recovery in case of delinquency and default, product pricing (in the form of rates and fees), and whether or not a specific treatment of an account or a customer should be reviewed by a human. Credit scores in the area of account management for both installment and revolving credit products are referred to as behavior scores.

All pooled credit scores (product specific or borrower centric) exclusively use credit attributes as independent variables for model development. The custom scores, however, predominantly use credit attributes as variables to the model. A few variables and attributes focusing on the customers, and their relationship with the lender, may be used as segmentation or independent variables in the custom score model. (Please note some lending and banking literature refers to independent or segmentation variables as characteristics.) Currently, no credit score uses customer and relationship attributes exclusively or predominantly as input variables. Such customer and relationship attributes measure (A) the depth (volume and balance of business), (B) breadth (how many products), (C) length (how long), and (D) the quality (e.g., activity or recent delinquencies) of relationship the lender or its affiliate financial companies have with the customer or (E) other relevant customer data (for example, marketing segments) to assess the customer's probability of default and payment performance in the future.

The fragmented nature of lending industry in the United States has resulted in the lack of use and popularity of such customer and relationship centric scores. Most customers and lenders tend to focus on a specific lending product that maximizes the customer's and lender's gains and on the value for that specific lending product rather than on a holistic view of the entire relationship. As the fixed costs of lending increase (for regulatory and other reasons) and profit margins shrink, due to the ensuing consolidation, the few remaining players will have to differentiate themselves by offering innovative products and focusing on relationship banking to add value to their customers. That is where a relationship-based credit score will be of tremendous value both the lender and the borrower.

Another reason why relationship-based scores have not become popular and are not in use is that all lenders upon taking adverse action against a customer or borrower must issue rigorous and analytically driven reasons as to why the action took place. Examples for adverse actions are a decline or rejection of a credit application or reduction in credit limit or suspension of a revolving line of credit. If an adverse action is taken based on a low relationship score and the low score is due to the customer's low or sparse level of relationship with the lender, the lender would be hard-pressed to present a plausible reason to the customer for such rejection, and furthermore, such rejection is not viable from a sound business perspective. It would be unreasonable and illogical for the lender not to want to do business with a potential customer or borrower, just because the customer has no or low business relationship with the lender. In the body of this invention and its various embodiments, we present ways of applying the score while addressing and circumventing this fundamental drawback.

The main issue with excluding customer and relationship attributes from a credit score that ranks future probability of defaults and assesses payment behavior of the customer is that a host of variables are excluded as input variables to the modeling process. Whereas the credit attribute variables (e.g. see categories (1) through (7) listed above) exhibit statistical correlation, the business relationship variables in categories (A) through (D) have little or no correlation to the credit attributes. When mathematical models are developed using uncorrelated or less correlated variables, and the resulting score has higher power of differentiation between future Goods and Bads, borrowers and accounts likely to perform well and poorly, respectively. Furthermore, the resulting score, even though it predicts the same dependent variable (probability of default in this case), since it spans a different uncorrelated set of independent variables, adds to the lender's power of predicting the dependent variable and opens up opportunities that existing scores and models have currently no means of accessing and leveraging.

This invention is related to the development and application of credit (probability of default) scores that are based on a customer's relationship and other non-credit attributes and variables. Score development process is well documented and described in the lending industry literature and publications. However, as mentioned earlier, such credit scores focus exclusively or predominantly on credit attributes as independent and segmentation variables.

In one embodiment, unlike some of credit scores based on credit data that are developed for a specific lending product, the Relationship-Based Score is for all the lending products and quantifies the customer's probability of default on any or all lending products.

Figure 6:
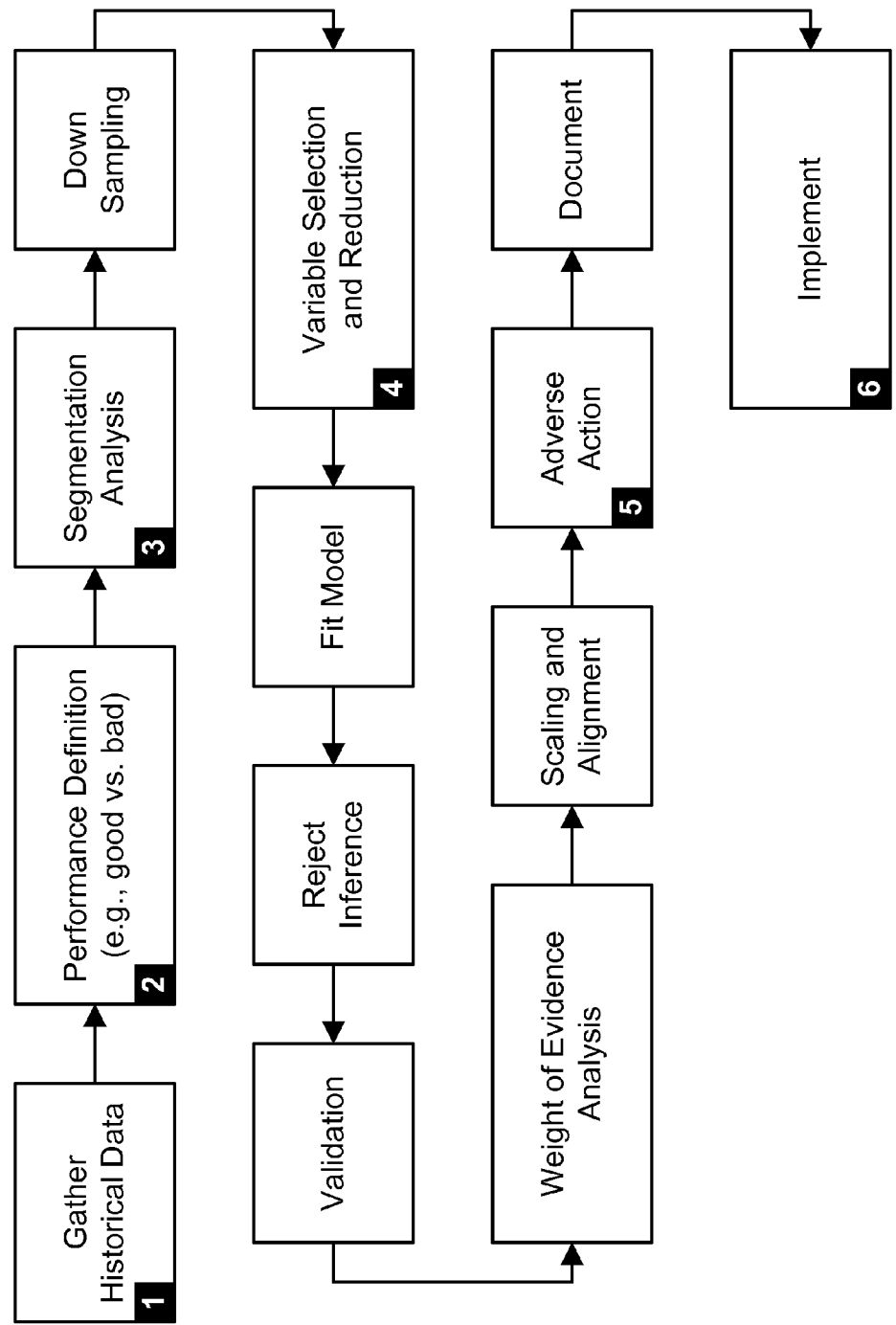
FIG. 6 illustrates the typical development process that a lender may deploy to develop a Relationship-Based Credit Score.

FIG. 6 illustrates the typical development process that a lender may deploy to develop a Relationship-Based Credit Score. This specific invention focuses on new ways of performing Steps 1 through 6 in FIG. 6, as they pertain to deployment of relationship and customer attributes in the model. The remaining steps that are not numbered need not change from the standard credit score development processes using credit attributes as input variables. The reason being that these steps are either purely analytical (i.e., involve quantitative analysis with varying levels of complexity), such as down-sampling, reject inference, model fitting, weight of evidence analysis and scaling and alignment, or are very generic in nature, such as, validation and documentation (as detailed in FIG. 6). In either case, those steps (that are not numbered) do not materially vary from prior art to the current invention.

The goal of the invention and all its embodiments is to develop a score and implement it successfully using relationship and other non-credit variables and attributes according to the process laid out in FIG. 6. Before we begin with the summary description of the invention, a few terms common in industry for credit score development need to be reviewed here, namely the Observation and Performance Windows. The Observation Window represents the point(s) in time at which the customer is observed for predicting his or her future behavior. The Observation Window is when the customer or applicant is observed for derivation of the credit score or when the actual statistical prediction is generated. In other words, we are observing a specific point in the past and determining, based upon all the information available at that point in time, what the key factors are to predict the customer's future payment performance.

Depending on the availability or sparsity of lender's data, the Observation Window may be 6 to 12 months in length. Other embodiments may have Observation Windows that are shorter or longer depending on the conditions mentioned earlier. To increase the predictive power of the score and reduce correlated inputs, in some embodiments, the developers may choose every account a customer has held to be observed only once. However, other accounts the customer has held in the observation window may get captured in the input data for the customer. The Performance Window is the period that determines the performance the model is designed to predict and is used to determine which accounts are good versus bad credit risks. The length of the Performance Window depends on and is typically correlated with the duration of the lending product, and also if the account is current or past-due.

For example, the longer the duration of the product, the longer is the performance window. An installment car loan may require a 12 to 18 month performance window, whereas a credit card may require 24 to 36 months. Furthermore, customers that are current (not past due) are likely to be scored differently from those that are past due at the point of scoring (see segmentation). The main difference in the data needs is that the current accounts will need a wider Performance Window (of one to three years, for example) and past due accounts establish their Good vs. Bad behavior in a narrower time window (say, e.g. 6 months). Please see FIG. 7b for more explanation, as an example.

Finally, the lender may decide in some embodiments to use consistent Observation and Performance Windows, regardless of which product is being considered, and focus exclusively on the customer's performance in the Performance Window. Please see FIG. 7a for more explanation (unstaggered Performance Window), as an example. Whereas in other embodiments, the lender may decide to use Observation and Performance Windows of different durations for different products considered. Please see FIG. 7b for more explanation (staggered Performance Window), as an example.

Two kinds of combinations of Observation and Performance Windows are practiced, and both can be used in different embodiments of this invention. Diagram 2 illustrates the 2 types: staggered and un-staggered Performance Window. Even though both models of observation and performance windows are practiced in industry and can be used for the various embodiments of the score in this invention, the staggered version is analytically more consistent, since it monitors the performance of all observations equally long.

Step 1. Gather Historical Data: (as Detailed in FIG. 6)

Gathering historical data (Box 1) requires collection of (A) customer's past performance with the lender and the lender's affiliates within a Performance Window, as defined earlier, and (B) customer's past relationship and non-credit attributes, as Observed within the Observation Window, as described earlier.

Step 2. Performance Definitions:

Performance definition (Box 2) warrants careful attention. Definitions of Good, Bad, and Indeterminate must be established for each product that the lender wants included in the scope of the score. Good in general means a customer makes regular and agreed upon payments. Bad, on the other hand, means the customer does not make the payments on borrowed lending products as per agreement and expectation, and furthermore has resulted in a charge-off, or is very likely to lead to a charge-off scenario, where the lender has already incurred or is highly likely to incur credit losses on the principal related to the lending product. If in some embodiments, the relationship score is developed for a specific lending product or a specific subset of the lender's products, the definition of Good, Bad, and Indeterminate has to be established for those products only. However, if for other embodiments, the relationship score is for the customer as a potential borrower of all lending products the lender offers and encompasses the whole relationship, all product histories the customer has had with the lender in a given Observation Window must be included. In other embodiments, the lender may decide to use one and the same definition for Good, Bad, and Indeterminate for all lending products, and in others each product may retain its own product-specific definition. In the following section, we offer some specific recommendations for those definitions as they related to one of our embodiments.

Finally, the customer may have numerous products captured in the Observation Window, whose performance is monitored in the Performance Windows. Customer may be Bad in all, some or only one of the products monitored in the Performance Window. Since the object of score is prediction of default, it makes more sense in the recommended embodiment to view a default on any single lending product as Bad. However, in other embodiments, the developers of the score may choose to require defaults on all or a majority of the lending products in order to define the customer as Bad.

Step 3. Segmentation Analysis:

The premise of segmentation (Box 3) is that the independent variables or attributes have a different relationship with credit risk or probability of default (dependent variable) for different segments or sub-populations. By identifying the appropriate sub-populations, the characteristics that are most predictive in isolating risk are optimized for that group. In other words, fundamentally different customer segments perform fundamentally differently and will have different variables best defining their performance characteristics.

The segmentation of the population both for developing the model and also actual scoring depends on the business model of the lender. A few general considerations:

For some embodiments of segmentation, the customers that at the time of being scored (Observation Window) are not past due should be separated from those who are past due, since the performance patterns and characteristics of these populations are materially and fundamentally different.

In some embodiments, to increase the power of prediction of the score requires excluding certain populations from the score (in industry referred to as assigning an exclusion score to the customer). We provide 2 examples of such exclusion segments:

1. Customers who are severely delinquent (2, 3 or more payments past due at the point of scoring or for the development phase within the Observation Window) may be excluded in most embodiments, since lenders typically do not lend more to someone who is already 2 or 3 payments past due on another lending product.

2. In some embodiments, where relationship is the primary and only focus of the score (versus in other embodiments where other customer attributes are also included as independent variables), prospects or those who are new to the lender and all its affiliates (in other words, neither the lender nor its affiliates have any past relationship), with the customer, no meaningful Relationship-Based Score can be assigned to the customer.

In some embodiments, another segment to be carved out and separately modeled, to add strength to the model, is those that are new to the lender, but have existing relationships with the lender's affiliates. For such a segment, independent variables that relate to the overall relationship will be dominant, whereas the relationship variables related to the bank are non-existent.

If prospects (potential customers who have no existing relationship with the lender or any of its affiliates) are not excluded, as per earlier bullet, since other non-relationship attributes and variables are being considered, in some embodiments, such prospects may be placed in their own segment, but only non-relationship variables, such as demographics and employment data, can be used as independent variables to the model.

The remainder of the population that is neither excluded nor segmented, as per earlier recommendations, is segmented according to the business model that best describes the lender and its affiliates. If in certain embodiments, the score is not specific to a product and is related to the customers and their overall business relationship with the lender and its affiliates, product segmentation is not recommended. If the lender knows of certain demographics or sub-populations that have a materially different performance, they ought to be placed in a different model for segmentation. As an example, let's say the lender knows those people who have a life insurance product with the lender's affiliate, ceteris paribus, perform much better than everyone else. Then, this population should be placed in their own segment.

There are a number of analytical or statistical methods to segment the population prior to developing the individual models for each segment that in some embodiments may be used. A potential list is provided here:

1. Clustering
2. Logistic regression
3. Boosting (meta learning)
4. Decision trees (for example, CHAID)

Methods 2 and 3 are capable of doing the all-else-equal analysis (ceteris paribus), whereas 1 and 4 typically are not and need to be used with more expertise and in-depth knowledge of the business.

Step 4. Variable Selection and Reduction:

This step follows the standard practices known in industry and is typically executed in conjunction with the following step of fitting the model. Any linear or nonlinear regression technique or other data mining techniques for a binary outcome, such as logistic regression, can be used to fit a model. Either step-wise or by trial and error, a set of suitable independent variables is used that fits the performance behavior of the specific segment best, and gives it the highest predictive power. In this case, however, instead of a standard set of credit variables or attributes, a set of relationship and other non-credit variables or attributes is used. Regardless of embodiment, the goal of the exercise is to obtain the best (most predictive) score that can be developed for each segment.

Step 5. Adverse Action:

Due to legal and regulatory constraints, when a score is used for declining a credit application or reducing the credit limit of or suspending a revolving credit product, adverse action reasons must be used that give the customer understandable reasons as to why the credit application is denied. For Credit-based scores, these reasons are almost exclusively due to the poor payment and credit behavior of the borrower. Since a Relationship-Based Score is mostly based on a relationship that a customer has with the lender, and less so based on their past payment performance, most lenders would not want to decline customers because of the low Relationship-Based Score. The notable exception to this would be those that have had performance issues with the lender or its affiliates. However, as explained earlier, the purpose of this score is to predict credit default as a function of non-credit variables. Therefore, no independent variables or attributes in regards to having been being bad with the lender are included in the models and can be used to provide adverse action reasons. Such variables are used by other pooled and custom credit scores and may be dropped as independent variables from a relationship-based score development.

As far as performance-related independent variables are concerned, in some embodiments, those of lender's affiliates may be included in the analysis. To the extent the influence of the performance-related piece of the score is material and the score is lower than a given threshold, adverse action reason can be given to that effect. The reason would state, that customer has had performance issues with the lender's affiliates in the past, and that is sufficient reason for declining the credit application. In some embodiments, if the customer falls into one of the exclusion scores mentioned in Step 3 (delinquent or severely delinquent), the current performance of the customer with the lender is poor and adverse action reasons can reflect that.

Step 6. Implementation—Applications of the Relationship-Based Score:

The Relationship-Based Score can be applied in a number of credit decisions, credit policy, collection, and lending product pricing matters. In selected embodiments, lenders may choose to use one or more of the following potential applications areas:

1. Systematic approval of applicants who ordinarily (w/o the Relationship-Based Score) would be declined, solely based on the credit-based scores, if their Relationship-Based Score exceeds a certain threshold.

2. Systematic decision of routing to manual under-writing of those borderline cases, where due to their positive relationship, the customers have with the lender manifested in the form of a high Relationship-Based Score, an approval may be warranted, but needs to be manually examined by a human.

3. Use of the score by human underwriters, in cases routed to them (see item 2 above) based on set guidelines of exceeding a certain threshold, whereby looking at the holistic picture of the credit, debt service capacity, and relationship of the customer with the lender, a decision can more effectively be rendered.

4. Account management for revolving credit products. The following examples of account management may be used in selected embodiments:

a. The open credit lines are constantly monitored by the lenders and frozen for certain risky customers, should a customer exceed a certain threshold in their Relationship-Based Score, the freeze in line can be deferred to a later time.

b. Or should the score be below a certain threshold the freeze can be accelerated.

c. High Relationship-Based Scores may be used to grant customers higher over-limit balances than warranted solely based on credit-based scores.

d. Suspension of the account (soft—removed once cured—or hard—not ever lifted—freezes) can be deferred for High Relationship-Based Scores.

5. Collections activity: a high score can preclude the customer from aggressive, early, or pre-emptive collections actions, and a low score can accelerate those collection actions.

6. Pricing: a high Relationship-Based Score can lead to more favorable pricing, since the credit loss expectations for customers with better Relationship-Based Score, ceteris paribus, are lower, more favorable pricing or lower rates are warranted and justifiable.

7. Preferential treatment: customers with high Relationship-Based Scores can be placed in special buckets, to be treated more favorably than other customers. Waiting (shorter) periods on phone lines, early replies on emails to customer service, and better rewards for credit cards are a few examples of such preferential treatments.

Most, if not all, of these applications require the lender to conduct business (credit and financial) analyses that are customary to the lending business in order to establish appropriate thresholds for preferential treatments. In some embodiments, the lender may decide to divide the population to quantiles (ordered data into essentially equal-sized data subsets) and give the above mentioned preferential treatments to certain top quantiles. Establishing which quantiles get the preferential treatments may also involve those credit and financial business analyses.

More Details about Relationship-Based Score

Now, we describe more embodiments about the Relationship-Based Score: (Please refer to FIG. 19 and FIG. 18, for an example/some details.)

Step 1. Gather Historical Data:

Gathering historical data relates to all relevant relationship and other non-credit (customer) variables and attributes in the appropriate Observation Window. Such customer and relationship attributes measure (A) the depth (volume and balance of business), (B) breadth (how many products), (C) length (how long), and (D) the quality (e.g., activity or recent delinquencies) and profitability of the relationship the lender or its affiliate financial companies have with the customer, or (E) other relevant customer data (for example, marketing segments). Such attributes may be used in various embodiments as segmentation or independent model variables.

An important note is due here on the use of credit history of the customer specifically with the lender. In some embodiments, the lender may decide to include such historical credit performance variables as to be used both within the scoring models and for segmentation. However, there are 3 caveats that need to be carefully considered. First, the score is meant as a credit score relying on no-credit attributes and characteristics. Including lender-specific credit variables may add to the strength of the model, but is contrary to the purpose and spirit of the score. Second, all lender-specific credit attributes are typically gathered by custom and pooled credit scores that rely on credit attributes as independent variables. Finally, related to the previous point, recall that the separation of credit attributes from this score gives it low correlation with other credit scores and adds to its strength. Adding back credit attributes as independent variables, even if they relate to the lender's relationship with the customer, diminishes this strength. Having stated all that, in some embodiments, the lenders may decide to include some lender specific attributes related to lending products, as independent variables. We list a sample subset under category F in the table below.

TABLE 7

A sample list of such variables along with their respective category is provided. (Please see the definitions for categories given above, for A-E and F.)

| Attribute or Variable | Likely Impact on Score (higher value means:) | Category |
|---|---|---|
| 1. Number of active products with the lender | Better | B |
| 2. Number of active products with each of the lender's affiliates | Better | B |
| 3. Cumulative number of past and existing products with the lender | Better | B |
| 4. Cumulative number of past and existing products with each of the lender's affiliates | Better | B |

TABLE 7-continued

A sample list of such variables along with their respective category is provided. (Please see the definitions for categories given above, for A-E and F.)

| Attribute or Variable | Likely Impact on Score (higher value means:) | Category |
|---|---|---|
| 5. Length of relationship with the lender (in months) | Better | C |
| 6. Length of relationship with the lender's affiliates (in months) | Better | C |
| 7. Average balance in deposit accounts (checking, saving, and certificates of deposit) | Better | A |
| 8. Ratio of credit balance to deposit balance (in other words, how much has the customer borrowed from the lender versus how much has the customer deposited with the lender) | Worse | A |
| 9. Utilization of revolving credit products the lender offers to the customer (for each product, product category, or in total) | Worse or Unknown | A |
| 10. Recent performance with lender's affiliates, e.g., non-payment on a property and causality insurance policy or non-payment on a life insurance annuity | Worse | D |
| 11. Premiums paid for various services rendered by the lender | Better | A |
| 12. Attributes quantifying the relationship with the lender's affiliates, such as: | | |
|   12.1 Balance of assets under management with the lender's asset management affiliate for retirement and non-retirement accounts, | Better | A |
|   12.2 Balance of securities invested in brokerage accounts (retirement or otherwise) with the brokerage firms affiliated with the lender | Better | A |
|   12.3 Premiums paid for various services, | Better | A/D |
|   12.4 Liability coverage for various property and accident insurance products with lender's insurance affiliates. | Better | A |
|   12.5 Dividends, rewards, or other payments received by the customer from the lender or its affiliates | Better | A/D |
| 13. Specific customer groupings and segmentation used by the lender pertaining to the lender's business typically used by marketing groups. | Unknown | E |
| 14. Channel preference of the customer, such as, internet, phone, or branch office | Unknown | E |
| 15. Employment data: type of employer, type of employment, months with the employer, monthly income | Unknown | E |
| 16. Residential status: own, rent, live with parents, etc. | "Own" is usually better | E |
| 17. Family status (married, single, divorced, and widowed) | Unknown | E |
| 18. Gender | Unknown | E |
| 19. Geographical location: Zip code, state, or region of residence | Unknown | E |
| 20. Other demographic information that may be relevant to the bank's relationship with the customer, such as age group, or other legally admissible variables | Unknown | E |
| 21. N or more days past due delinquent in the past M months on any lender's product (N can be any number of days but depending on product 30, 60, or 90 are industry practice) - (M can be any number of months, but 6, 12, and 24 are typically practiced) | Worse | F |
| 22. Number of credit inquiries with the lender in the past N months (N can be 6, 12, and 24) | Worse | F |
| 23. Total aggregate lender exposure ($) | Unknown | F |
| 24. Total aggregate lender unsecured exposure ($) | Unknown | F |

Gathering historical data also relates to performance data of previous lending products the customer has with the lender in the appropriate Performance Window. Such performance data gathering relates to the definition of performance described next.

Step 2. Performance Definitions:

Industry practices for definition of Good, Bad, and Indeterminate performance apply and are typically chosen by the lenders, based on their past experience with the product. In this case, since the score is for the customer as a current or potential future borrower, historical performance of all past products that the customer has had with the lender in the Observation Window may be used in some embodiments. A sample table is provided for various products that may be used in some embodiments, as Table 8 below.

TABLE 8

A sample table for various products that may be used.

Performance Definition for a Given Lending Product

| Current Customer Segment | Current Accounts | Past Due Accounts |
|---|---|---|
| Performance Window | 30 months or less | 6 months or less |
| Good | Never 30 days or more past due | |
| Bad | Bankrupt, Charged-off, or ever 90 days past due | |
| Indeterminate | Not Good or Bad | |

Please note that for the "Bad" category, above, the number of days past due for the definition of bad depends on the nature and duration of the product (for example, for revolving credit or installment loan products 90 or 60 days, respectively) and also how many days past due the lender charges off the product (credit card 180 and auto 120, for example).

As discussed under segmentation (Step 3), customers that are current (not past due) are likely to be scored differently from those that are past due at the point of scoring. The main difference in the data needs is that the current accounts will need a wider performance window (of many years), and past due accounts establish their Good vs. Bad behavior in a narrower time window. The Good, Bad, and Indeterminate classification illustrated in this table (above), Table 8, is only a sample, serving a selected detailed embodiment of the invention. The actual classification depends on the lender, the lending product, and various other business considerations. In one embodiment, all products that the lenders offer and the relationships customers have with the lender must be included in the historical data, in order to develop the Relationship-Based Credit Score based on the full picture of the relationship.

Please note that FIGS. 7a and 7b show observation window and performance window, for all observations and various t's, respectively, as mentioned in the descriptions above, for various situations. For FIG. 7b, the performance window is variable/moving, with different start and finish, or various periods. However, for FIG. 7a, the performance window is the same for all observations. FIG. 6 illustrates the typical development process that a lender may deploy to develop a Relationship-Based Credit Score, as described in details above.

As shown in FIG. 18, lender uses various credit bureaus and data from other divisions/sister companies/affiliates, as well as its own database/history, to evaluate the loan application received from the consumer, using segmentation and ranking, based on performance definitions, to model and fit the model, to come up with a relationship-based score. The relationship-based score is used for risk analysis and rate determination (pricing), to offer/notify the corresponding loan product to the consumer, via her device/phone.

Figure 19:
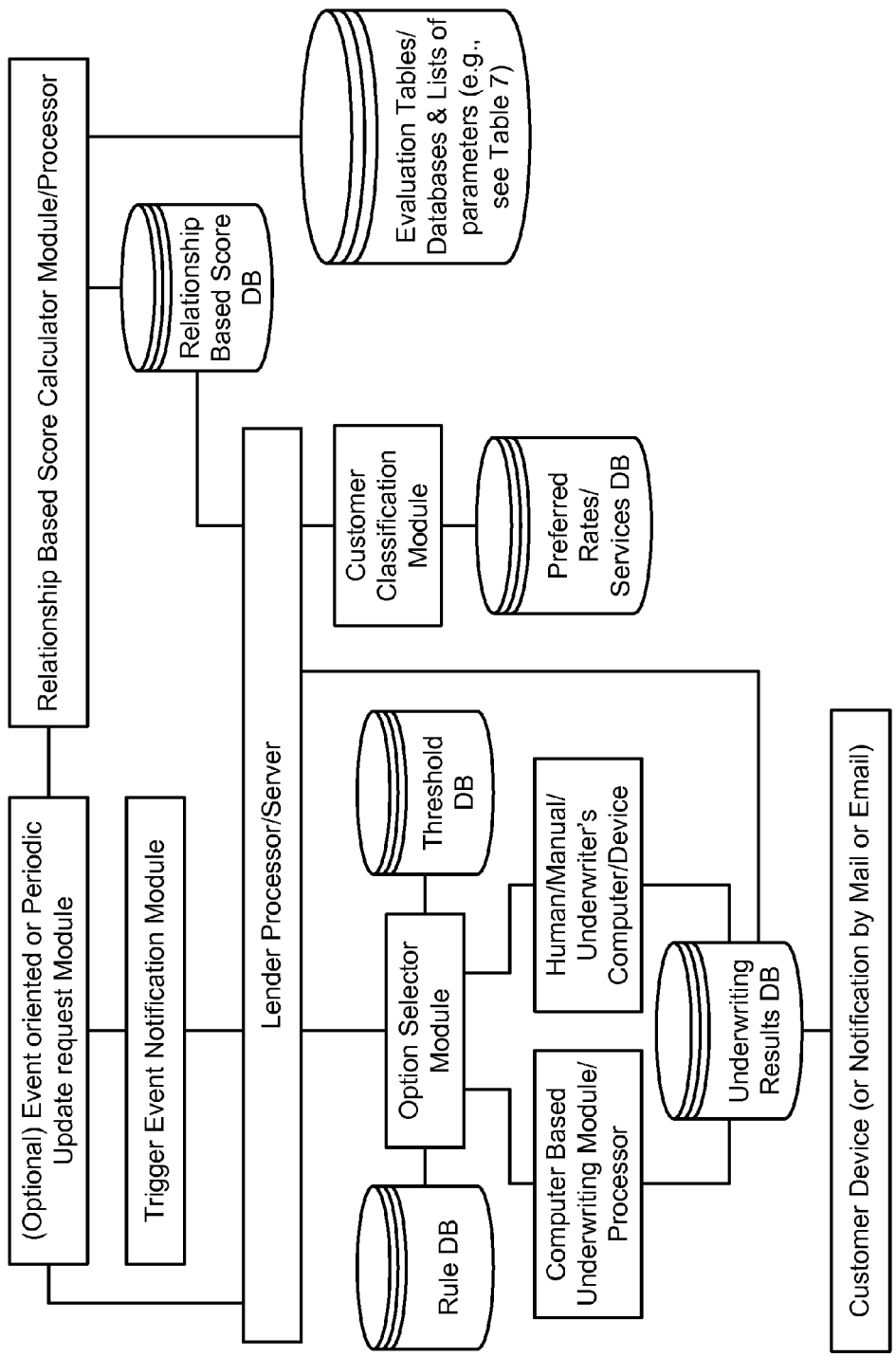
FIG. 19 shows an example of a system for Section 3.

As shown in FIG. 19, the evaluation tables are used (with other parameters) (e.g. see Table 7), to calculate relationship based score for a lender. The calculation or recalculation is triggered by the lender, customer, event, time period, periodically, or some other threshold/index/parameter value/fluctuations in the market. The lender generally uses the computer to evaluate and rate/score the applications. However, for marginal cases, or grey areas, the lender uses manual method, i.e. human underwriters, to evaluate those cases, based on the rules and thresholds. The result is sent to the consumer, and the consumer is classified accordingly, e.g. as a preferred customer, for a better rates and lower fees for loans and services, from the lender. (Note that the human underwriters also feed the results in the same system for continuation of the process, as described above.)

Contractual or Pre-Determined Rates based on History & Relationship Score

Now, we describe a financial product where the interest rates (or the changes in rates, or behavior of the rates, or the range of the rates, or the formula for the rates, or reduction in the rates) are predetermined, e.g. as a contract between the consumer and e.g. a bank, at the beginning, so that the consumer can count on it, as what the result would be in the future.

In general, conventionally, the credit cards have variable rates, but they are not the same as the product we are describing here. In our case, we offer an installment loan, e.g. at a rate of Y percent. However, the rate goes down, e.g. to Z percent, if one of the following event happens, as an example (or stays low as long as some predetermined conditions are satisfied, or e.g., will go up if some other conditions are satisfied, for a period of time, or forever, or as long as some conditions are satisfied):

- The consumer paid all the payments for his/her loan on time for the past 12 or 24 months.
- The consumer was a good customer to the bank, with high score as a customer, and a long relationship with different divisions or affiliates of the bank.
- The consumer got a promotion in his/her job, with 35 percent higher salary now.
- The consumer finished his/her loan payments for his/her car, which means that he/she has more disposable income or higher debt service capacity, now, compared to the time that he/she applied and got the residential (house) loan, originally.

The logic behind this is that, e.g. if somebody is applying for a loan, originally, there is a risk associated with that consumer, with respect to that loan and the bank/lender. The higher the risk of default and non-payment by the consumer, the higher the rate should be, to justify the risk for the lender or bank. However, it is shown that, statistically, if e.g. somebody pays her mortgage and other contractual payments on-time for a few years, the probability of default decreases materially. Thus, the rate can be adjusted based on that condition, contractually, at the beginning, without any refinancing fees or refinancing or new contract or new application or any new negotiation or any new applicable rate at the time of this decision based on the market rates or indices.

So, it would be less risk for the bank, knowing that the consumer has been a good and reliable customer. It also gives more peace of mind and confidence to the consumers, with less chance of defaults and less uncertainty for future, which is better for consumer. So, the loan activities increase, with healthier results, and less defaults, which is costly for all parties involved, directly or indirectly, including health of economy in general, and construction industry in specific. So, it will be a win-win situation for all, and any bank offering such a product will be very much appreciated and noticed by consumers, which is good for the bank's business, growth, and profitability. (Please note that this product does not exist for e.g. home loans, at present time.)

In general, having loyal customers (and long-term or multiple relationship, with consistent results for the bank) is very profitable and reassuring, making the bank more successful, in general. So, this product makes the benefits of some of that success back to the consumer, for a win-win situation.

Of course, the reverse can also be added to the original agreement, e.g. when the consumer has a lower salary 5 years from now, as an option, as another product, so that the lender can or may adjust the rates based on the new data 5 years from now, per original agreement, based on the formula, agreement, table, curve, or schedule, agreed upon, beforehand. This last option is generally more attractive to the lender.

Other Embodiments based on Relationship Score

Here, we describe other embodiments based on the Relationship Score. It is a loan product approval method by a lender, which comprises the following steps, as an example: (e.g. see FIG. 18b)

- a lender computing device receives a loan application, regarding a customer, from a lender application receiving device;
- the lender computing device receives credit information regarding the customer from one or more databases of various credit bureaus;
- a ranking and calculating device assigns a first weight to the credit information;
- the ranking and calculating device receives performance definitions from a performance definitions database;
- the lender computing device receives past relationship information as a client, regarding the customer, from one or more of the lender's own or affiliate companies' databases;
- a segmentation analyzer assigns which segment the customer should be assigned to (e.g. assesses the customer's probability of default and payment performance in the future);
- a modeling processor fits variables within a given model, to describe the customer's financial situation and dependability;
- the ranking and calculating device assigns a second weight to the past relationship information, based on the performance definitions;
- the ranking and calculating device receives data from the segmentation analyzer and the modeling processor;
- the ranking and calculating device combines the data received from the segmentation analyzer and the modeling processor, with the first weight, the credit information, the second weight (and in some embodiments, more important weight), and the past relationship information, to assign a relationship-based score to the customer (e.g. taking a weighted average);
- based on credit information scores and relying on the relationship-based score for the customer, a loan product package processing device either approves the loan application, regarding the customer, or rejects the loan application;
- in case of approving the loan application, a rate determination device assigns a current interest rate to the loan application; and
- the loan product package processing device notifies the customer about the approval or rejection of the loan application.

Here are more embodiments:

- The loan application is related to one or more of the following lending products: automobile, motorcycle, bike, RV (recreational vehicle), marine, boat, airplane, equipment, business, factory, unsecured installment loans, credit card, mortgage, home equity installment, or home equity line of credit, as shown in FIG. 5.
- The loan product package processing device considers one or more of the following: income, own or rent, housing expenditure, collateral type, collateral value, requested amount, down payment, estimated closing cost, or other relevant information about the customer, as shown in FIG. 5.
- The loan product approval method further comprises: down-sampling data, variable selecting and reducing, rejecting inference, validating data, analyzing weight of evidence, scaling and aligning data, and applying adverse action, as described in FIG. 6.
- In one embodiment, the performance window for all observations is the same. In one embodiment, the performance windows are staggered, as shown in FIGS. 7a and 7b.
- In one embodiment, one or more future interest rates are assigned, for the loan agreement, which may have one or more corresponding conditions, to kick in or trigger the new rate(s), which can be done using one or more of the following methods (as shown in FIG. 19):
  periodically.
  based on a predetermined or trigger event.
  based on a predetermined market index.
  based on a random variable. or
  based on random time intervals.
- In one embodiment, the customer is classified, in terms of a preferred interest rate, to become eligible for a specific tier of the customer classification and corresponding interest rate(s) or ranges. Basically, the more dependable the customer, the less risk for the bank, and the bank can afford to offer a lower interest rate for a loan taken, higher interest rates for the customer's saving and checking accounts, discounts, gifts, awards, bonuses, extra services, waived fees, or lower fees or bank charges (as shown in FIG. 19).
- In one embodiment, this process is adjusted, e.g. with new rates, periodically, or based on customer's request, or based on an event, such as customer's rating and financial situation, e.g. bankruptcy, changing job, retirement, or divorce (e.g. as shown in FIG. 19). This can work as an insurance/peace of mind for customer, hedging against disaster events or unexpected or somehow expected events.

Section 4: Application of Credit Report for a "Binding" Pre-Approval for Lending Products Here, in this section, we deal with Application of Credit Report for a "Binding" Pre-Approval for Lending Products, as, for example, related to consumer lending. (Please see FIG. 20, as an example.)

Figure 8:
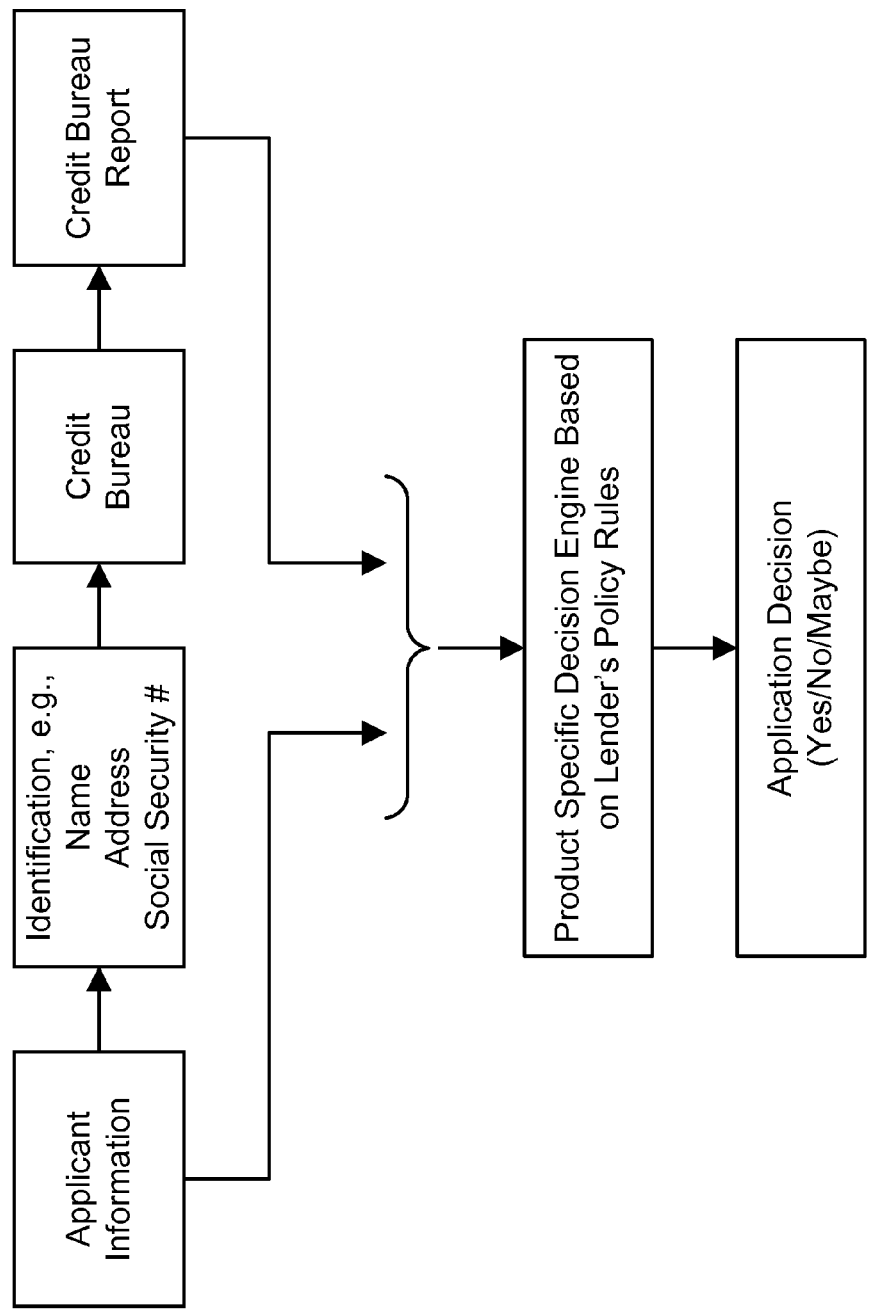
FIG. 8 illustrates the process for present situation when credit applicants apply for lending products.

FIG. 8 illustrates how presently when credit applicants apply for lending products, lenders typically send their information (primarily, name, social security number, and address) to one or more nationally recognized credit bureaus. Those bureaus in turn retrieve the applicant's credit report from their databases and send it back to the lender. Based on the information contained in the credit report and other relevant application and applicant data, the lender executes the decision rules engine, specific only to the lending product for which the applicant applied. The decision rules engine renders a decision (rule-based), which is typically communicated to the applicant (e.g. Yes, No, or Maybe). (See FIG. 8, e.g.) (For example, see also FIG. 21.) The report is then stored for legal and regulatory reasons for future reference or also analysis by the lender. For example, for an embodiment, 75 percent of the application decisions are done by computer, and 25 percent of them (e.g. "Maybe" category) are done manually, for borderline situations, for manual underwritings, as people are still deemed to be better than computers for decisions about borderline situations.

For human intervention situations, the data still goes in and out of the human's computer (or terminal device, with user interface device), and the rest of the system and procedure stay the same as the fully automated system and apparatus described in this disclosure.

Figure 9:
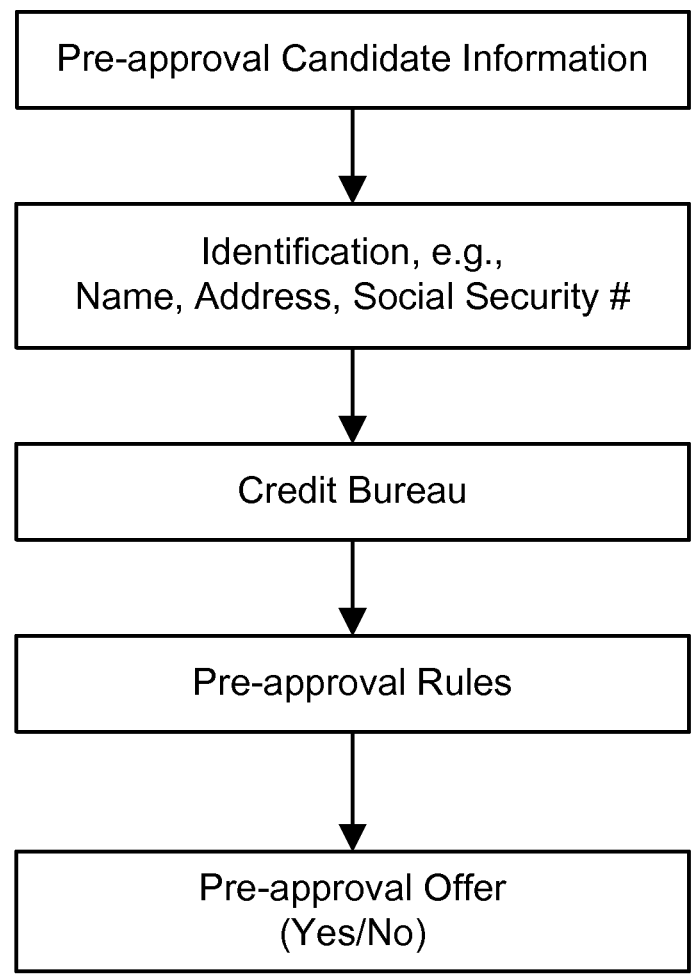
FIG. 9 illustrates a high-level review of such a pre-selection or pre-approval process.

In a process which is typically disjoint from the lending product application process described above, lenders select prospects or potential future customers. This selection process results in a pre-selection offer that has various names and titles, such as, pre-approval, invitation-to-apply, or pre-screen. FIG. 9 illustrates a high-level review of such a pre-selection or pre-approval process. The lender sends a prepared list of potential pre-approval candidates (or prospects) with their relevant information (name, social security number, and address) either directly or through intermediary businesses to a credit bureau where a set of credit criteria (similar but not identical to those used for making the credit decision on the actual application) are applied to the credit report of the prospects. Based on the outcome of this pre-screening process, i.e., if the prospect passes all the applicable rules (meets all the pre-selection conditions), a notice (email or letter, for example) of conditional pre-selection is sent to the prospect. It must be noted that pre-selection rules may be applied by the lender, the credit bureau, or both in order to establish the prospect's eligibility for the offer. Since the candidate's income is not available at the pre-selection stage, and hence, all applicable credit policy rules (decision rules) are not and cannot be applied at this point in time, the pre-approval offer is not final. An actual application must be filed by the prospect, in order for both the lender and the customer to determine if the prospect truly meets all the criteria for being approved for a lending product.

Note that the pre-selection process does not result in a prospect's full bureau report, but the lending product application process produces the report giving the lender a full view of the applicant's credit profile at the time of application. Furthermore, in order to qualify for the product, the applicant for a lending product provides more information (such as, income or rent payment) to the lender than the lender has for the prospects at the time of submission of the pre-selection to the bureau.

The customer who applies for a lending product is an ideal candidate for more business with the lender, especially if the customer is approved for that specific product. As an example, if a customer applies and is approved for an auto loan, he or she may be an excellent credit card-holder with the lender qualifying for special low interest rate balance transfers. Currently most lenders (1) do not focus on relationship lending, (2) have disjoint decision processes and application systems for their various lending products, (3) have different business units deal with different lending products in a silo format, and (4) do not view the credit report used as part of an application process for a specific lending product as a marketing tool to expand the business relationship with the customer.

Actually reason (2) above is probably the main technical challenge why this invention is not practiced and (3) provides the organizational context. Applications for the different lending products are processed on different disjoint application processing IT systems, and linking them would typically require an investment. Furthermore, the businesses or units or divisions for each lending product category in large lenders (that can benefit from this kind of invention) work separately, with their own business objectives to reach. In a future relationship-focused banking universe, this shortcoming will have to be overcome.

Figure 10:
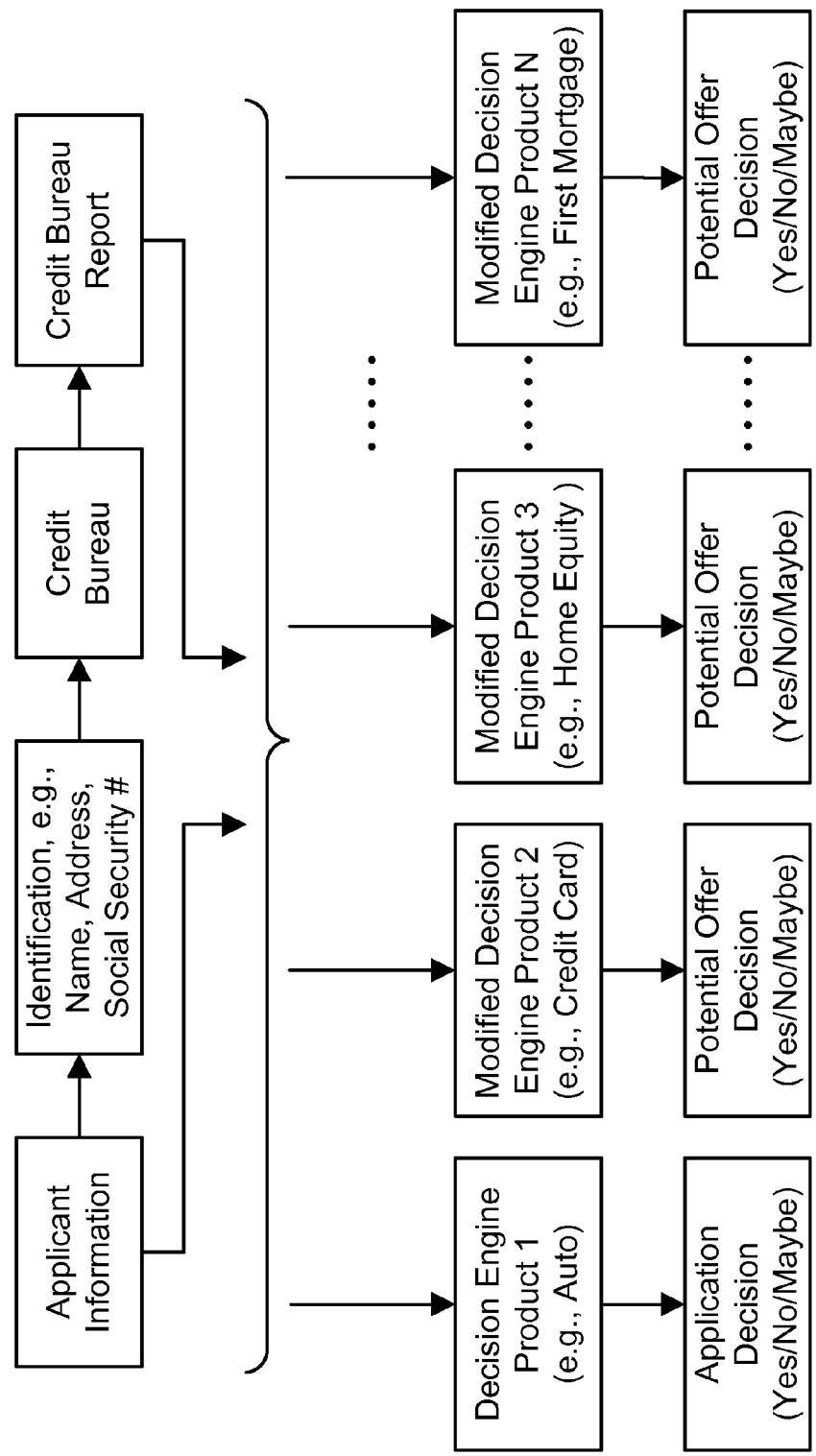
FIG. 10 illustrates a process that describes one embodiment of the invention, with decision engines (credit policy rules) executed for all other products offered by the lender.

Our Solution:

Since all the applicant information (including income and bureau information) is available at the point of application for a specific lending product, decision engines (credit policy rules) can be executed for all other products offered by the lender. FIG. 10 illustrates a process that describes one embodiment of the invention. The credit report is used for the application process on the specific lending product for which the customer has applied. Simultaneously, the decision engines for other lending products that the lender offers are also executed on customer's bureau report for other applications and applicant information.

The decision engines for those other lending products need to be slightly modified in two ways. First, even though applications for different lending products require mostly common pieces of information and data, other pieces of information may not be common. For example, the credit card applicant typically does not specify how much in credit limit they need, but borrowers for auto loans and mortgages do specify how much they would like to borrow to purchase the car or the house. Since this information (loan amount) is not available for some loans, two ways of dealing with this exist.

In some embodiments, the lender may decide to make some assumptions on the loan amount. For example, assume or guess that the borrower might be interested in a $25,000 auto loan or a $200,000 home and see if the borrower can qualify for the lending product. In yet another embodiment, the lender would let the decision engine determine how much loan the borrower can afford. (See e.g. FIG. 10) Lenders typically have payment to income and debt to income ratio requirements for the loans, in order to assess the borrower's debt burden, and if the borrower can afford to make the payments. Whereas debt to income refers to the aggregate minimum required monthly payments on the borrower's all debts divided by the borrower's gross (pre-tax) income, payment to income specifically refers to the loan being applied for.

As an example, a customer has gross monthly income of $4,000 and the payment-to-income ratio for the auto loan for the customer under consideration is 10%. Then, the borrower can afford a monthly payment of $400. Also, let's say the borrower has other debt burdens (such as, credit card, student loan, and a mortgage, all visible from the credit report) amounting to $1,000 per month. The debt-to-income ratio for this customer cannot exceed 40%. Therefore, the maximum monthly debt service according to this criteria is 40%×$4,000=$1,600. The customer already has to service $1,000 per month, leaving the customer with $600 per month for the auto loan. However, the decision engine will yield the lower of the monthly payments of $400 (from payment-to-income) versus $600, from debt-to-income. By making some other basic assumption on the term of the auto loan (for example, 5-year auto loans are most common loans) and interest rate that the customer qualifies for, and the maximum monthly payment the customer can afford, the maximum loan amount can be determined. Modifications of this sort need to be made to the decision engines to use them for this invention.

The second way the decision engine needs to be modified is to turn the application into a pre-selection, and not a true application. The typical decision engine produces a decision (e.g., approve/decline/counter-offer, or Yes/No/Maybe, respectively). The modified decision engines in this case produce a pre-selection offer where the customer is offered a choice of a lending product, where the positive result of the application (approval) is known with near certainty. The engine needs to be modified to reflect this difference.

Once all the modified decision engines have produced their approval, firm offers of credit can be made for all the lending products with very few caveats and terms, mostly concerning the collateral value and condition as related to secured lending. This kind of caveat is placed on credit offers even at the point of actual application. Since the collateral is not known and defined at this point, some constraints need to be placed on its valuation and nature (especially, as it relates to any loan-to-value constraints the lender may want place on the collateral). For an automobile loan, for example, the lender can place a loan-to-value constraint of 120% and a constraint of being not older than 7 years. For a home equity line of credit, for example, the lender can place a cumulative loan-to-value constraint of 90% and a constraint of being a single family dwelling.

This way, the consumer has more choices and options in front of herself/himself (with more motivation and opportunity to buy more or borrow more from the same financial institution), and the banks have happier and more satisfied consumers, with more offerings and products (See FIG. 10, e.g. for offers, decisions, and counteroffers.), with higher success rates of approval and loans obtained, without spending duplicate cost/time (to approve the same person for a different product or loan). Overall, this makes the process more streamlined, with more successful loans, which is better for overall economy and financial health of the small businesses or individual borrowers.

Figure 20:
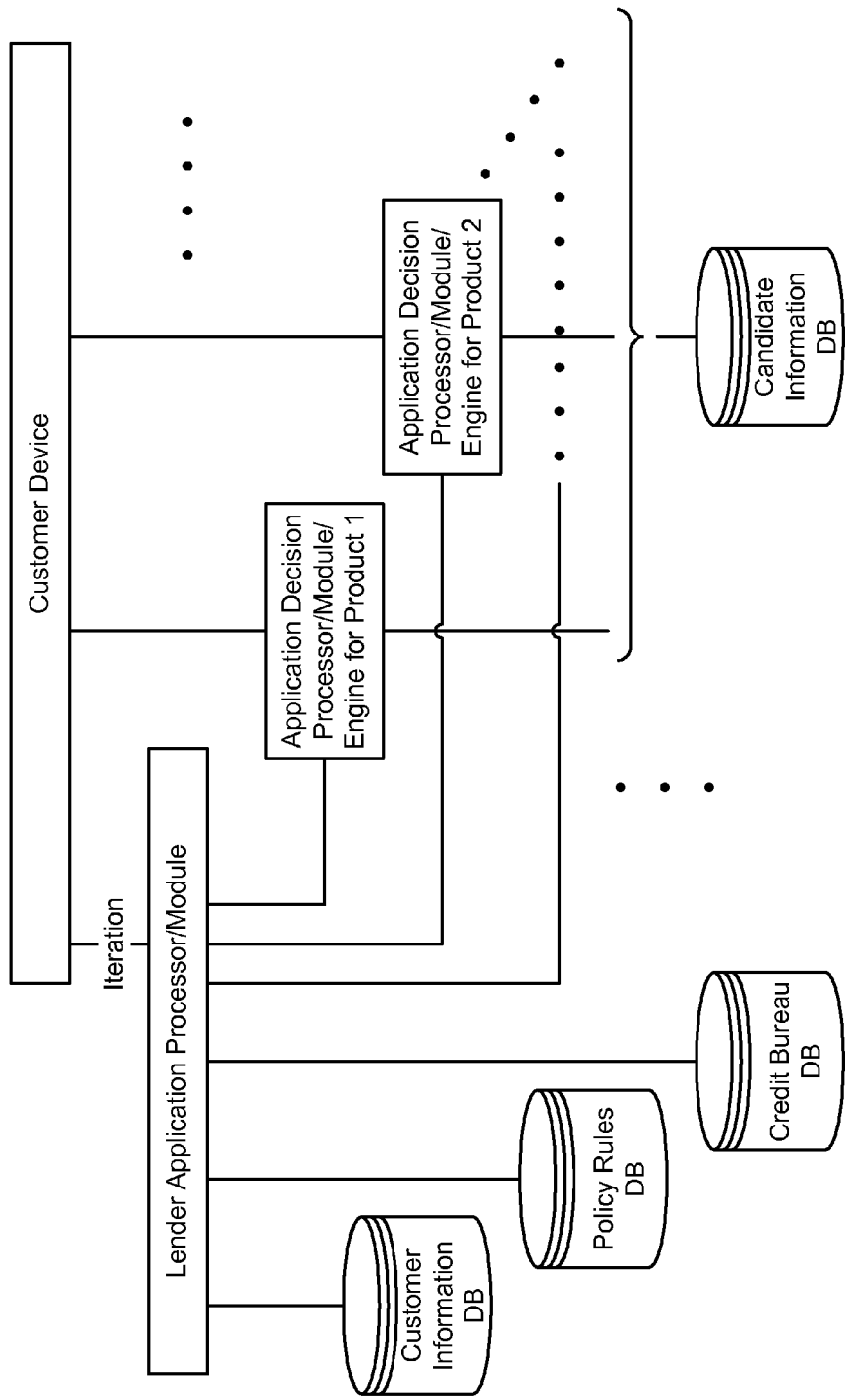
FIG. 20 shows an example of a system for Section 4.

As shown in FIG. 20, the lender uses the policy rules, customer information, and credit bureau reports, to decide and process an application for a product 1 and a product 2 (or more products, or multiple financial products), with results going back to the consumer, and also recorded in a candidate information database.

Figure 21:
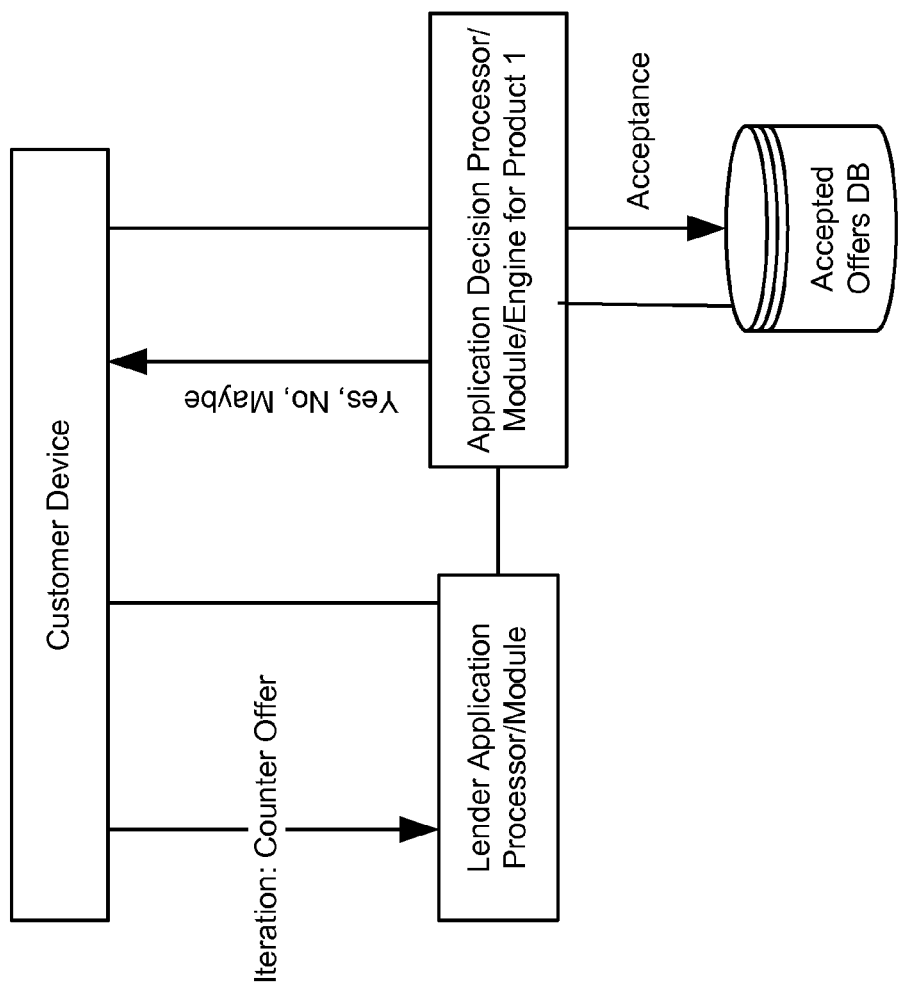
FIG. 21 shows an example of a system for Section 4.

As shown in FIG. 21, the lender decides about an application for loan for different multiple products, using decision rule engines, to get result of the decision to the customer, as "Yes", "No", and "Maybe", and also recorded in a database. "Maybe" can be evaluated further in more iterations, or by a human analyst, instead of computer and machine processors, to become either "Yes" or "No", as the final result/outcome/answer. In addition, in FIG. 21, the consumer can also apply or negotiate again, as counteroffer, re-offer, or iteration/loop, to compromise or accept an offer, going back and forth.

Section 5: Deposit Slip Purchase

Here, in this section, we deal with the Deposit Slip Purchase. Let's consider the following situation: A consumer goes to a bank or any device (e.g. his own tel. or computer, at home or while mobile, or an ATM machine), to deposit money or check or other instruments into his/her account, e.g. into a checking account. Sometimes, a bank does not have any local branches in the specific city or country, then e.g. this can be done through the participating local stores or merchants or any signed up agent, e.g. grocery store chains, e.g. Sears or Walmart, which have many branches in different locations, acting as a proxy for the bank with no local branch.

Thus, the local merchant (for a fee or percentage, or goodwill, as an advertisement) can accept the cash from the consumer, and send the money directly to the out-of-state or remote bank, which can also charge or subtract its own fee from that amount, directly. Then, the deposit slip is issued and activated, which can be used on-line, as a credit (or cash out), for example, using a security method or module, e.g. using barcode or code or PKI or password or biometrics, by a barcode reader or camera analyzing the one or 2-dimensional bar codes, from one's computer, mobile phone, communication device, camera, or the like.

Generally, customers can deposit non-cash items via mail, fax, scan, or mobile device, deposited to their account. Cash deposits are usually a big challenge for remote lenders, since the customers have to convert their currency bills or coins into a check or instrument that can be deposited into an account. There are 2 methods here, as an example:

Method 1:

Deposit slips offered for purchases

Banks make fixed denomination deposit slips available to select participating retail or reputable outfits/merchants/agents/third parties, or those who have enough credit and trust/business backing and insurance/reliability/credibility.

Customer buys the deposit slips from a merchant, once the deposit slip (with its bar code, identification tag, RFID tag, chip integrated tag, optical or radio wave tag, smart card tag, microprocessor tag, or any other tag) is activated. (See, e.g., FIG. 22.)

To finalize the transaction, the customer takes the slip and uses the bank's web site to enter the deposit slip into his/her account. (See, e.g., FIG. 23.)

Any of the above methods (e.g. mail, fax, scan, text, email, or mobile deposits), in combination, can also be used to deposit the slip into an account.

Method 2:

Customer purchases a money order from a provider of money order for his/her desired denomination, using the cash at hand.

Provider may have to be known or certified or contracted or accepted or verified or may have an agreement with the lender, so that the pricing structure and handling fees for provider are clear and known to all parties in the transaction, so that the provider can clear and get funding for all the issued instruments, periodically, for the last period, e.g. monthly, at the end of the month.

The customer deposits the money order into his/her account with one of the above methods (e.g. mail, fax, scan, text, email, or mobile deposits).

The bank may decide to reimburse the customer for this fee, subject to an optional monthly cap.

If the deposit follows an automated method, such as, scan, text, email, or mobile picture transmission, the receiving processor may have to detect the issuing entity of the money order, as an approved one, for the customer to be eligible for the fee reimbursement.

For the manual methods mentioned above, such as mail or fax, the human on the receiving end of the remote bank can establish the issuing entity and record it in the system, such that the reimbursement can take place.

This is very scalable for the banks with low number of branches or remote banks or Internet-based banks, to save cost, and increase profitability, plus attracting more customers, with current cash deposit problems, which can be solved with our method mentioned above. This will be the wave of the future banking business, as well, which will grow more, as more functions are automated or computerized.

Figure 22:
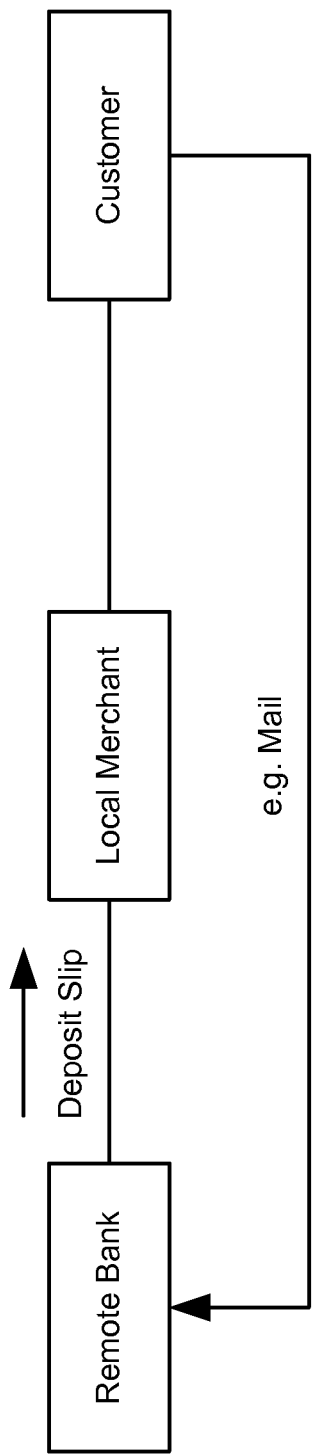
FIG. 22 shows an example of a system for Section 5.
Figure 23:
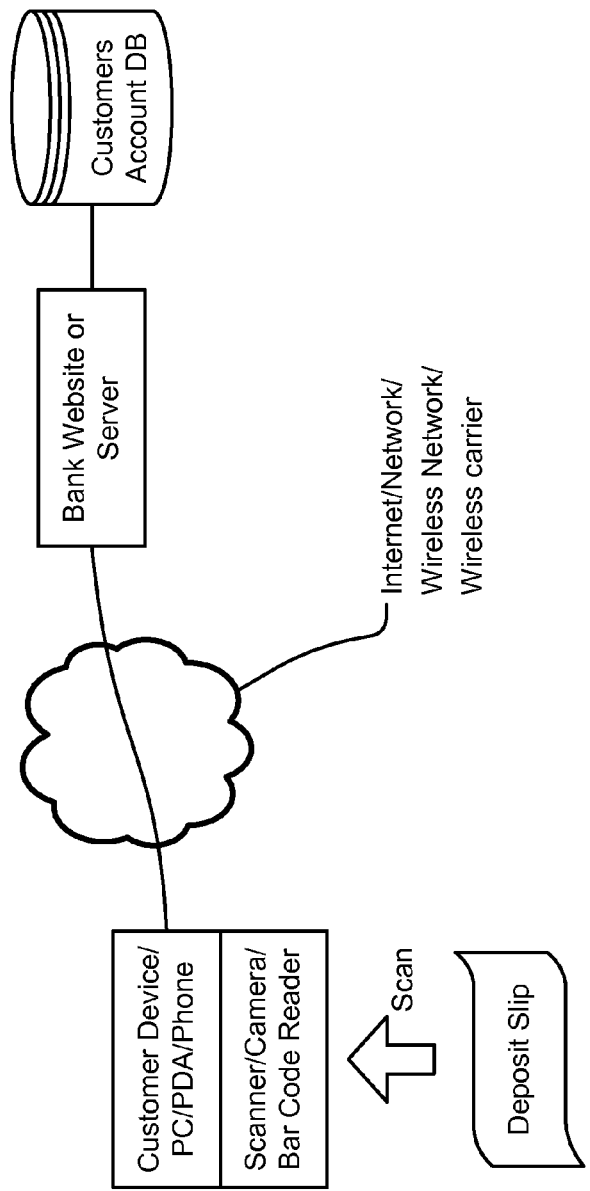
FIG. 23 shows an example of a system for Section 5.

As shown in FIG. 22, the remote bank sends the deposit slips to local merchants, to be sold to a local customer, with a margin of profit for handling for merchant. The customer can mail the documents to the bank, or as shown in FIG. 23, she can scan the document (or take a picture of), and deposit the money to her account, through bank's web site/Internet, e.g., using a bar code reader, or using a code encrypted/encoded in an image, for security, or use PKI for authentication for bank and consumer or merchant, as digital signature, signing off on the deposit slip, to authenticate the slip and authority of the bank/merchant.

Section 6: Reducing Frauds on Credit Cards

To reduce fraud, banks need more photo ID and biometrics or PKI or steps to transact for a consumer, which is very inconvenient and time consuming for the card upgrades or card usage during purchases for a consumer. To encourage participation and volunteer acceptance of fraud prevention techniques, e.g. to be added to the credit cards, e.g. as a extra ID or biometrics, or as an extra step of verification for the consumer to go through each time for each purchase at the store or on Internet, to reduce fraud, and reduce the cost of banking/transactions, the lender can offer lower rates for such preferred customers, so that more customers will participate in such programs, despite the inconveniences associated with them.

Figure 24:
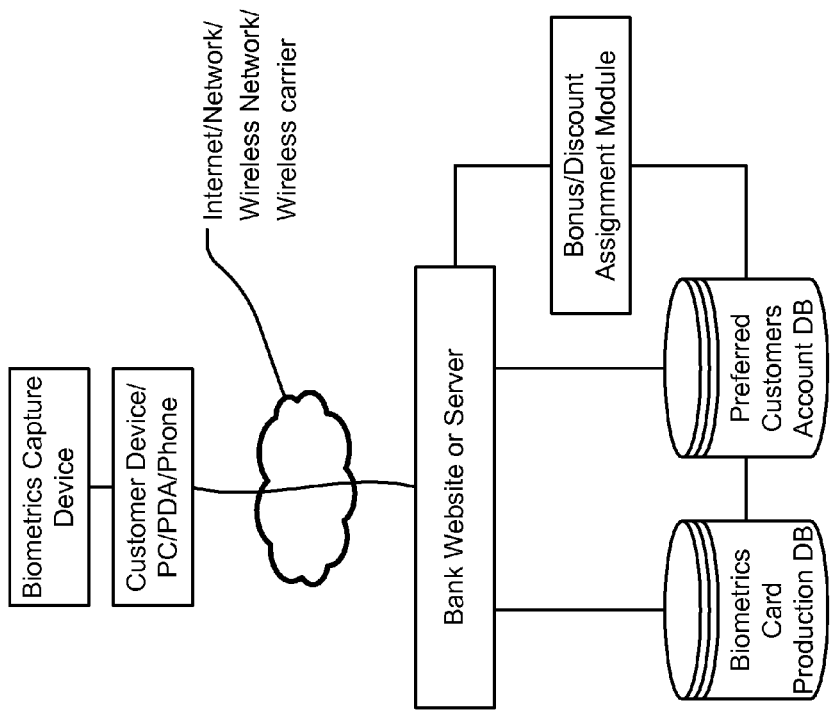
FIG. 24 shows an example of a system for Section 6.

In fact, the bonus, e.g. as a lower rate offered, offered to the customers, is the result of the saving for the bank, due to less fraud/less cost for the bank, which came from volunteer participation of the consumers, who opted for such higher standard of security and verifications, to reduce risk for the banks, for which they get some benefits back from the banks (See, e.g., FIG. 24.)

The incentives for consumers (as preferred customers or high-security customers) can be lower or no fees for transactions or interchanges, or no minimum or higher minimum threshold for balance of checking accounts, or lower interest rates charged by the banks for different offerings, or any fees waived or reduced by the bank, or lower wiring fee or other service fees (or zero fee), or any similar offerings, that can be contracted and advertised by the bank (predetermined benefits), to attract current or future customers and to encourage them to join high-security programs, e.g. putting ID pictures or biometrics or password or PKI information on magnetic strips or on the card itself, as humanly-visible data or encoded/encrypted data, for reader/computer to capture/read/analyze/compare/verify/authenticate.

As shown in FIG. 24, a customer goes on a bank web site, and gets approved as a preferred customer for the bank, which entitles the customer to bonuses and discounts from the bank/better services from the bank, which the consumer will receive, e.g. the coupons, or email with the site address to download and get the coupons on line, or certificates through email or mail for cash rewards or gift certificates. In return, the consumer/customer will capture and transmit the biometrics data requested by the bank, to the bank, for processing, recording, and capturing on the card magnetic or storage unit, e.g. encoded on the magnetic strip, or numbers written or design/figures shown, on a credit card, for higher degree of security and less fraud in usage, as described above.

Section 7: Use of Credit Attributes in Pre-Selection and Marketing for Existing and New Customers Please note that here, the term "pre-selection" is a generic term used for conditional or guaranteed pre-approvals, invitations-to-apply, and pre-screenings.

Credit bureaus in the United States provide lenders with two general types of credit information in regards to the lenders' existing, new, and potential customers: 1) Credit report or information at the point of application for a lending product and 2) Credit information after the lender has originated the lending product and is currently servicing the product. Even though both types of credit information contain similar information about the customer's credit profile, they serve 2 fundamentally different purposes. Credit report or information at the point of application allows the lender to make a credit decision about that specific lending product for which the customer is applying. As an example, the lender reviews the customer's credit report and searches for past bankruptcy filings or delinquencies to arrive at possible future patterns of payment. On the other hand, the lender uses customer's credit information after the lender has originated the lending product solely for managing different aspects of that particular lending product that has previously been originated. For example, the lender looks at the customer's most recent behavior with other lenders and takes certain actions on a revolving credit product (e.g., credit card). If the payment behavior has been poor, the lender decides to reduce the customer's credit line, whereas, if the customer has been paying on time and has low debt burden, the lender may decide to increase the line of credit to incentivize the customer to use the card more.

As explained in the previous paragraph, the application of customer's credit information for that lending product at hand has been exclusively for the processing and servicing the same product. However, there is a wealth of information buried in the credit information that can be mined and used by the lender in order to serve other financing needs of the customer. This gap in lender's usage of customers' available credit information has three primary reasons. First and foremost, the lending industry in the United States has historically been fragmented and run in isolated business units (silos), rather than on the basis of a relationship with the customer. As an example, large credit card companies have been exclusively focusing on credit card business, whereas manufacturer captive finance companies have been focusing exclusively on auto lending. Even, within the business units of top lenders that have various lines of business, no seamless integration exists and the business units operate in isolation or as silos. Systems (IT) integration issues lead to the continuation of the status quo. In other words, any changes to this single focus add tremendous fixed and upfront costs. As lending in the United States becomes more integrated and the benefits of consumer relationship banking become more evident to lenders, the investments in IT will be made, and the technological and organizational obstacles of integration will be overcome.

The second reason for this exclusivity has its origin in regulatory and legal challenges in the use of credit information. In terms of regulatory challenges, the Fair Credit Reporting Act (FCRA), 15 U.S.C. §1681 is a US Congress act passed into law in 1970 and enforced by the US Federal Trade Commission. FCRA has provisions related to the "permissible use" of credit report and credit information of US citizens including the bank customers. The provisions of this act and their enforcement may lead to the misconception that lenders must observe the exclusive nature of the use of credit information. However, firm offers of credit have been found legal and are practiced throughout the lending industry, where a lender solicits a potential customer for business based on credit information even though the customer has not given the lender the permission to solicit such business. Pre-approval and pre-screening exercises commonly practiced by lenders with the help of credit bureaus are prime examples of such solicitations that fall well within the boundaries of existing legal and regulatory regime.

There are some restrictions that can be overcome in relations to such solicitation, but these are excellent examples of how credit report and information can be used for marketing to potential customers. The legal challenges relate to the contracts the lenders have with the credit bureaus on the use of the credit information retrieved by the bureaus and furnished to the lenders for a fee. These contracts are typically written such that the lender can only use the retrieved information for certain business purposes and not others. However, bilateral contracts between two parties can be renegotiated, and the bureaus can be compensated commensurate with the value that the incremental use of the credit information adds to the lender's business.

The third and final reason for this deficiency is the automated or system decisioning for a vast majority of credit applications and the fact that only applicants with less-than-solid or borderline credit are reviewed by a human underwriter. The system does what it is told to do, but the human could peak around on the credit report and see what kinds of opportunities are available for refinancing. However, the borderline applicants are exactly the kind of customers that a lender would like to avoid doing business with. The underwriters are told exclusively to focus on the application at hand and not on expanding the business relationship with the customer. All these reasons and shortcomings can be overcome as explained further below.

Figure 41:
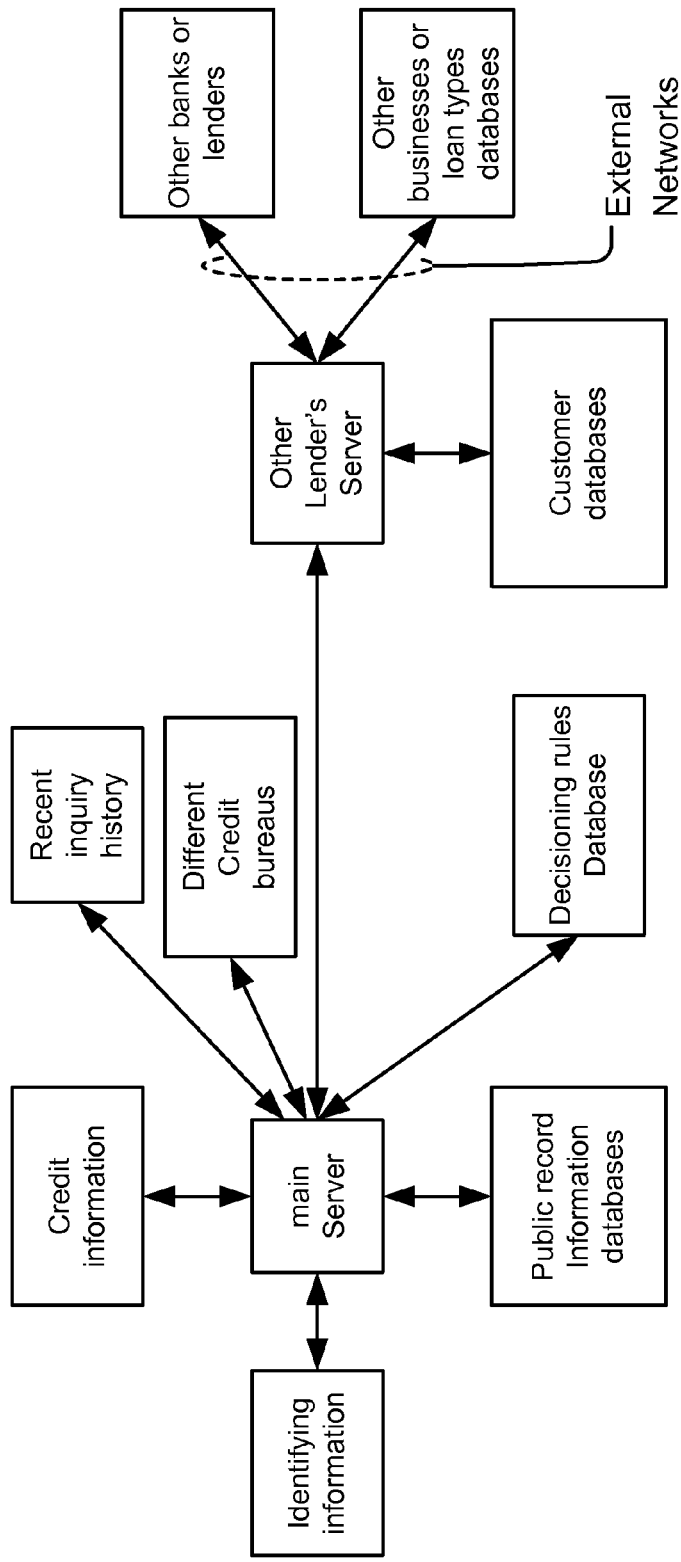
FIG. 41 shows an example of a system for Section 7.

Information Contained in Credit Reports (A) At Origination:

There are usually four types of information in credit reports (see FIG. 41 for such a system, using this type of information or data):

1. Identifying Information: name, any known aliases, current and previous addresses, social security number, year of birth, current and past employers, and, if applicable, similar information about the spouse.

2. Credit Information: accounts with various lenders, retailers, credit-card issuers, utility companies, and other lenders (accounts are listed by type of loan, such as mortgage, student loan, revolving credit, or installment loan); the date the borrower opened the account; the credit limit or the loan amount; any co-signers of the loan; and the past payment patterns.

3. Public Record Information: State and county court records on bankruptcy, tax liens, or monetary judgments (some consumer reporting agencies list non-monetary judgments, as well).

4. Recent Inquiries: The names of those who have obtained copies of the credit report within the past year (two years for employment purposes).

The 3 major credit bureaus in the United States (Experian, Trans Union, and Equifax) transmit the credit reports to lenders in a bureau-specific cryptic form (not readable by humans). The transmitted credit report gets deciphered or parsed by purpose-built decoders at the lender's port of entry into the lender's lending product application and origination system (LPAOS). The decoded form can better be processed by humans and automated decision engines as it readily contains the information in categories 1 through 4 above.

Once the credit report gets parsed, the LPAOS performs two distinct but related kinds of processing on the credit report along with other information available from the customer not contained in the credit report (such as income and demographic data): (1) scoring the credit and (2) applying the decisioning rules, usually in that order. Scoring consists of applying statistical algorithms to the information contained in the credit report and the application to arrive at a numerical score that gives the lender a sense of how likely it is for the customer to default on the lending product. The decisioning rules also use the same information, but search for certain specific information, presence of which may trigger a decline or a manual review. For example, if the customer's credit report shows a current or recent incident of "60 days past-due" (considered to be a severe case of delinquency) in one of the trade-lines, the lender may decide to automatically reject the application. Note that the terms trade or trade-line are the lending industry terms used for an account or a credit account, and here, the 4 terms are used interchangeably.

Examining item 2 from the list of types of information available in the credit report further reveals the credit report to be an extremely potent marketing tool available to lenders. It clearly lays out the history and current positions of lending (including the name of the competing bank that holds or services those trade-lines) and payment patterns (i.e., credit performance) the customer has had over an extended period of time (up to 7 years). Nevertheless, this potent tool is primarily used by credit departments to make a lending decision on a specific application for a specific lending product. In the description of this invention, we lay out ways of effectively leveraging the information to strengthen the lending relationship between the lender and the borrower.

(B) For Servicing:

The information obtained by lenders on serviced accounts differs from that obtained at the point of origination in three aspects:

1. The first major difference is that in the case of serviced accounts, this information is not uniform and standardized across different lenders. For example, in case the customer only has an auto installment loan with the lender (very typical for automobile manufacturer's captive finance companies) or a single mortgage loan, the lender may decide not to obtain any credit information updates on the customer. Whereas the credit report coming from each of the credit bureaus in the case of account application or origination contains nearly the identical information for all lenders.

2. The second major difference is the frequency of information. Whereas at origination, there is only a single report the lender receives on the customer, for servicing, the credit information is updated on a regular basis (usually monthly or quarterly) to keep the lender informed on the credit profile of the borrower. This regular refreshed view is particularly important for revolving credit products, such as credit cards and home equity lines of credit.

3. The third major difference is that the regular updates for servicing contain less information than the credit report at origination. For regular updates, the credit bureaus parse the data in the customers' credit reports and translate them into credit attributes and send them to the lender. For example, the competitor's names are not available in this kind of reporting. In a way, the information contained in regular updates can be readily devised and derived from the credit report, but the opposite is not true.

The regular update for servicing typically contains a general credit score or multiple credit scores, as agreed between the lender and the credit bureau furnishing the update. Table 9 gives an overview of the categories of credit attributes furnished to lenders and few examples for each category.

TABLE 9

General Categories and Examples for Credit Attributes, Furnished by CreditBureaus to Lenders for Servicing Accounts.

| General Category | Examples |
| --- | --- |
| 1. Number of trade-lines | That in the last M* months (1) Opened, (2) Closed voluntarily, (3) Reported, or (4) Were more than N* days delinquent (past due) That were (5) never delinquent or (6) not delinquent within the last M* months (7) With Maximum delinquency of N days past due within the last M months |

TABLE 9-continued

General Categories and Examples for Credit Attributes, Furnished by CreditBureaus to Lenders for Servicing Accounts.

| General Category | Examples |
|---|---|
| 2. Total number of occurrences | 1. Ever N days or more delinquent<br>2. N days or more delinquent in the last M months |
| 3. Overall balance to credit amount ratio on open trades | 1. Opened in the last N days or M months<br>2. Total |
| 4. Number of months since the most recent | 1. Charge-off<br>2. Bankruptcy<br>3. N days delinquency<br>4. between N1 and N2 days delinquent<br>5. Repossession<br>6. Foreclosure<br>7. Derogatory record |
| 5. Total balance on trades | 1. Open and reported in the last M months and<br>2. All reported in the last M months |
| 6. 1, 2, 3, 4, and 5 above for | 1. Auto loans<br>2. Auto loans and leases<br>3. Open revolving bankcards<br>4. Open and closed bankcards<br>5. Preset spending limit bankcard trades<br>6. Installment trades<br>7. Home equity lines of credit<br>8. First lien mortgage trades<br>9. Second mortgage trades<br>10. Revolving trades<br>11. Retail trades<br>12. Revolving retail trades<br>13. Student loan trades<br>14. Utility trades |
| 7. Inquiries | 1. Total<br>2. Total in the last M months<br>3. Total for trade types listed in 6.1. through 6.14<br>4. Total in the last M months for trade types listed 6.1.through 6.14 |

Note that N and M stand for generic integer numbers for days and months, respectively. N could be, for example, 30, 60, or 180 days, and M could be 3, 6, or 12 months. Presently, only credit inquiries (item number 7 in Table 9) are used in the lending industry as an effective marketing tool.

Description:

The main objective of this embodiment is to turn the credit information available to lenders in different shapes and forms into a potent marketing tool to expand on the relationship the customer has or is about to start with the lender. For reasons explained in the introduction, up until now, the credit information has been predominantly used for credit decisioning and account management. The specific actions listed here can be applied both at application or origination of a new trade or account or when servicing an existing trade or account to cross-sell and expand business opportunities between the lender and the borrower. However, the customer must meet the lending criteria established by the lender as per lender's credit policy.

Refinancing Offers

The lender can solicit customers who have newly established or existing loan types in their credit profile with offers of refinancing. The offer of refinancing typically applies to installment loans, such as auto loans, unsecured or consumer installment loans, student loans, first mortgage, and second lien mortgage loans and additionally to home equity lines of credit or HELOC (a revolving credit product). The caveat for all secured lending involving a real-estate property or an automobile is that the valuation plays an important role and must be mentioned to the customer as part of the conditions precedent for fulfilling or closing the loan.

In some embodiments, the lender may use some form of valuation of the property. In case of real-estate, presuming this is a primary residence mortgage or 2nd lien loan or line of equity, the customer's address serves as a good starting point for an automated valuation estimator. A specific numerical example is given below. In case of auto lending, unless the customer would share the purchase price, the information is not publicly available. However, the existing loan is a good proxy for how much credit other lenders have extended to the customer. Further below, we mention an example of an embodiment of this invention where the lender can access the value of the vehicle by using affiliate information, should the lender have an insurance affiliate or a third party provider that can share such information with the lender (with customer's consent).

The refinancing must be beneficial both to the customer and the lender. In other words, the terms and rates of such loans have to be competitive in order for the customer to switch the lender rather than stay with the existing lender. This can be achieved by the lender arriving at the rate and payment of the loan from the available reports, or simply asking the customer for the main parameters, such as term and monthly payment. This proactive solicitation of information by the lender about the customer's existing products with other lenders can be a common theme in all embodiments of this invention. A no-fee no-load offer is most suitable in cases of refinancing, since that reduces the transaction costs for the customer to incentivize switching to the lender. For servicing, the specific credit attribute that can be used to establish how many months the trade has been open is item 1.1 from Table 9, "months since trade open".

In some embodiments of this invention, the lender can run the credit report through its credit decisioning rules engine and come up with possible parameters for the offer prior to soliciting the customer with the offer to refinance. In other embodiments, the lender can implement the offer online in an interactive session or alternatively via human customer representatives on telephone predominantly when the customer is conducting other business that requires retrieval of the customer's credit information including but not limited to application for a credit product.

Regardless of the embodiment, the lender must check if the offer of refinance is not for customer trades with the lender or any of the lender's affiliates. On the auto refinancing, the lender may decide to exclude auto leases from its solicitation drive, since auto leases are not easily pre-paid without penalties.

Second Lien Offers

In cases where the credit report shows only a single mortgage, where no second lien loans or lines of credit are present (Table 9 Items 6(5).7 and 6(5).9 are equal to zero, but 6(5).8 is not), the lender can offer the customer with a loan or line of credit. In some embodiments, the lender can enhance the offer by obtaining an automated valuation on the property address (assuming the customer's mortgage is for a primary residence), as explained above. The main reason for obtaining the valuation prior to making the offer is that the lender can establish parameters on how much the lender is willing to lend to the customer without exceeding the bounds of its credit policy. As an example, if the balance on the first mortgage is $60,000 and the property value returns as estimated to be $100,000, and the lender has a not-to-exceed loan-to-value of 80%, then the lender will intelligently offer up to $20,000=$100,000×80%−$60,000. In some embodiments, the lender may decide to make this a preliminary offer until final more specific valuations are made.

End of Term Offers

A typical auto loan has an initial term of about 5 to 6 years from the time of purchase of the vehicle. However, the average duration (until the loan is paid) is around 3 years, which coincides with how frequently customers exchange their vehicles. One of the attributes (not listed in Table 9) is "Number of months remaining to maturity on an open auto trade reported in the last N months". Other attributes tell the total number of auto loans, and yet other attributes indicate how many have been opened in the last 24 or 36 months. To the extent the lender can combine these attributes (in case of servicing) or arrive directly at how long the customer's trades are at the point of origination (where the customer's full credit report is available), the lender can offer the customer an attractive offer, just in case the customer is considering to purchase and finance a vehicle. The terms and the timing of the targeted offers depend on the lender and what other information the lender has available.

Auto Insurance Transaction

Absent of any credit report or information, the lender may be part of a conglomerate that has an insurance subsidiary or has arranged for a business partnership or a joint venture with a third party vehicle insurance provider. Should the customer have consented to the release of such information, the affiliate or the third party can notify the lender of a transaction related to an existing insurance policy that likely leads to a need for new financing. Such transactions include, but are not limited to, adding a new vehicle to the policy, dropping a vehicle from the policy, substituting an existing vehicle on the policy with a new one, and adding a new driver to the policy. In such cases, a targeted financing or refinancing offer can be made to the customer. Combined with the information on the credit report and also information solicited from the customer (for example, rate and monthly payment), the offer can be very competitive and extremely customized to the needs of the customer.

Furthermore, the offer can be a guaranteed pre-approval if the credit criteria and policies of the lender are pre-applied to the customer's credit profile. Lack of availability on income may pose some challenges for a complete application of policy, but in case the customer has recently applied for another credit product with the lender, this information is readily available. In case of refinancing, though, the assumption can be made that another lender had made an assessment on ability of the customer to repay the loan. There is a risk, though, if the original lender has a more lax credit policy as it relates to the ability to pay than does the lender who is making the refinance offer. In case of a guaranteed offer, the lender must be willing to take this risk.

Offers for Unsecured Revolving Credit Products (e.g., Credit Cards)

In some embodiments of this invention, the lender can search the credit report of an applicant for an auto loan, mortgage, or home equity product, and look for credit cards, retail cards, or other unsecured revolving accounts with an existing balance. An instant offer of credit can be made to transfer balances from one or all of those customer's existing cards to the new account to be established with the lender. The terms can be favorable, such as no or low interest rate for a period of time and no or low balance transfer fees. Same exercise can be applied to the existing customers who have other products and perhaps credit cards with the lender or other revolving balances with other lenders. Those balances can be readily observed from items 6(5).3, 6(5).10, and 6(5).12. Should the customer have already credit card balances with the lender, a subtraction of the credit card balance with the lender from the total balance from the attributes in the servicing credit report can reveal if the exercise is worthwhile for the lender. In other words, a threshold, such as $3,000, can be established, below which the lender would not make an offer.

Student Loan Refinancing

In a similar fashion to the case for credit cards, the existence of a student loan on a servicing or application credit report can flag the lender to offer various ways of refinancing the loan either into another more competitive student loan or into a home equity line of credit or loan (should the credit report indicate existence of a real-estate financing indicating home ownership). The specific terms of the existing loan that the lender would like to refinance for the customer can either be extracted from the credit report or solicited from the customer interactively (phone or on the internet) or through other means of marketing. The lender can specifically design a product for this market that entails an education financing or refinancing product to target the home owner parents of a student.

Summary and Conclusions

None of the approaches suggested here will guarantee a 100% conversion rate for the lender; however, this intelligent data-driven targeted marketing and solicitation will increase the conversion rate significantly and is far superior to the blind approaches that are currently utilized. All of the embodiments above can be implemented in an automated fashion (via system implementation) or with the help of a human representative or a combination of the two.

Section 8: Mobile Device as an ATM Card

Presently to withdraw cash from ATMs, customers need to carry a card (debit, credit, or ATM-specific) with a magnetic stripe that contains such information as the account or card number, name of the cardholder, expiration date, and a PIN verification value (PVV—not the PIN). The card is inserted into the ATM that is connected to a bank's network that in turn is connected to cash clearing intermediaries. Currently, financial institutions provide access to cash via automatic teller machines (ATMs) only via the card method that is mentioned.

Figure 27:
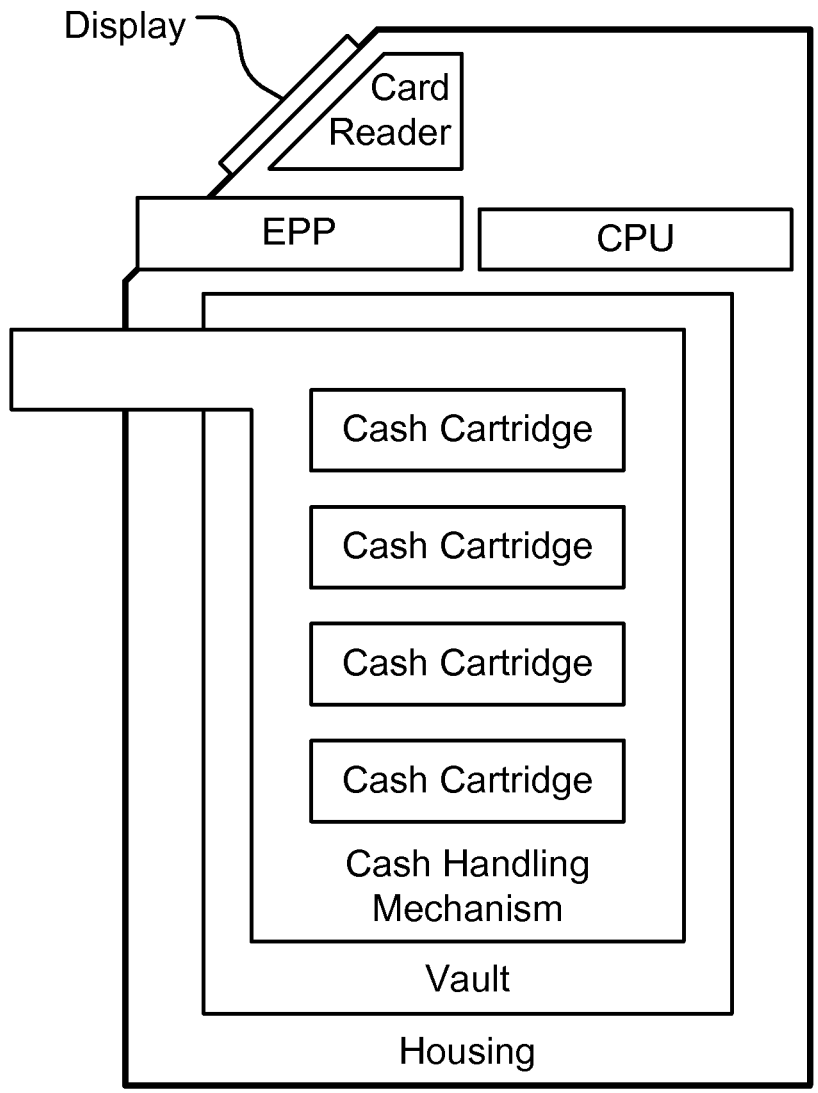
FIG. 27 shows an example of a system for Section 8. (schematic of a typical ATM)

FIG. 27 shows the internal components of an ATM. ATMs are advanced computer systems that contain special purpose hardware and software. All ATMs include a central computer (CPU) that processes transaction information, a magnetic reader to identify customers, a numerical keypad (also known as EPP—Encrypting Pin Pad) that allows customers to enter personal identification number (PIN), an electronic display and a functional keypad or touch screen. ATMs also include a standard software operating system, such as RMX, OS/2 or Microsoft Windows. The software system controls the AMT's interaction with the interbank networks and allows the central computer to process financial transactions. Finally, ATMs contain a series of cash cartridges (which can be removed and re-filled) and a vault, which dispenses cash and accepts deposited cash and checks. Vaults are maintained and monitored by bank personnel to ensure that deposited funds are credited to customer accounts. It is usually not possible to deposit funds in a non-native ATM (in other words, in an ATM of a bank that the account is not affiliated with), hence, the need for the cash deposit methods provided in the first part of this invention.

An important function of the ATM is the verification of the Personal Identification Number (or PIN) entered when a transaction is performed on the ATM. There are several main methods of validating PINs. The VISA method is used by many card schemes and is not VISA-specific. The VISA method generates a PIN verification value (PVV). Similar to the offset value, it can be stored on the card's track data, or in a database at the card issuer. This is called the reference PVV.

The VISA method takes the right most 11 digits of the Primary Account Number (PAN), excluding the checksum value (a digit used by the checksum algorithm for the purpose of detecting accidental errors that may have been introduced during its transmission or storage), a PIN validation key index (PVKI) and the required PIN value encrypted with the PIN validation key (PVK) referenced by the PVKI. From this encrypted value, the PVV is found. To validate the PIN, the issuing institution calculates a PVV value from the entered PIN and PAN and compares this value to the reference PVV. If the reference PVV and the calculated PVV match, the correct PIN was entered. Unlike the IBM method, the VISA method does not derive a PIN. The PVV value that is used to confirm the PIN entered at the terminal was also used to generate the reference PVV. The PIN used to generate a PVV can be randomly generated, or user selected, or even derived using the IBM method.

Figure 28:
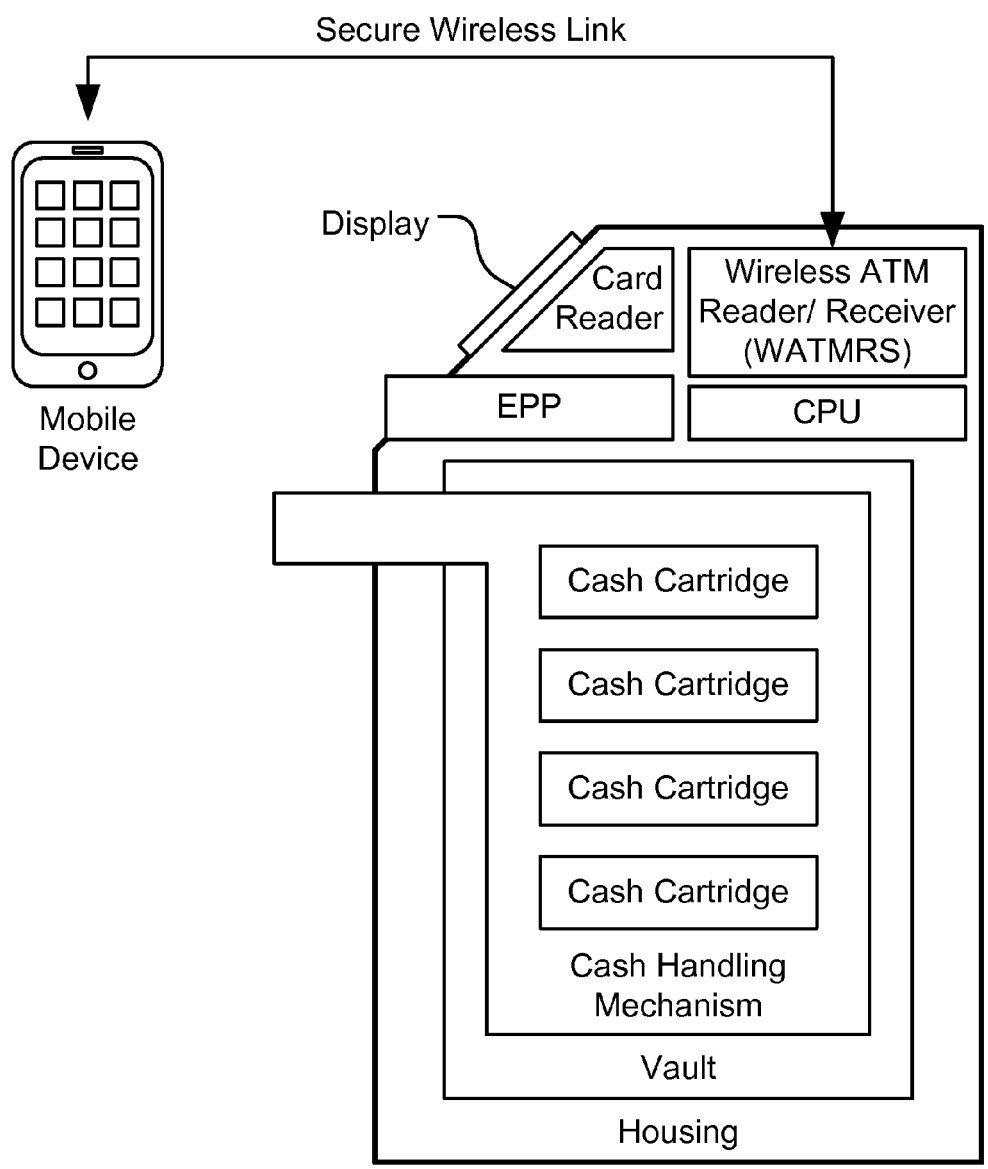
FIG. 28 shows an example of a system for Section 8. (Schematic of an ATM augmented with a Wireless Reader)

One embodiment teaches a system and a method that allows the bank customers (native or otherwise) to withdraw cash from an ATM, without the ATM card, but instead with a mobile device. The typical Card Reader of the ATM machine has to be augmented with a wireless ATM receiver/sender (WATMRS) module that communicates using standard secure protocols with the mobile device of the bank customer. The mobile device, on the other hand, will have to be equipped with a mobile device application or app (MDA) that can communicate with the WATMRS. The new schematic of the proposed ATM and the connection with the mobile device are illustrated in FIG. 28. The rest of the ATM and the underlying systems infrastructure (links to the bank's infrastructure and interbank network—see FIG. 31) can stay unchanged, saving steps that banks may need to take to enhance security and to minimize fraud.

Figure 29:
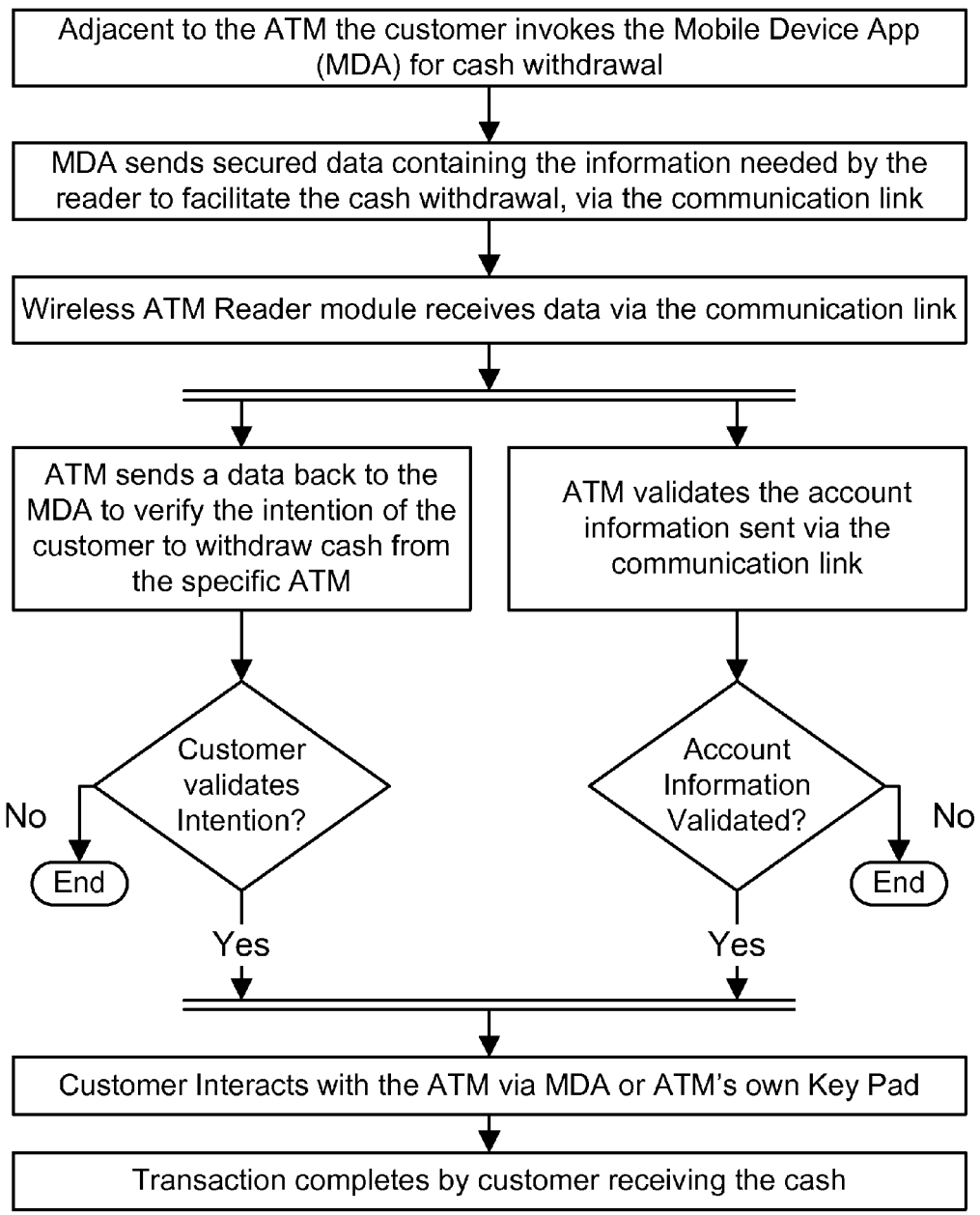
FIG. 29 shows an example of a method for Section 8.

An embodiment of the method by which the customer withdraws cash is depicted in the process illustrated in FIG. 29 and described here. The process begins with the customer being physically adjacent to the ATM invoking the Mobile Device App (MDA) for cash withdrawal. MDA then sends a secure signal containing the information required by the WATMRS to facilitate the cash withdrawal transaction. Once the WATMRS receives the signal, in some embodiments, the ATM may have to send a signal back to the MDA to verify the intention of the customer to withdraw cash from the specific ATM. This step may have to be necessary to reduce transaction error and fraud. In other embodiments, the ATM verifies the geographical location of the mobile device by requesting the MDA to disclose its geographical location to ascertain the physical proximity of the customer to the ATM. The ATM also has to verify and validate the account information. This step may take different forms in different embodiments. In some embodiments, the customer may be asked to enter the PIN into the key pad. In other embodiments, the MDA facilitates the interactions with the ATM and WATMRS. In other words, the customer enters the information into the mobile device app. The MDA may be enabled to provide incremental information to the ATM to reduce the risk of fraud. Examples for such incremental information are the mobile device identification number, the phone number of the mobile device, and accountholder or customers' postal zip-code (entered manually into the MDA). At this point, the ATM is ready to authenticate the transaction by verifying that the security information provided by the MDA matching the account number. If there is an error or a mismatch, the transaction stops.

Figure 30:
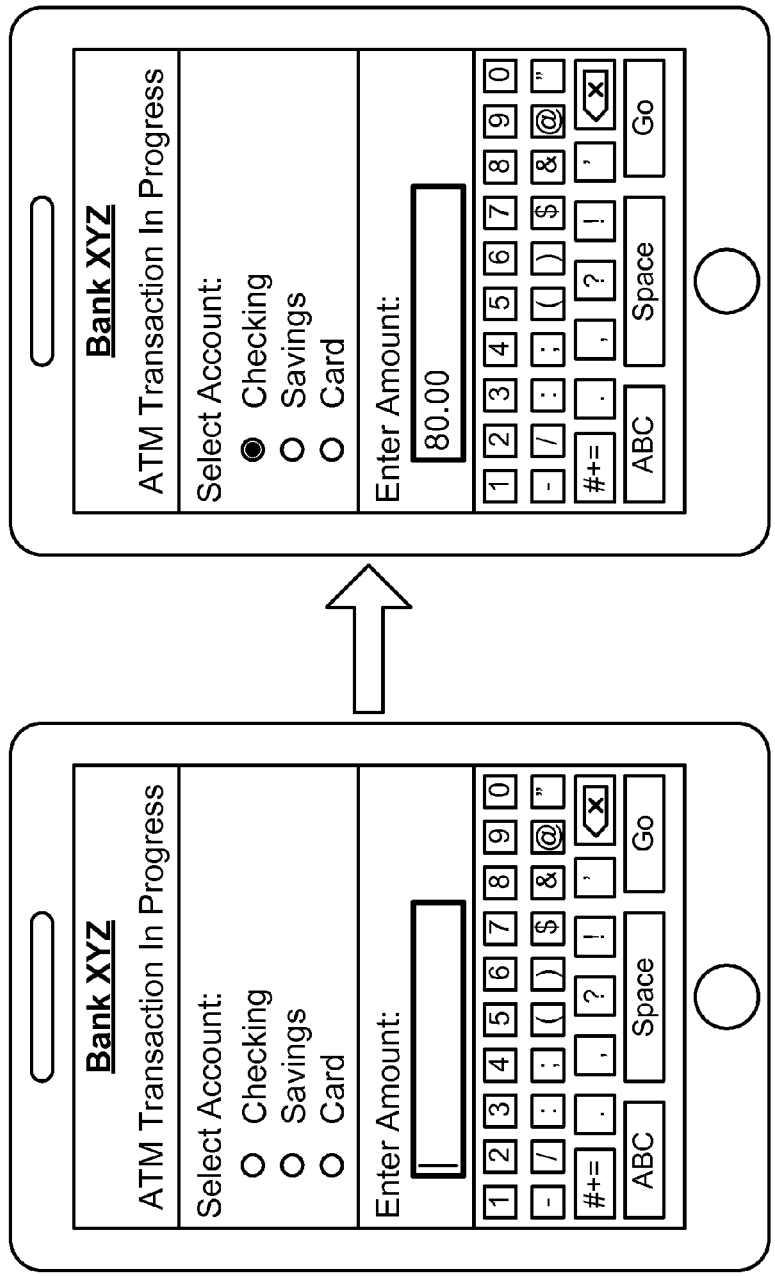
FIG. 30 shows an example of an application for Section 8. (Sample Input into MDA for completion of the cash withdrawal. MDA Customer Prompt, to Sample Customer Input)

Once the transaction is validated via the process explained above, two approaches can be taken to complete the cash withdrawal transaction. The first approach, chosen in some embodiments, leverages most of the existing infrastructure and lets the customer interact with the key pad (EPP), for example, to choose the amount of cash, specify the account type to be withdrawn from (checking or saving), or other such customary prompts that require customers' input. In other embodiments, the MDA provides the interface for interacting with the WATMRS and the ATM to enter the required inputs from the customer (See FIG. 30 for an example of such an input). Once the customer enters the information, that is then processed by the ATM, the customer receives the cash. In some embodiments, the MDA may leave a digital receipt of the transaction with the customer on the mobile device.

Figure 31:
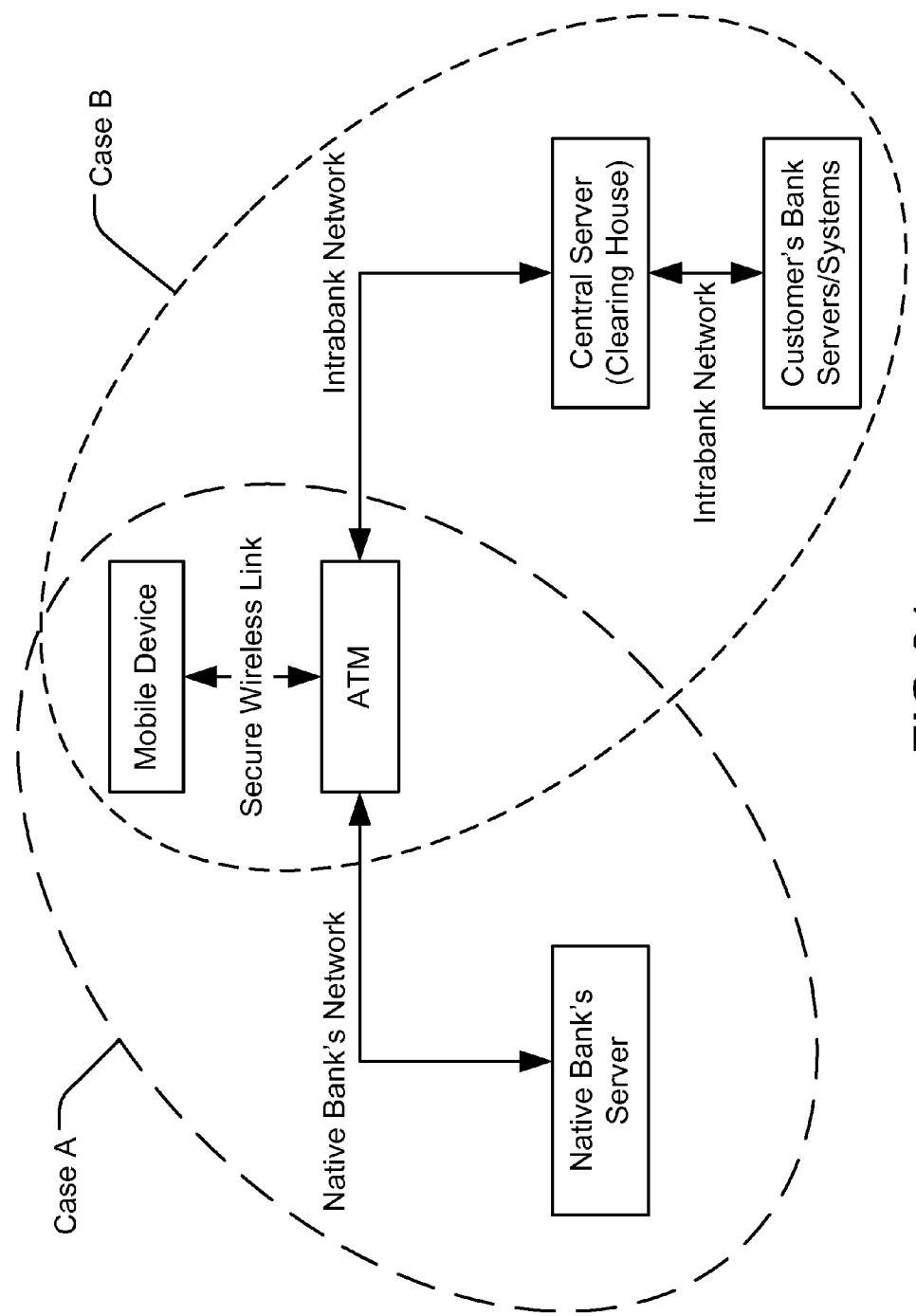
FIG. 31 shows an example of a system for Section 8.

FIG. 31 illustrates further the systems that embody the method described in this example. As demonstrated in FIG. 31, the system accommodates both for (A) the case where the customer uses her mobile device to withdraw cash from the bank that actually holds her account (native bank) and also (B) for cases where the bank is non-native and the account resides with other banks and is linked to the ATM via the Interbank Network through various intermediaries, such as PLUS or Cirrus, to name a few.

Section 9: Customizable Offering for Automotive Loan Products

When purchasing a new or used vehicle, unless the customer has cash at hand for purchase, she must obtain financing. In today's automotive lending environment, two distinct methods exist: direct and indirect lending. In direct lending, the customer has secured financing with a bank that she typically has a business relationship with, whereas in indirect lending, the customer relies on the dealer to obtain the financing on customer's behalf. Presently, the vast majority of auto financing for both used and new vehicle purchases takes place at the point of sale at the dealership and by the dealer, i.e., via indirect lending. The primary objective of the dealer is to maximize the profits the dealership can get out of the transaction, even if it is at higher costs to the customer. Whereas internet and various vehicle purchasing web sites have helped the customer in negotiations with the dealer, that used to be very cumbersome and at times discriminatory, no effective tools exist to help the customer in obtaining the best possible financing that serve the customer's needs and optimize the value for the customer.

To add to the problem, dealers offer a number of peripheral automotive financing products, such as, but not limited to:

A) Extended vehicle warranty (that covers mechanical failures beyond the period and mileage that the manufacturer's warranties typically cover);

B) Life, unemployment, and other types of debt protection programs that make some payments on behalf of the customer, should certain event occur, such as customer's death, or no-fault unemployment; or C) Total loss protection programs, where the customer owes nothing on the loan should there be a total loss collision on the financed vehicle, and there exists a shortfall in funds after the property insurance proceeds.

Such programs typically have high profit margins for the dealer and make the financing appear more complicated to the customer. In other words, they make the transaction murky and incomprehensible to the customer in order to maximize their gain.

Even though direct lending programs exist, very few customers partake in those, mainly because the dealers "turn" the customer at the dealership by selling them those additional peripheral products or just because they make an offer that seems to be a better monthly payment, whereas the overall financing charges may be more. In this embodiment, we present an alternative method, tool, and system for the customer to do independent research (at times at the dealership with real-time feedback from the direct lender's various IT systems) that can offer valuable independent intelligence to the customer to put the customer in a better position to evaluate the dealer's offer.

Presently, the lenders (direct or indirect) only offer installment loans in certain specific durations or terms, such as, 36-, 48-, 60-, and 72-month. As an example, a 53-month loan is not offered that could potentially meet the customer's needs in terms of monthly payment and APR.

Another feature of an auto loan that allows for flexibility and customization of the loan is a rate buy-down, when an initial amount (typically defined as a percentage of principal amount or total amount financed) is paid in order to reduce the interest rate, and hence, the monthly payment. This feature exists for mortgages and other real-estate financing products, but presently is not offered for auto loans.

This embodiment enables customers to make the most optimal auto lending decisions that fit their needs best, puts them in the driver's seat in purchasing and financing their vehicles, and provides them with the best economic outcome. This embodiment has three parts that we explain below:

1. The tool or the interface that customer uses to input and receive information
2. A process designed by the lender or financier of the vehicle purchase to make the tool function as intended
3. The underlying systems, databases, and servers that enable the process The Tool:

FIGS. 32 through 35 show various snapshots of a selected embodiment for an interface for the customizable auto lending tool interface that the customer can use herself on the internet or a mobile device. For better illustration of the various activities involved in securing auto financing via this tool, the interface in this embodiment has been segmented into 1) vehicle, 2) financing, 3) loan, and 4) additional initial payment (AIP). Order and sequence of these segments is natural and makes logical sense from an application progress perspective. However, in other embodiments, various components and elements of these segments may be combined, interchanged, or dropped altogether.

The Process

FIGS. 36 through 39 illustrate embodiments of a processes that the lender may choose to implement for a successful deployment of the tools displayed in FIGS. 32 through 35, respectively. We will review each of the processes in FIGS. 36 through 39 and make references to the tool or interface in the corresponding FIGS. 32 through 35, respectively. The customer can start working with the tool at any location including but not limited to the dealership (provided the tool is installed on a wireless device, such as, a smart phone) or on any Internet enabled device.

Figure 40:
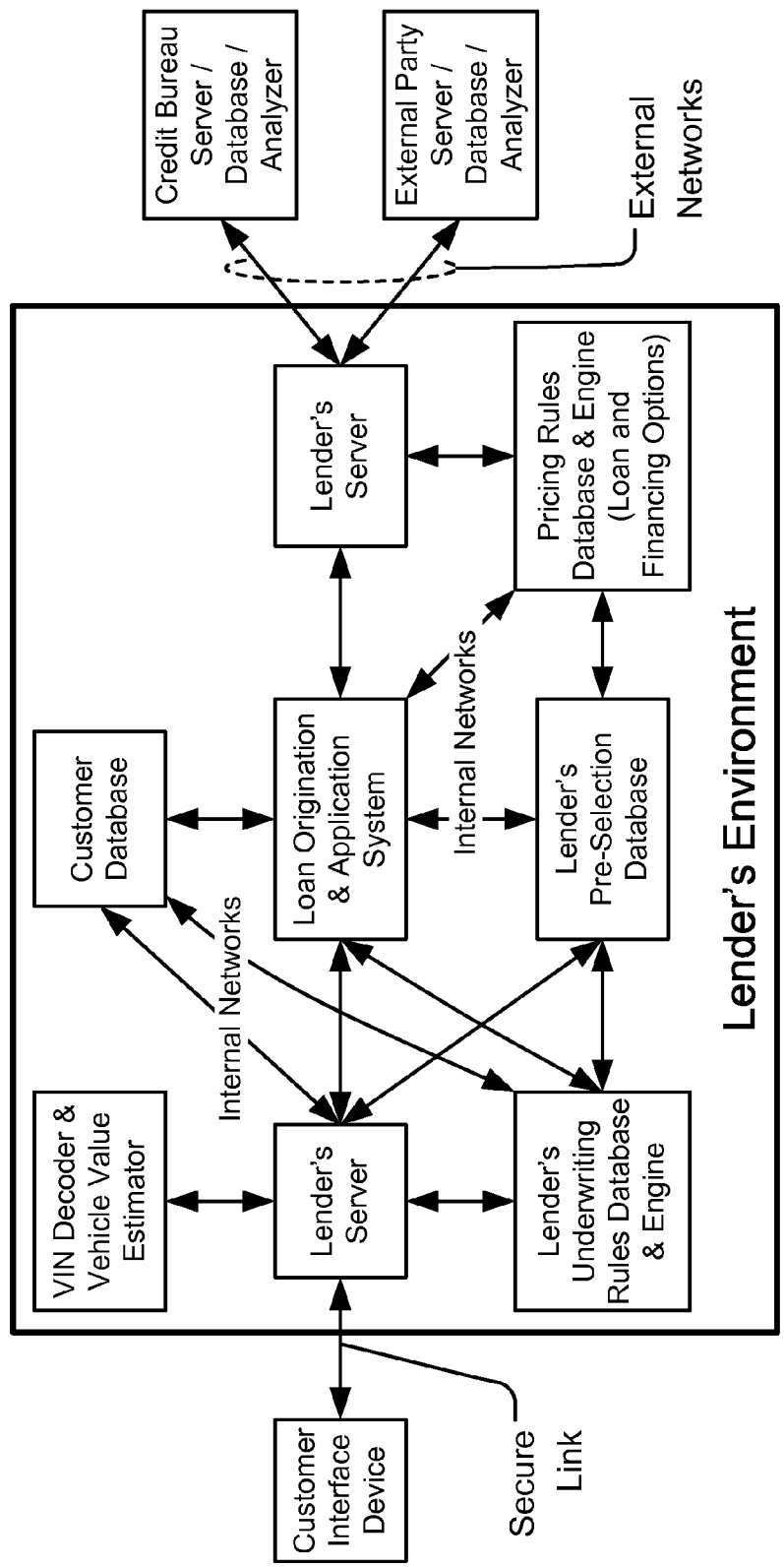
FIG. 40 shows an example of a system for Section 9. (System Setup for the Customizable Auto Lending Tool)

The first step in the process starts in the vehicle-specific section of the tool with the customer potentially having a specific vehicle in mind. If the vehicle identification number (VIN) is available, as illustrated in Route A in FIG. 36, the customer enters the VIN in the open space and can immediately verify the make, model, and year of the vehicle to ascertain the accuracy of the VIN. The VIN verification process requires a VIN-decoder that typically resides on the lender's server, as an example, as shown in FIG. 40, and can be accessed remotely by the customer via the tool. If the vehicle make, model, and year match the customer's expectations (in other words, the VIN is correct), the customer enters the mileage. If not, the customer must correct the VIN until the right vehicle is matched. Based on the VIN and mileage, the value of the vehicle can be estimated via the vehicle value estimator installed on the lender's databases/servers (see FIG. 40). In this embodiment, a vehicle in an average condition is assumed. However, in other embodiments, the lender may decide to give the customer the option to specify the condition of the vehicle, as excellent, good, or poor. Another way for the customer to arrive at the vehicle price is to simply enter the price quoted by the dealer, as shown in Route B in FIG. 36. If the customer does not know the specific vehicle she wants to purchase, but knows what kind of vehicle she wants to purchase, as shown in Route C, she can simply enter make, model, and year of the desired vehicle in the tool. Either a desired mileage is entered by the customer or estimated by the tool (based on vehicle age) that leads to the estimated purchase price. Another way of arriving at the vehicle price is for the customer to simply enter it, as shown in route D in FIG. 36, in the "Vehicle Purchase Price:" slot in the Tool (see FIG. 32). Routes A, B, C, and D are all possible but mutually exclusive to ultimately estimate or specify the vehicle purchase price. If the customer has no idea about the vehicle or price he wants to pay, the customer must do more research, and as an example, a "Monthly Payment Affordability Tool" can be recommended as an interface message for the customer.

Once the vehicle purchase price is established, tax, title fee, and other applicable fees can be entered by the customer as per dealer's quote or estimated by the tool, based on the location of the customer (that can be entered into the tool manually via a Zip code or automatically detected and verified by the system, via a GPS system or triangulation method for location of the device, telephone, or user). The sum of the 4 values, vehicle purchase price, tax, title fee, and other applicable fees, is the Total Cost of the Vehicle, that can either be verified by comparing against the dealer's quote or manually entered by the customer. As part of the vehicle segment of the financing, the down-payment that the customer is willing to pay should be entered as shown at the bottom of the display in FIG. 32.

In some embodiments (not shown in the diagrams), the lender may offer the customer the choice of specifying the vehicle that is being traded in and estimating the value of that vehicle, less any present outstanding balance of the loan due on that trade-in vehicle. Once the Total Vehicle Amount Financed (the Down Payment subtracted from the Total Cost of the Vehicle) is calculated, the customer is ready to go to the next phase related to the financing aspects of the loan.

Figure 37:
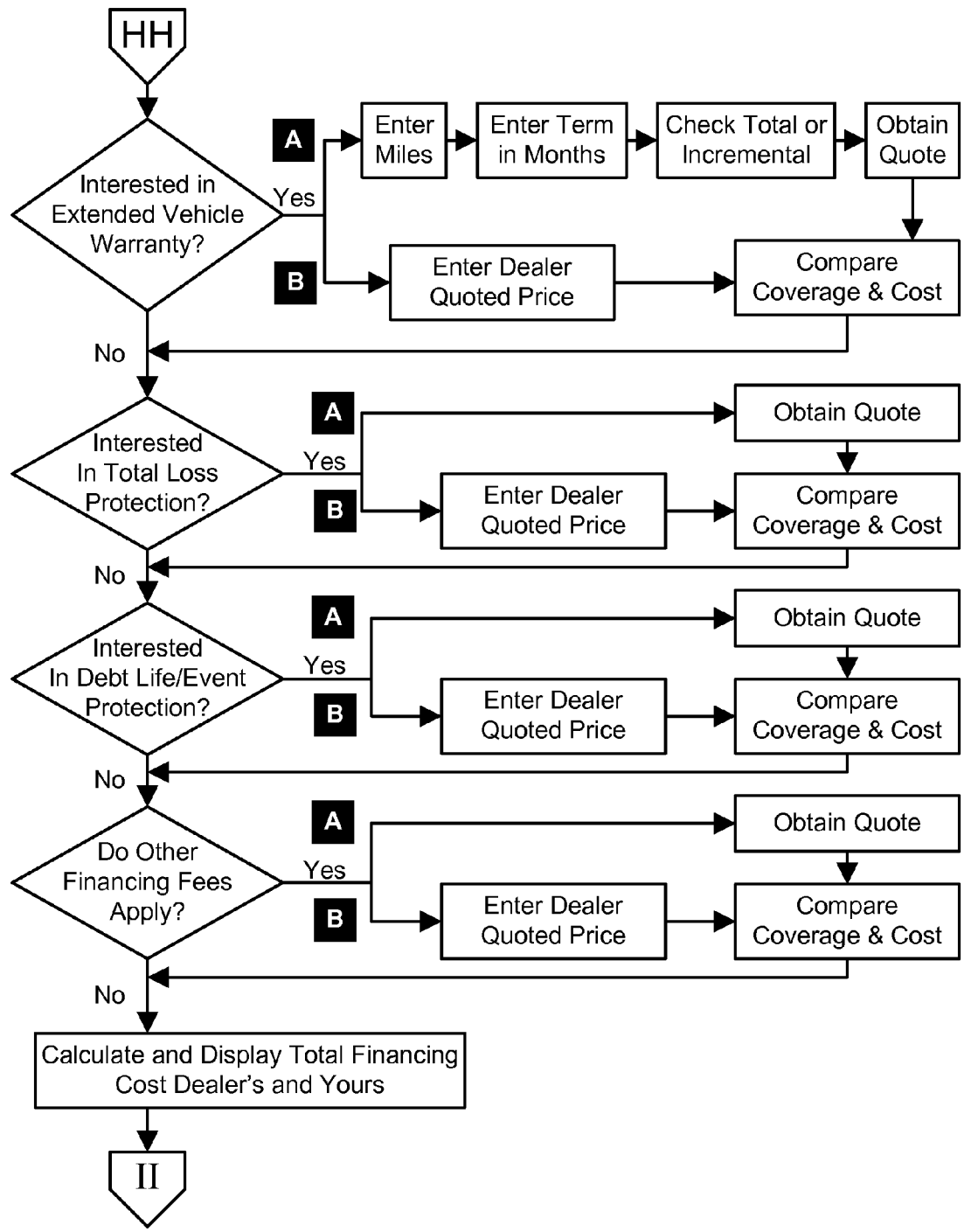
FIG. 37 shows an example of a method for Section 9. (Sample Process for the Customizable Auto Lending Tool—The Financing Options)

In the Vehicle Financing Options segment of the tool, various options are considered by the customer and two quotes can be compared: one from the dealer and the other from the lender. As shown in the process diagram in FIG. 37, in this embodiment, four vehicle financing options can be compared between the 2 quotes: 1) Extended Vehicle Warranty, 2) Total Loss Protection, 3) life, unemployment, and other types of debt protection in case of certain events, and 4) applicable financing or other miscellaneous fees (such as origination fees). Other embodiments include any other options for vehicle purchase, safety, maintenance, and security. The Extended Vehicle Warranty program typically requires term and mileage to be entered (either incremental from the time of the transaction or total). As shown in FIGS. 33 and 37, the customer can enter the dealer quote and/or request a quote from the lender for comparison. The quotes from the lender is obtained, as shown in the diagram in FIG. 40, via the secure link to the lender's server through connecting to the various databases and pricing engines on the lender's internal IT environment. Once each of those 8 figures are entered from the dealer quote or obtained from the lender, the Total Amount Financed can be calculated as the sum of the four financing options amounts and the Total Vehicle Amount Financed.

Again, there are 2 options for the Total Amount Financed, as shown on FIG. 33. First is based on the dealer quote and the second is the one produced based on the lender's quote. The customer can proceed with either figure or both to the next segment which focuses on the loan.

Figure 34:
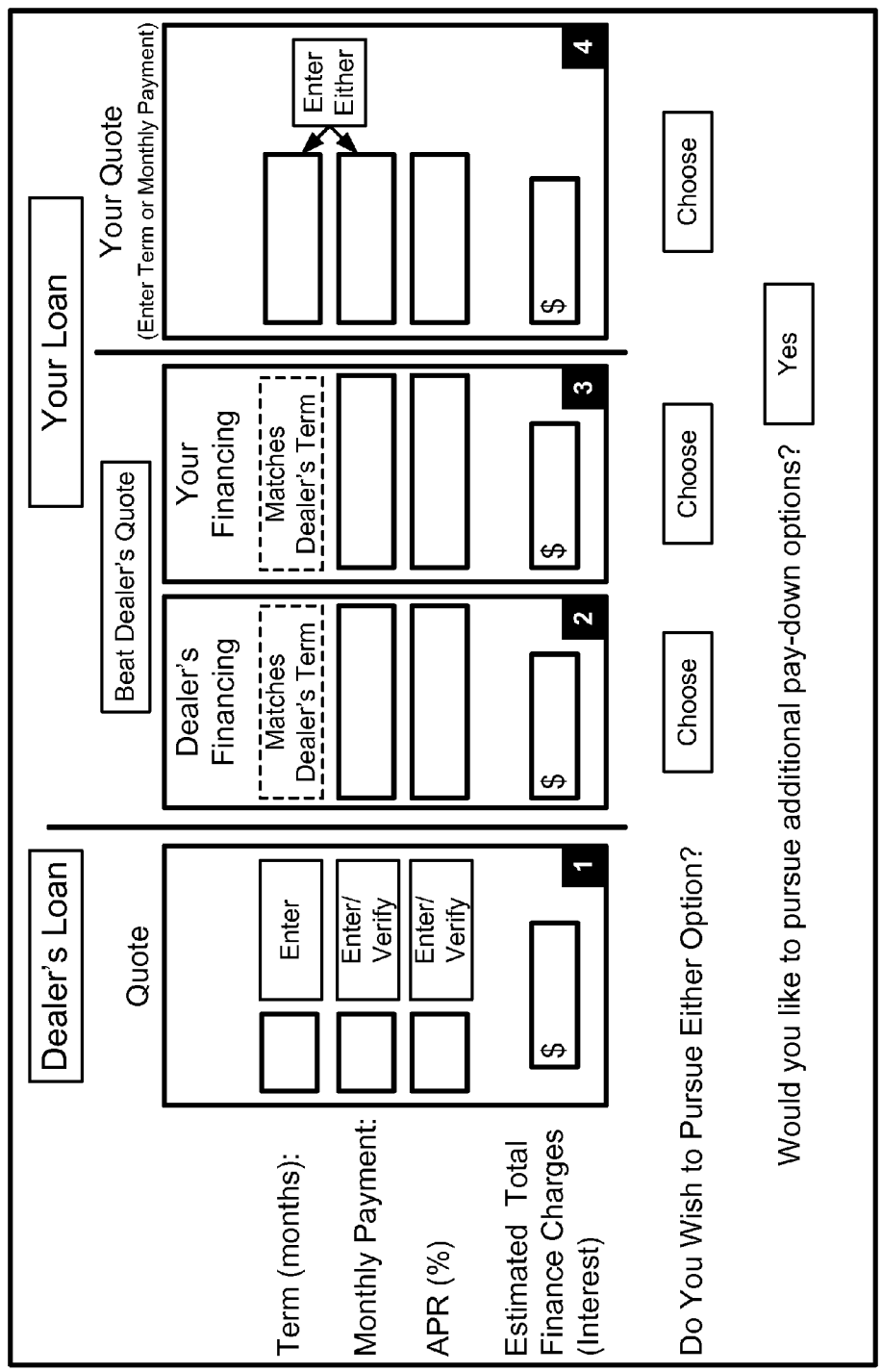
FIG. 34 shows an example of a system for Section 9. (Sample Interface for the Customizable Auto Lending Tool—The Loan)
Figure 38A:
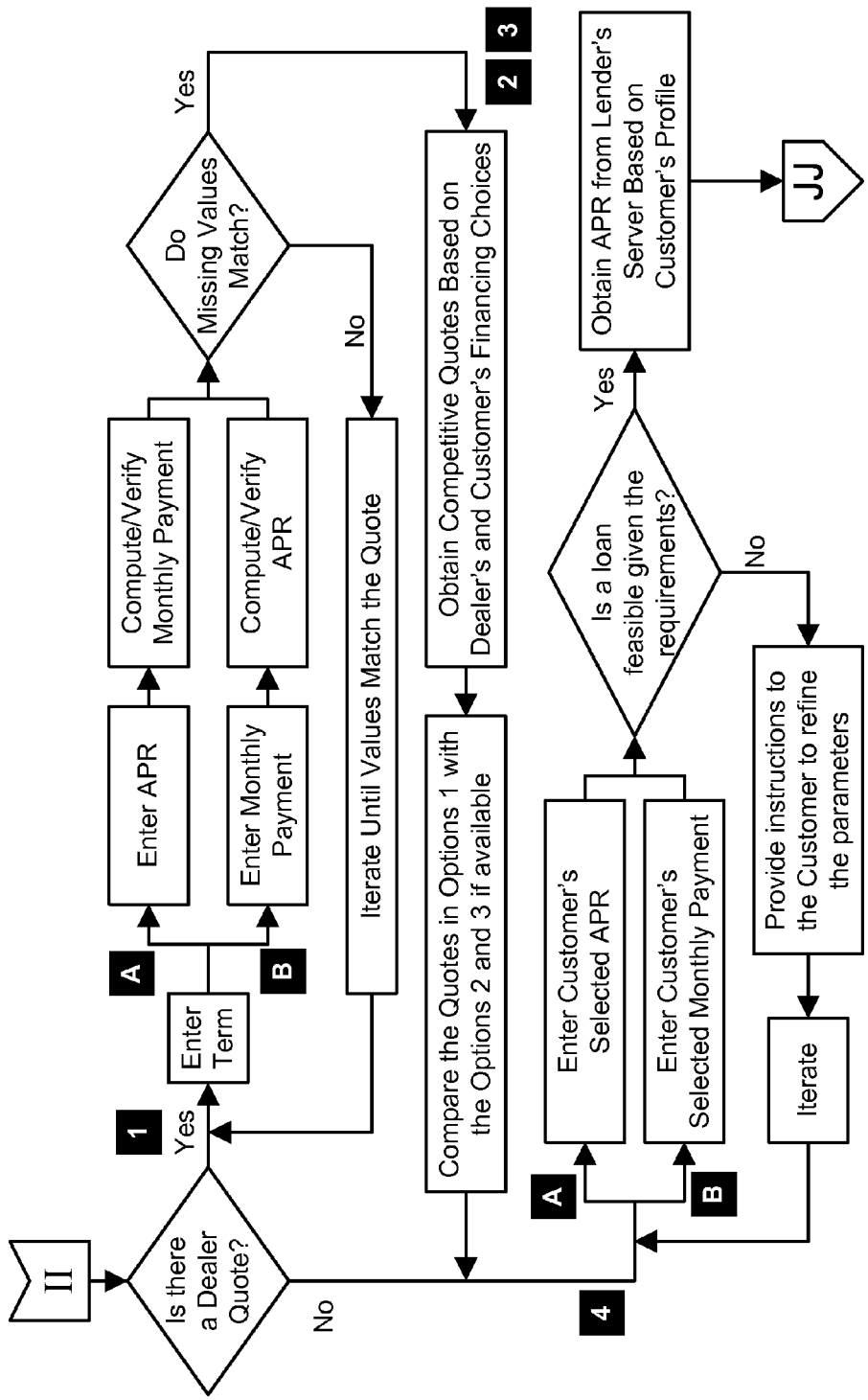
FIG. 38 (a)-(b) show an example of a method for Section 9.
Figure 38B:
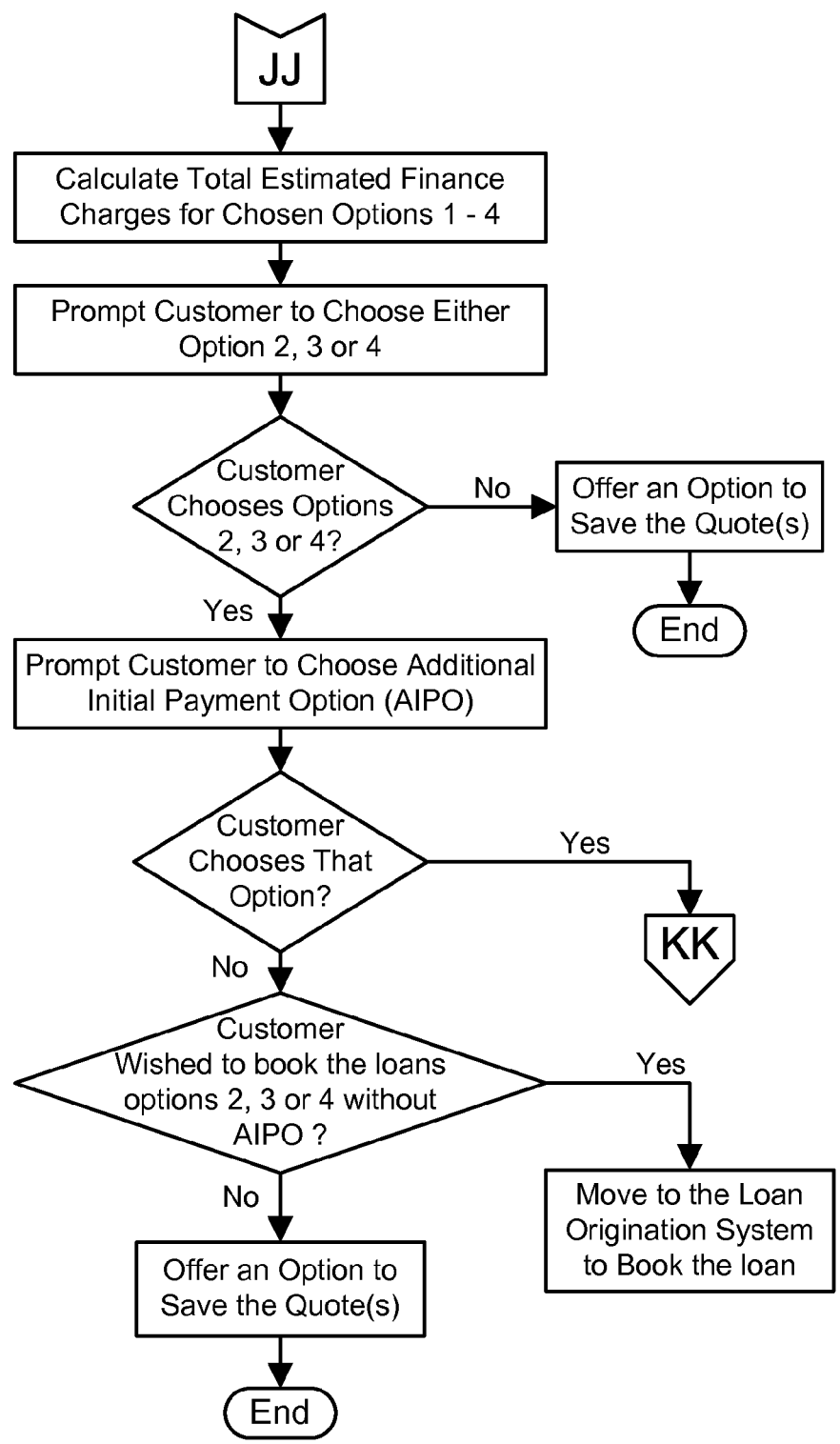

FIGS. 34 and 38 illustrate, respectively, the tool and the process flow for the loan parameters segment. Four options are offered to the customer in this segment to define and finalize the loan and are labeled 1 though 4 in FIGS. 34 and 38. The customer can peruse of either or all options 1 through 4 at her discretion. Since the Total Amount Financed is determined as explained earlier, each option requires 2 out of the following 3 parameters to uniquely define the loan: 1) Term or the number of monthly payments, 2) the amount of monthly payment, and 3) the interest rate or APR. In this embodiment, we assume both the dealer and the lender offer monthly payment installment loans to finance the vehicle. However, in other embodiments, lenders who offer other choices for making payments, such as twice a month or every other week, may want to offer those choices in the tool. Total estimated finance charges or the interest that the customer pays over the life of the loan is also determined mathematically with any given 2 out of the 3 parameters.

Each option in FIG. 34 is described here. Option 1 comes directly from the dealer's quote based on the dealer's Total Amount Financed calculated in the previous segment, and by further entering 2 out of the 3 loan parameters explained above. In this embodiment, we ask the customer to enter the dealer loan's specified term and either A) APR or B) the monthly payment and verify the other parameter that is not entered. If the value that is not entered matches the dealer's quote, the quote is finalized and correct. If not, the customer needs to reenter the correct figure or circle back with the dealer to clarify the error. Options 2 and 3 are the lender's loans attempting to offer the customer better loans with more favorable financing terms based on either dealer's financing parameters entered in the previous segments (Option 2) or the lender's financing parameters (Option 3). In either case, the Term of the loan is held constant to match that of the dealer's loan (Option 1), and the lender quotes the rest of the parameters. Holding the term constant provides the only precise means of direct comparison between the loans. If either the lender or the dealer offers payment options other than monthly, the tool should convert the loan into monthly installment payment in order to make a comparison direct and meaningful. The mathematical formulas for such conversions are well understood and documented in the public domain. The quotes for loans in Options 2 and 3 must be obtained remotely from the lender's IT system, as shown in FIG. 40, via the lender's servers from the lender's Loan Application and Origination System, Pricing Rules Database & Engine, Underwriting Rules Database & Engine modules, and possibly Customer and Pre-Selection Databases modules. Once the quotes in Options 2 and 3 are available, including the Estimated Total Finance Charges, the customer can compare those against Option 1 from the dealer.

Finally, Option 4 offers the customer a way of defining her own loan as per her own requirements and financing choices. As mentioned above, this option (flexible auto lending) presently is not offered by any lender. Either the desired term or a desired monthly payment is entered. The tool (remotely, as shown in FIG. 40) checks the feasibility of the loan. If the loan is not feasible, the interface gives the customer instructions to either reduce the desired term or increase the desired monthly payment. As an example, if the monthly payment specified by the customer is low, the term goes beyond the maximum term offered by the lender, typically now, either 72 or 48 months.

Once a loan (given the specified parameter) is feasible, the remaining 3 parameters are displayed on the tool. At this point from the lender's perspective the customer either chooses option 2, 3 or 4, or alternatively, is offered to choose an Additional Initial Payment Option (Option 1 loan comes from the dealer from the network of its indirect lenders and cannot be chosen in the tool). The customer needs to choose a specific loan (Options 2, 3, or 4), in order to assess the impact the Additional Initial Payment Option will have on that specific loan. Throughout the process, if the customer chooses not to proceed, a "save the quote(s)" option should be provided to the customer to preserve all the information for future reference. If the customer chooses the Additional Initial Payment Option, she is offered to move to the next segment of the tool (described below). If not, the customer (once more) can decide to proceed with booking loan options 2, 3, or 4, in which case the link to the lender's Loan Origination and Application System will allow the customer to do so (as shown in FIG. 40).

Figure 35:
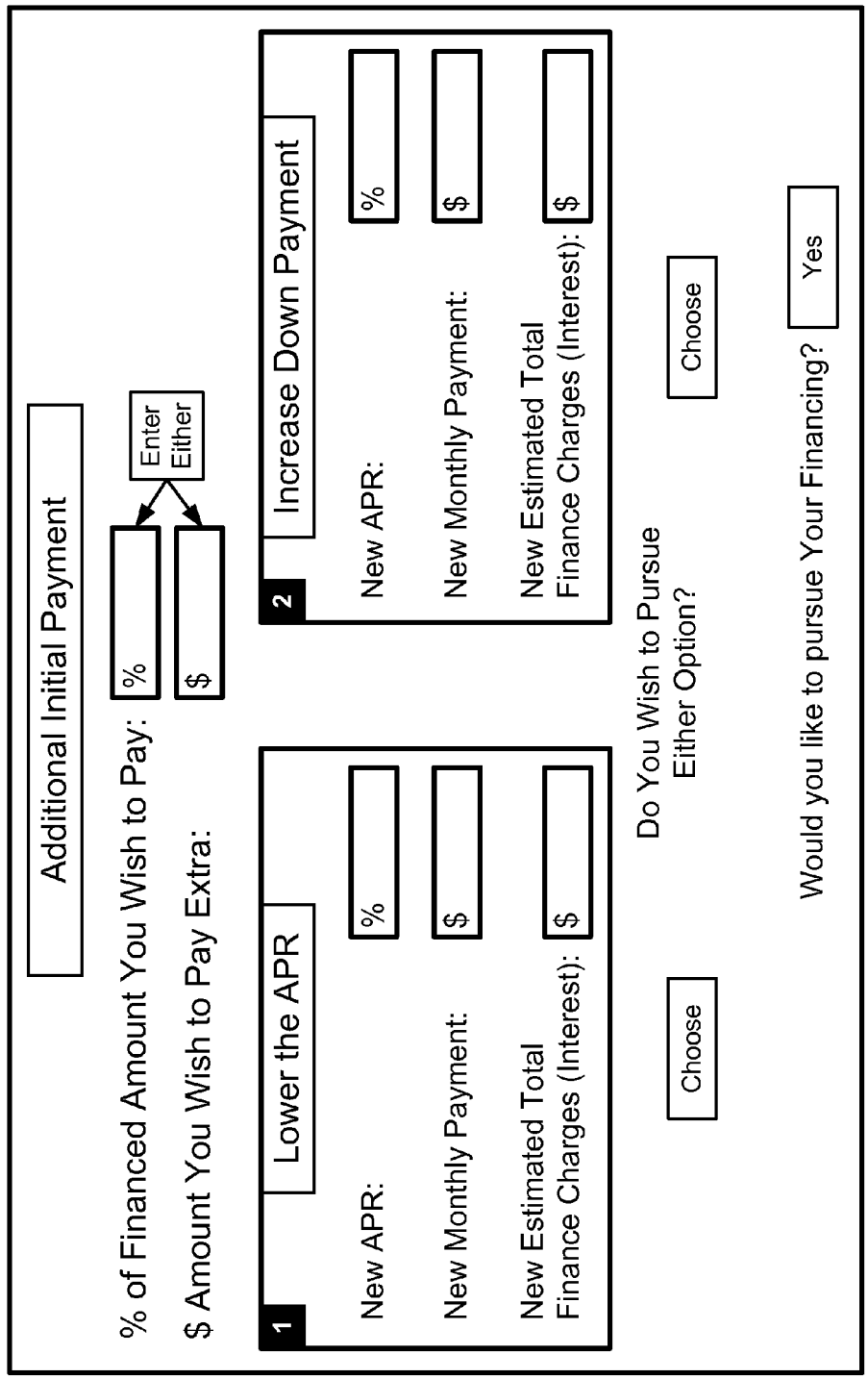
FIG. 35 shows an example of a system for Section 9. (Sample Interface for the Customizable Auto Lending Tool—Additional Initial Payment)
Figure 36A:
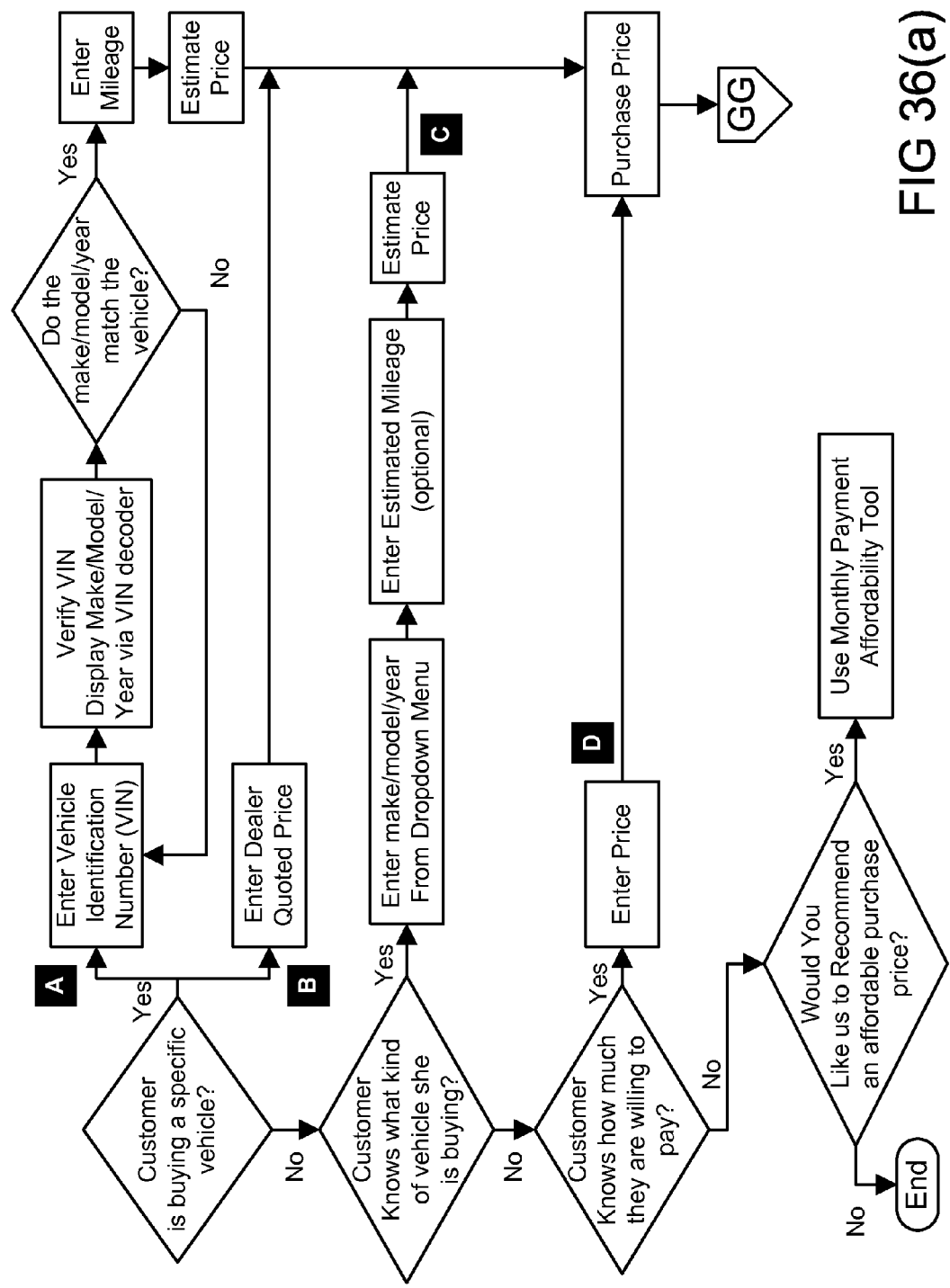
FIG. 36 (a)-(b) show an example of a method for Section 9. (Sample Process for the Customizable Auto Lending Tool—The Vehicle)
Figure 36B:
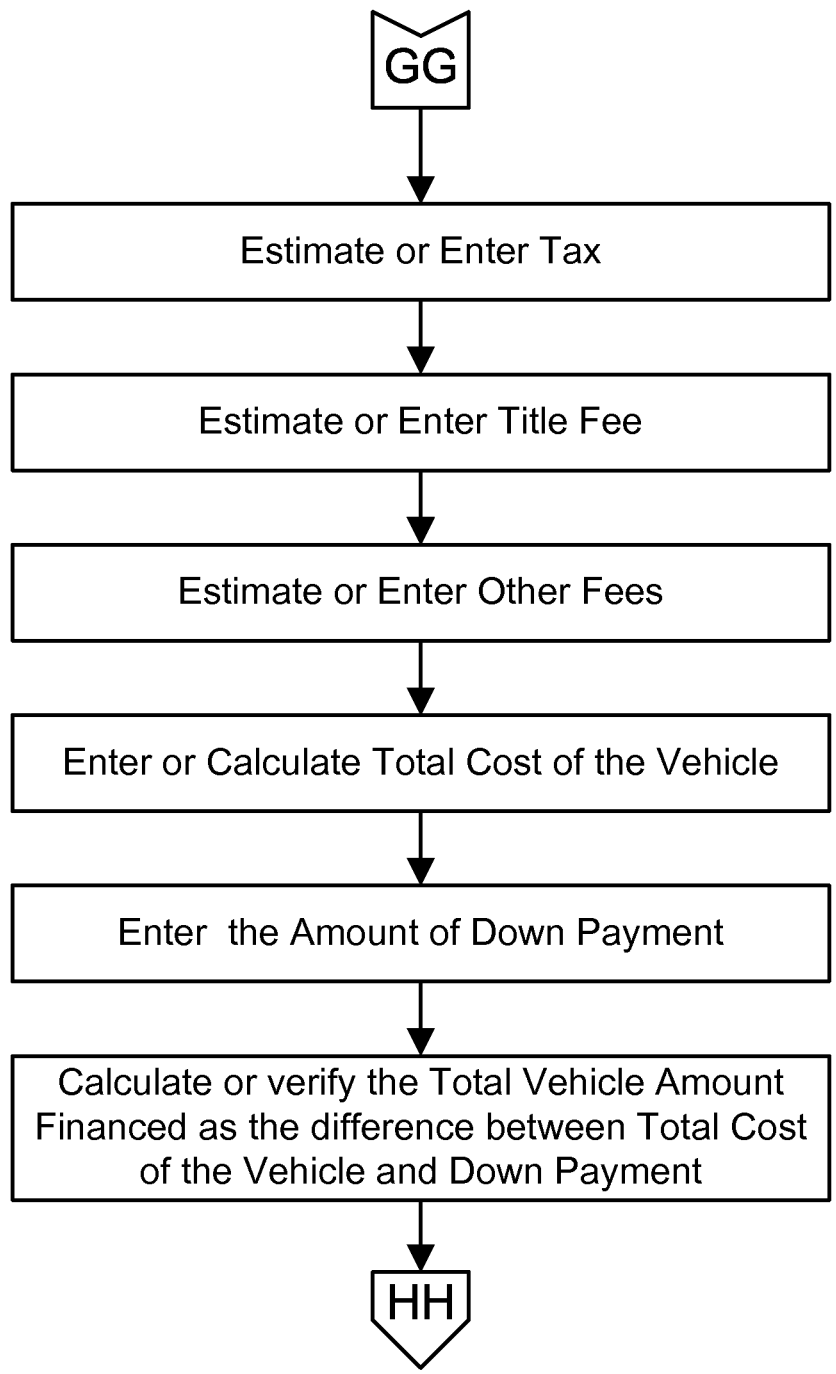
Figure 39:
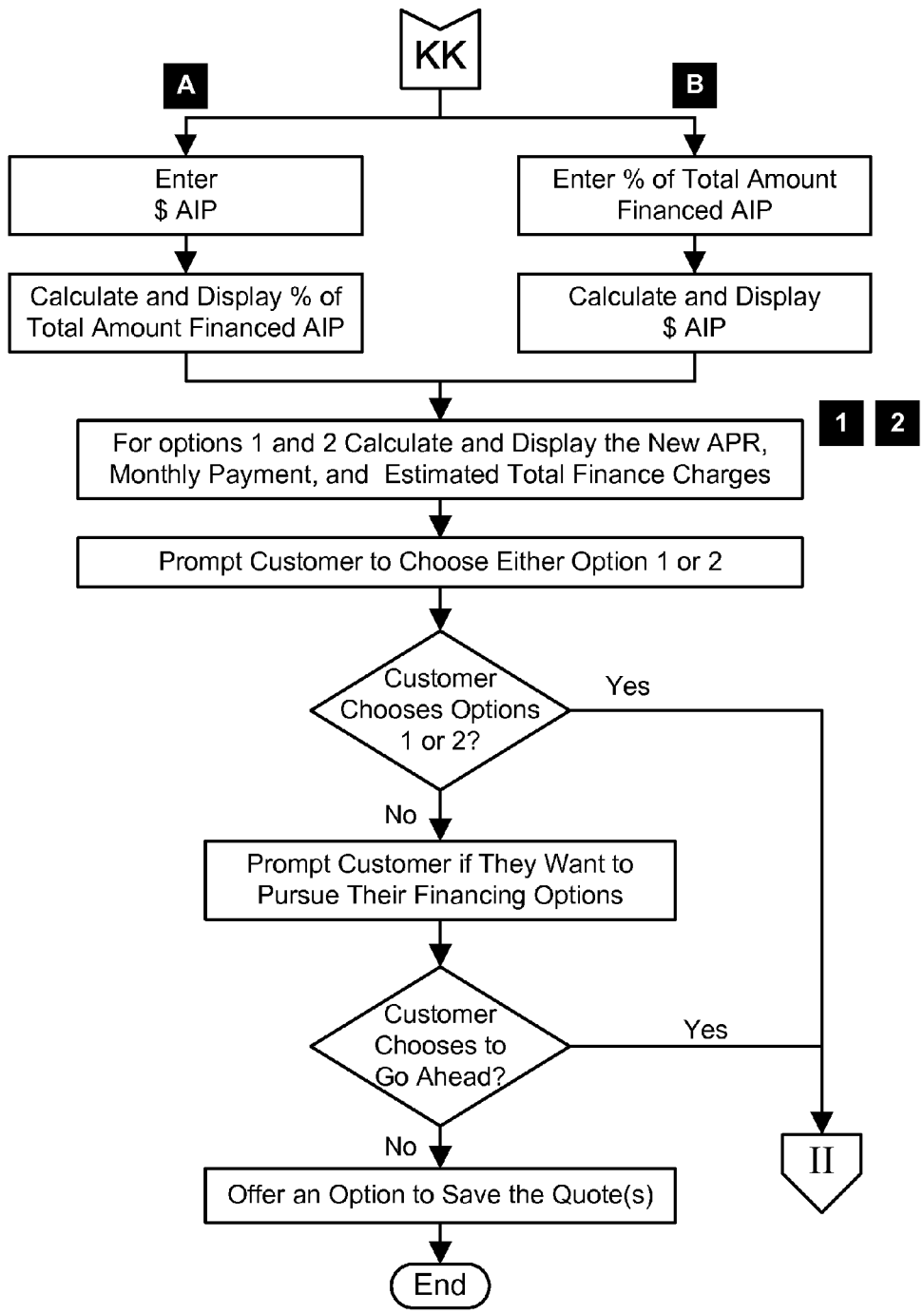
FIG. 39 shows an example of a method for Section 9.

If the customer has some additional cash available, she can experiment with the Additional Initial Payment (AIP) segment of the tool, as illustrated in FIGS. 35 and 39. The concept of rate buy-down is prevalent in the mortgage lending space, but not used at all in the auto lending. Here, the customer can see how the monthly payment and APR change, if the she decides to buy down the rate through an initial payment which typically is expressed in terms of points or % of Total Amount Financed. Alternatively, the customer can decide to use the same amount of initial payment by increasing the Down Payment, and thereby reducing the Total Amount Financed. Most likely, the APR does not change, in case the Down Payment amount is increased. However, the monthly payment reduces by the same percentage. As an example, if the AIP is 1% of Total Amount Financed, and the AIP is applied to the principal, all else being equal, the monthly payment will reduce by 1%, and it will be 99% of the original monthly payment. A more extensive example of auto loan financing with various options is provided at the end of this section.

As illustrated in FIGS. 35 and 39, the customer can decide to choose between (A) the % of Total Amount Financed or (B) the $ amount she would like to pay. Then, the tool calculates and displays (A) the $ amount or (B) the % of Total Amount Financed. In either case, the customer can choose to (1) buy down the rate and/or (2) pay down the principal. For options 1 and/or 2, the tool calculates and displays the New APR, Monthly Payment, and Estimated Total Finance Charges. After comparing the two options with the base loan from the previous segment, the customer can decide to proceed with either option or none (i.e., the base loan), or save the quotes for future reference. As mentioned for the previous segment, if the customer decides to proceed with booking the loan, the tool needs to interface with the lender's loan application and origination system to take the loan application to the next step of fulfillment.

Throughout the process, a number of calculations made and decisioning steps taken by the lender depend on the lender accessing the customer's credit profile or other information relying on credit bureaus, other external parties, or lender's own internal databases, to go through an application process or to retrieve an existing application for reference or completion. The links enabling these steps are illustrated in FIG. 40.

Detailed Example

The following examples help illustrate the concepts. In Table 10, a general example for auto financing is given, where examples for the amounts and their corresponding formulas (if applicable) are discussed. (The examples for those that appear in FIGS. 32-34 and 36-38 are provided.) In Table 11, examples for different Additional Initial Payment options (appearing in FIGS. 35 and 39) are provided for the sample loan presented in Table 10.

The examples provided here are only to illustrate the concepts and how lenders may apply them in order to offer the customers the best possible auto financing options. In reality, the interplay of AIP to increase the Down Payment or to be applied as a Rate Buy-down will involve the lender applying all applicable credit decisioning and pricing rules to determine the feasibility of the loan and also set the right APR (rate) for the loan. Loan to Value or LTV is a factor that plays an important role in the decisioning and setting the price (APR) for the loan. LTV is typically defined as the value of the loan (Total Amount Financed—TAF) divided by the value of the vehicle (Vehicle Purchase Price—VPP), even though different lenders may choose other modified versions of this formula. LTV may be set as a constraint for lending (in other words, no loan offer can be extended for LTV higher than a threshold). Alternatively, LTV may be applied to score and price a loan (assign an APR). In either case, the interactions of the following loan and vehicle parameters lead to the lender's decision as to whether or not to offer a loan (i.e., approve/decline) and the cost of financing the customer pays to the lender (i.e., the APR or interest), for example, using: TAF, LTV, DP, AIP, ToL, APR, MP, Debt-to-Income (DTI), Payment-to-Income (PTI), vehicle age and type, and customer's credit profile (characteristics), as some of the parameters used in the loan and banking industry. Both the decision and finance charges vary based on the lender's practices.

TABLE 10

An Example for Auto Financing Parameters, Formulas, and Values.

| Parameter | Formula | Value |
|---|---|---|
| Vehicle Purchase Price (VPP) | N/A | $22,000 |
| Tax | Typically % of VPP depends on the state, e.g., 8% | $1,760 |
| Title | Depends on State and/or County, e.g.: | $150 |
| Fees | Depends on the dealership, e.g.: | $50 |
| Total Cost of Vehicle (TCoV) | VPP + Tax + Title + Fees | $23,960 |
| Down Payment (DP) | Depends on the customer and trade-in vehicle, e.g.: | $5,000 |
| Total Vehicle Amount Financed (TVAF) | TcoV − DP | $18,960 |
| Extended Vehicle Protection (EVP) (Warranty) 6 years 100K miles Total | Depends on customer choice and offerings, e.g., | $650 |
| Total Loss Protection (TLP) | Depends on customer choice, e.g., | $250 |
| Debt Event Protection (DEP) | Depends on customer choice, e.g., none chosen here | $0 |
| Other Financing Charges (OFC) | Depends on the dealership and the lender, e.g., | $0 |
| Total Amount Financed (TAF) | TVAF + EVP + TLP + DEP + OFC | $19,860 |
| Loan to Value (LTV) | TAF/VPP | 90.27% |
| Term of the Loan (ToL) | N/A | 60 months |
| APR (annual interest or percentage rate) | N/A | 8% |
| Monthly Payment (MP) | $(TAF \times APR/12)/(1-(1+(APR/12))^{-ToL})$ | $402.69 |
| New Estimated Total Finance Charges (Interest) | MP × ToL − TAF | $4,301.40 |

TABLE 11

Additional Initial Payment Options for the Loan in Table 10.

| | Lower APR (Rate Buy-down) | Increase Down Payment |
|---|---|---|
| Term Unchanged | 60 months | |
| AIP = 1% | $19,860 × 1% = $198.60 | |
| Down Payment (DP) | $5,000 | $5,000 + $198.60 = $5,198.60 |
| Total Amount Financed (TAF) | $19,860 | $19,860 − $198.60 = $19,661.40 |
| Loan to Value (LTV) | 90.27% | 89.37% |
| APR | 7% | 8% |
| Monthly Payment | $393.25 | $398.65 |
| Estimated Total Finance Charges (Interest) | MP × ToL − TAF + AIP = $3,933.60 | MP × ToL − TAF = $4,257.60 |

As an example, we have a method of customizable offering for an automotive loan product by a lender, with the following steps: A vehicle-specific section input interface module receives a vehicle identification number for a vehicle, and a verification device or module verifies the make, model, or year of the vehicle. If the result of the verification step is a confirmation (positive verification), then a user enters mileage of the vehicle on a user interface module. Then, the system receives the condition of the vehicle. Then, an estimator device or module estimates value of the vehicle, either using the mileage of the vehicle, the condition of the vehicle, and the vehicle identification number for the vehicle, or using a price quoted by a dealer. Then, the system receives a zip code or location information of the user. A fee calculator device or module estimates or calculates all applicable taxes and fees, using the zip code or location information of the user and a database or table for listing or rate of all applicable taxes and fees. Then, the system receives financing options for one or more of following: extended vehicle warranty, total loss protection, life and unemployment debt protection, or financing fees. Then, the system receives personal information about the user. The monthly payment affordability tool device or module calculates available options for the user, based on the received financing options, all the estimated or calculated applicable taxes and fees, the estimated value of the vehicle, and the received personal information about the user. Then, an output device outputs the available options for the user.

In one example, the system also receives information about other loans, information from other banks or lenders, information from credit bureaus, or the information from other divisions of the lender. In one example, the system also applies the rules regarding maximum allowable monthly payments or federal or local banking rules.

In one example, the system also compares the available options for the user, prioritizes or orders the available options for the user, based on the user's preferences or constraints, optimizes the available options for the user, compares cost and coverage for the user, suggests alternative automobile options for the user, suggests alternative payment options, suggests alternative loan options, adds cosigner for the user, applies to multiple lenders or banks for the user, compares multiple lenders or banks for the user, or presents refinancing options for the user.

In one example, the user accepts one of the available options, through a loan processing user interface. In one example, the user corrects data or changes choices, through a loan processing user interface.

Figure 25:
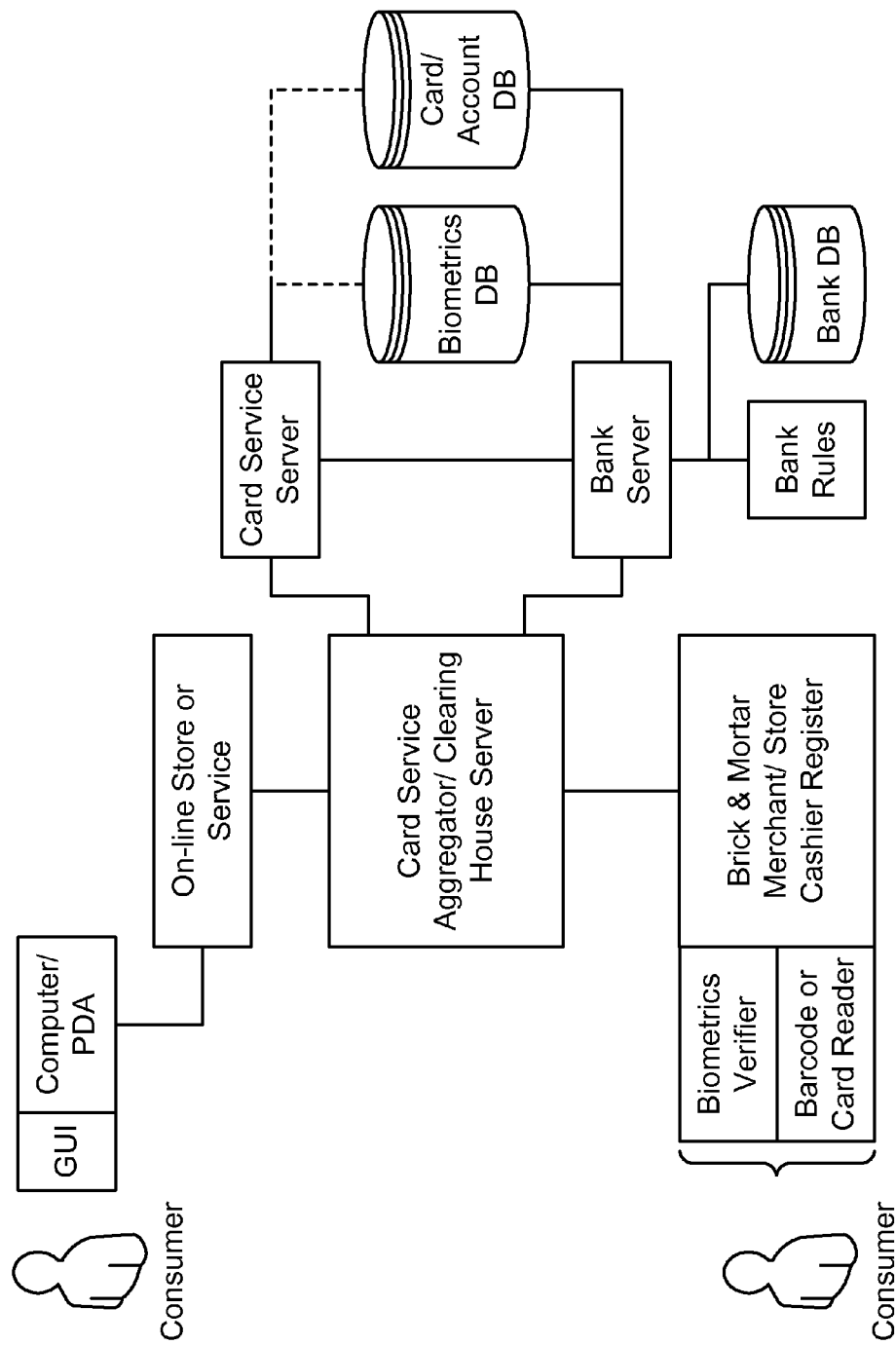
FIG. 25 shows an example of a system for all Sections.

General Notes for All Embodiments Above:

As shown in FIG. 25, for all the embodiments in this invention, a consumer can use her computer or go to a store (e-store, having a GUI or user interface (a hardware or a device), or brick and mortar regular store, having biometrics verifier or barcode or card reader), through an aggregator, connecting to a card service or bank, to authenticate through card information and biometrics, plus bank rules, e.g. to charge a card for a transaction or purchase.

Figure 26:
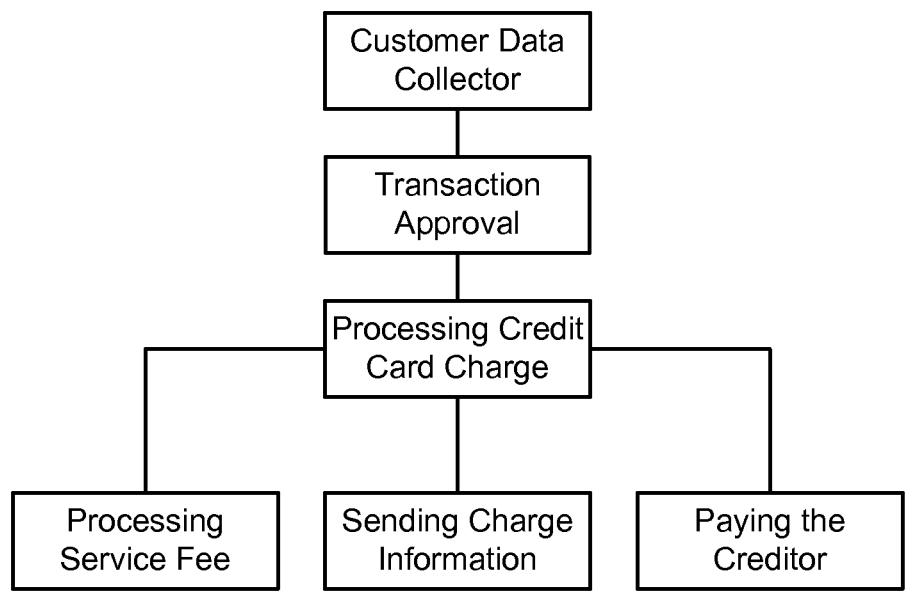
FIG. 26 shows an example of a system for all Sections.

As shown in FIG. 26, for all the embodiments in this invention, a consumer's data gets approved and processed for the credit card company or issuer, with an associated processing fee, with the charge information transmitted and the creditors get paid, accordingly.

Please note that, in general, any teaching here for "pre-approved" also applies to "pre-selection", including everything in specification, text, and figures.

Please note that there are 2 usages for the word "application" in our disclosure above: One is "lending product application", and the $2^{nd}$ one is the mobile device application/software/code, loaded on the phones or smart phones, as an example. The different usages are clear from the context.

For all teachings above/here, the concepts taught for lender also apply to card issuer, merchant bank, bank, mortgage issuer, and financial institution (i.e. they can be interchanged and replaced with each other). The same is true for phrases loan, financial product, consumer loan, car loans, home loans, credit card loans, student loans, and bank loan.

Please note that for all the teachings of this patent application, the concept of smart phone or phone here also applies to game platforms/consoles, interactive devices, display devices, monitors, multipurpose computers, GPS devices, map finders, pagers, radios, one-way broadcasters, two-way communicators, communication devices, cell phones, wireless devices, wired devices, processors, microprocessors, communication devices, computers, tablets, PDAs, laptops, computing devices, simulation devices, or other similar gadgets that can function the same, e.g. communicate with others, e.g. with a user interface or GUI.

Please note that all the teachings above for communications between 2 points or multiple points can be done by wire, cable, optical, laser, sound, electromagnetic waves, RF, microwave, wirelessly, pulse data, packets, Internet protocols, analog, digital, modulated, encrypted, encoded, with header, without header, intermodulated, mixed, phone, cell phone, mobile device, PDA, broadcasting, pager, one-way, two-way, WiFi, BlueTooth, Internet, network, private network, secure network, mixed or combination of networks, and in any format. The connection between 2 points may be direct or indirect, logical or electrical, or through intermediary, or another device in between.

Please note that for all the teachings above, the word "processor" (a device) (which is non-human for our entire disclosure) can be interchanged with one or more of the following: microprocessor, computer, computing processor, microcomputer, computing device or apparatus, computing subsystem, computing module, module (a device, not a software), calculating device, analyzing device, logic design circuit, computational circuit, digital circuit, functional circuit, mathematical or logical operation circuit, or analog circuit. Please note that for all the teachings above and throughout this disclosure, all of the terms mentioned in the current paragraph refer to a device or hardware.

Throughout this disclosure, the following refer to a hardware or device: repository, storage, database (or DB), store (either referring to a computer(s) or server(s) hosting a web site, or a brick-and-mortar building), App store (referring to a computer server or host server or computer(s)), computer, server, system, subsystem, module, terminal, network, Internet, interface, UI (user interface), GUI (graphical user interface), display, PC (personal computer), PDA (personal digital assistant), reader, scanner, processor, input module, engine, tablet, GPS, biometrics verifier, cashier register, clearing house (referring to a computer server or host server or computer(s)), aggregator (referring to a computer server or host server or computer(s)), and data collector.

Every module or device or system or subsystem or server or database or storage or memory unit here in our teachings may have one or more of the following included or attached to it (without showing all the details in the figures, to simplify the figures): a processor or microprocessor, server, PC, computer, PDA, smart phone, pager, GPS, wireless communication module, one or more memory units or RAM or ROM or storages or databases or temporary buffers, display, keyboard, user interface, GUI, mouse, input device, voice command recognition unit, cable, fiber optics, laser, optical communication module, magnetic device, acoustic device, wireless device, RFID, wired device, Bluetooth, WiFi, antenna(s), dish, array of antennas, satellite or cell reception or transmitter device, wireless interface, Internet or network interface, security interface, biometrics interface, printing interface, voice recognition interface, OCR and handwriting recognition interface, or any other interface or formatting devices.

Please note that all the teachings in this disclosure for division of a company also apply to sister company, affiliate, parent company, subsidiary, joint venture, or mother company.

All the tables shown in this disclosure show a data structure, which can be stored on a storage media (hardware) or a computer hard drive (device) or on a server (device).

Note that these alternative methods of communications and notifications apply to all other embodiments. Sometimes, the lender requires more information or documents from the customer, which can be either sent in person, or by mail, fax, telex, wire, optical method, wirelessly, sound waves, electromagnetic waves, satellite, cell phone, cable, email, text messages, SMS, or smart phone/communication devices, computers, tablets, PDA, or laptops.

Please note that the diagrams, flow charts, or methods shown in the figures or described in the text can be processed in an automated or computer system as a work flow or batch processing technique.

Any variations of the teaching above are also intended to be covered and protected by the current patent application.

The invention claimed is:

1. A method of customizable offering for an automotive loan product by a lender, said method comprising:
   a vehicle-specific section input interface module receiving a vehicle identification number for a vehicle;
   a verification device or module verifying make, model, or year of said vehicle;
   receiving a mileage value of said vehicle from a mileage input interface module;
   receiving a condition of said vehicle;
   an estimator device or module evaluating a value of said vehicle, either using said mileage of said vehicle, said condition of said vehicle, and said vehicle identification number for said vehicle, or using a price quoted by a dealer;
   receiving location information of said user;
   a fee calculator device or module providing applicable taxes and fees, using said location information of said user and a database or table for listing or rate of said applicable taxes and fees;

receiving financing options for one or more of following: extended vehicle warranty, total loss protection, life and unemployment debt protection, or financing fees;

receiving personal information about said user;

a lender computer receiving credit information from credit bureau servers about said user;

a monthly payment affordability tool calculating available options for said user, based on said received financing options, said provided applicable taxes and fees, said value of said vehicle, said credit information about said user, and said received personal information about said user;

storing said calculated available options for said user in a customer database;

said lender computer receiving a down-payment amount value that said user desires to pay;

said lender computer receiving an installment payment amount value that said user desires to pay;

said lender computer receiving a length of time value for said automotive loan that said user desires to obtain;

said lender computer receiving a type of loan for said automotive loan, in terms of fixed or variable rate, said user desires to obtain;

said lender computer receiving a number of payments per month or per year for said automotive loan said user desires to obtain;

said lender computer communicating with said verification device or module;

said lender computer communicating with said estimator device or module;

said lender computer communicating with lender underwriting rules database;

said lender computer communicating with a lender underwriting rules engine;

said lender computer communicating with a loan origination and application system;

said loan origination and application system communicating with a loan and financing options rules database;

said loan origination and application system communicating with a loan and financing options rules engine;

said lender computer communicating with loan and financing options rules database;

said lender computer communicating with a loan and financing options rules engine;

said lender computer calculating a set of personalized loan parameters based on said down-payment amount value that said user desires to pay, said installment payment amount value that said user desires to pay, said length of time value for said automotive loan that said user desires to obtain, said type of loan for said automotive loan in terms of fixed or variable rate said user desires to obtain, and said number of payments per month or per year for said automotive loan said user desires to obtain;

said lender computer determining whether said set of personalized loan parameters is feasible, with respect to said calculated available options for said user, stored in said customer database;

wherein in case said set of personalized loan parameters is feasible, an output device sends a notice of approval to said user;

wherein in case said set of personalized loan parameters is not feasible, said lender computer asks said user to change at least one of following, to repeat steps in said method again:

said down-payment amount value that said user desires to pay, said installment payment amount value that said user desires to pay, said length of time value for said automotive loan that said user desires to obtain, said type of loan for said automotive loan in terms of fixed or variable rate said user desires to obtain, and said number of payments per month or per year for said automotive loan said user desires to obtain.

2. The method of customizable offering for an automotive loan product by a lender as recited in claim 1, said method comprising:

receiving information about other loans.

3. The method of customizable offering for an automotive loan product by a lender as recited in claim 1, said method comprising:

receiving information from other banks or lenders.

4. The method of customizable offering for an automotive loan product by a lender as recited in claim 1, said method comprising:

receiving information from other divisions of said lender.

5. The method of customizable offering for an automotive loan product by a lender as recited in claim 1, said method comprising:

applying rules regarding maximum allowable monthly payments.

6. The method of customizable offering for an automotive loan product by a lender as recited in claim 1, said method comprising:

applying federal or local banking rules.

7. The method of customizable offering for an automotive loan product by a lender as recited in claim 1, said method comprising:

comparing cost and coverage for said user.

8. The method of customizable offering for an automotive loan product by a lender as recited in claim 1, said method comprising:

suggesting alternative automobile options for said user.

9. The method of customizable offering for an automotive loan product by a lender as recited in claim 1, said method comprising:

suggesting alternative payment options for said user.

10. The method of customizable offering for an automotive loan product by a lender as recited in claim 1, said method comprising:

suggesting alternative loan options for said user.

11. The method of customizable offering for an automotive loan product by a lender as recited in claim 1, said method comprising:

adding cosigner for said user.

12. The method of customizable offering for an automotive loan product by a lender as recited in claim 1, said method comprising:

applying to multiple lenders or banks for said user.

13. The method of customizable offering for an automotive loan product by a lender as recited in claim 1, said method comprising:

comparing multiple lenders or banks for said user.

14. The method of customizable offering for an automotive loan product by a lender as recited in claim 1, said method comprising:

presenting refinancing options for said user.

* * * * *